US011320191B2

(12) United States Patent
Kang et al.

(10) Patent No.: US 11,320,191 B2
(45) Date of Patent: May 3, 2022

(54) VACUUM ADIABATIC BODY AND REFRIGERATOR

(71) Applicant: LG ELECTRONICS INC., Seoul (KR)

(72) Inventors: Myoungju Kang, Seoul (KR); Bongjin Kim, Seoul (KR); Hyeunsik Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 16/768,379

(22) PCT Filed: Dec. 11, 2018

(86) PCT No.: PCT/KR2018/015709
§ 371 (c)(1),
(2) Date: May 29, 2020

(87) PCT Pub. No.: WO2019/117599
PCT Pub. Date: Jun. 20, 2019

(65) Prior Publication Data
US 2020/0386471 A1  Dec. 10, 2020

(30) Foreign Application Priority Data
Dec. 13, 2017  (KR) .................. 10-2017-0171666

(51) Int. Cl.
F25D 23/00  (2006.01)
F16L 59/02  (2006.01)
(Continued)

(52) U.S. Cl.
CPC ............. *F25D 23/00* (2013.01); *F16L 59/02* (2013.01); *F16L 59/065* (2013.01); *F25D 11/02* (2013.01);
(Continued)

(58) Field of Classification Search
CPC .......... F25D 11/02; F25D 17/06; F25D 21/14; F25D 2201/14; F25D 23/00; F25D 23/06; F25D 23/062; F25D 23/082
See application file for complete search history.

(56) References Cited

U.S. PATENT DOCUMENTS 2,000,882 A   5/1935  Comstock
2,464,526 A   3/1949  Palmer
(Continued)

FOREIGN PATENT DOCUMENTS

CN   1420331   5/2003
CN   1603728   4/2005
(Continued)

OTHER PUBLICATIONS

International Search Report and Written Opinion dated Mar. 20, 2019 issued in Application No. PCT/KR2018/015703.
(Continued)

*Primary Examiner* — Filip Zec
(74) *Attorney, Agent, or Firm* — KED & Associates LLP

(57) ABSTRACT

A vacuum adiabatic body according to the present invention includes a reinforcing member which is provided at a peripheral portion of at least one plate member so as to reinforce the strength of the plate member providing the vacuum adiabatic body; and a drain pipe which penetrates a third space except for the reinforcing member and through which water passes. According to the present invention, the strength of the vacuum adiabatic body increases and a penetration path of the defrost water can be secured.

20 Claims, 36 Drawing Sheets

(51) Int. Cl.
  *F16L 59/065*   (2006.01)
  *F25D 11/02*    (2006.01)
  *F25D 17/06*    (2006.01)
  *F25D 21/14*    (2006.01)
  *F25D 23/06*    (2006.01)

(52) U.S. Cl.
  CPC ............ *F25D 17/06* (2013.01); *F25D 21/14* (2013.01); *F25D 23/06* (2013.01)

(56) References Cited

U.S. PATENT DOCUMENTS

| | | | |
|---|---|---|---|
| 2,989,156 | A | 6/1961 | Brooks et al. |
| 3,936,553 | A | 2/1976 | Rowe |
| 4,632,470 | A | 12/1986 | Jenkins et al. |
| 4,822,117 | A | 4/1989 | Boston, Jr. |
| 5,011,729 | A | 4/1991 | McAllister |
| 5,485,397 | A | 1/1996 | Yamazato |
| 5,897,181 | A | 4/1999 | Avendano et al. |
| 6,038,830 | A | 3/2000 | Hirath et al. |
| 6,178,763 | B1 | 1/2001 | Brancheau et al. |
| 6,350,002 | B1 | 2/2002 | Takaoka et al. |
| 6,485,122 | B2 | 11/2002 | Wolf |
| 6,725,624 | B2 | 4/2004 | Hirath |
| 7,407,240 | B2 | 8/2008 | Collins et al. |
| 9,170,046 | B2 | 10/2015 | Jung |
| 9,696,083 | B2 * | 7/2017 | Kim ................ F25D 25/00 |
| 9,702,615 | B1 | 7/2017 | Chartrand et al. |
| 10,274,247 | B2 | 4/2019 | Jeong et al. |
| 10,712,080 | B2 | 7/2020 | Westlake et al. |
| 10,753,669 | B2 | 8/2020 | Dherde et al. |
| 10,760,849 | B2 | 9/2020 | Jung et al. |
| 10,837,696 | B2 | 11/2020 | Jung et al. |
| 10,907,887 | B2 | 2/2021 | Jung et al. |
| 10,913,232 | B2 | 2/2021 | Dye et al. |
| 10,941,974 | B2 | 3/2021 | Jung et al. |
| 11,047,616 | B2 | 6/2021 | Jeong et al. |
| 11,079,171 | B2 | 8/2021 | Marinello et al. |
| 2002/0041134 | A1 | 4/2002 | Wolf et al. |
| 2002/0100250 | A1 | 8/2002 | Hirath et al. |
| 2003/0041612 | A1 | 3/2003 | Piloni |
| 2004/0012315 | A1 | 1/2004 | Grace et al. |
| 2004/0035142 | A1 | 2/2004 | Yoon et al. |
| 2004/0226956 | A1 | 11/2004 | Brooks |
| 2006/0130513 | A1 | 6/2006 | Chang et al. |
| 2007/0133192 | A1 | 6/2007 | Alessandro |
| 2007/0228907 | A1 | 10/2007 | Luisi et al. |
| 2008/0302441 | A1 | 12/2008 | Kelly et al. |
| 2009/0133225 | A1 | 5/2009 | Brugger |
| 2009/0284116 | A1 | 11/2009 | Gorz et al. |
| 2010/0252698 | A1 | 10/2010 | Dye et al. |
| 2010/0279055 | A1 | 11/2010 | Song et al. |
| 2010/0287974 | A1 * | 11/2010 | Cur ................ F25D 23/06 62/449 |
| 2011/0011106 | A1 | 1/2011 | Ahn et al. |
| 2012/0044131 | A1 | 2/2012 | Nussbächer et al. |
| 2012/0104923 | A1 | 5/2012 | Jung et al. |
| 2012/0125039 | A1 | 5/2012 | Hwang et al. |
| 2012/0128420 | A1 | 5/2012 | Schroeder et al. |
| 2012/0128920 | A1 | 5/2012 | Yoon et al. |
| 2012/0235551 | A1 | 9/2012 | Park et al. |
| 2013/0105494 | A1 | 5/2013 | Jung |
| 2013/0105495 | A1 | 5/2013 | Jung |
| 2013/0105496 | A1 | 5/2013 | Jung |
| 2013/0111942 | A1 | 5/2013 | Jung |
| 2013/0257256 | A1 * | 10/2013 | Allard ................ B23P 15/26 312/406 |
| 2014/0369063 | A1 | 12/2014 | Kleo et al. |
| 2015/0030800 | A1 | 1/2015 | Jung et al. |
| 2015/0245720 | A1 | 9/2015 | Isfort et al. |
| 2016/0047592 | A1 | 2/2016 | Rolek et al. |
| 2016/0109172 | A1 | 4/2016 | Kim et al. |
| 2016/0161174 | A1 | 6/2016 | Yi et al. |
| 2016/0220039 | A1 | 8/2016 | Chang et al. |
| 2016/0258671 | A1 | 9/2016 | Allard et al. |
| 2017/0184341 | A1 | 6/2017 | Grimm et al. |
| 2017/0292776 | A1 | 10/2017 | Kim |
| 2017/0336129 | A1 | 11/2017 | Cunningham |
| 2017/0370632 | A1 | 12/2017 | Jeong et al. |
| 2018/0180350 | A1 | 6/2018 | Yoon |
| 2018/0238610 | A1 | 8/2018 | TUNGetal |
| 2019/0120544 | A1 | 4/2019 | Deka |
| 2019/0120547 | A1 | 4/2019 | Staud et al. |
| 2019/0145697 | A1 | 5/2019 | Naik et al. |
| 2019/0310011 | A1 | 10/2019 | Marinello |
| 2020/0182393 | A1 | 6/2020 | Jung et al. |
| 2020/0370819 | A1 | 11/2020 | Kim et al. |
| 2021/0108852 | A1 | 4/2021 | Guizoni, Jr. et al. |
| 2021/0140704 | A1 | 5/2021 | Kim et al. |
| 2021/0190255 | A1 | 6/2021 | Allard et al. |

FOREIGN PATENT DOCUMENTS

| | | |
|---|---|---|
| CN | 100449231 | 1/2009 |
| CN | 101995140 | 3/2011 |
| CN | 102679663 | 9/2012 |
| CN | 102829593 | 12/2012 |
| CN | 103090615 | 5/2013 |
| CN | 103189696 | 7/2013 |
| CN | 103471314 | 12/2013 |
| CN | 103733007 | 4/2014 |
| CN | 105393073 | 3/2016 |
| CN | 105627657 | 6/2016 |
| CN | 106052248 | 10/2016 |
| CN | 107110593 | 8/2017 |
| DE | 19745825 | 4/1999 |
| EP | 1338854 | 8/2003 |
| EP | 1 808 657 | 7/2010 |
| EP | 2 589 904 | 5/2013 |
| EP | 2985551 | 2/2016 |
| EP | 3 193 110 | 7/2017 |
| GB | 890372 | 2/1962 |
| JP | S58-64239 | 4/1983 |
| JP | H04-327779 | 11/1992 |
| JP | 08-303937 | 11/1996 |
| JP | 2004-293913 | 10/2004 |
| JP | 2008-089244 | 4/2008 |
| JP | 2013-002655 | 1/2013 |
| JP | 2014-126219 | 7/2014 |
| KR | 10-0343719 | 7/2002 |
| KR | 10-2006-0071848 | 6/2006 |
| KR | 10-0725790 B1 | 6/2007 |
| KR | 10-2011-0006997 | 1/2011 |
| KR | 10-2015-0012712 | 2/2015 |
| KR | 10-2016-0044842 | 4/2016 |
| KR | 10-1631904 B1 | 6/2016 |
| KR | 10-2017-0016187 A | 2/2017 |
| RU | 2008 111 149 | 8/2006 |
| RU | 2315925 C2 | 1/2008 |
| RU | 2468316 C2 | 11/2012 |
| SU | 1742602 A1 | 6/1992 |
| SU | 1781519 | 12/1992 |
| WO | WO 2006/011112 | 2/2006 |
| WO | WO 2011/007959 | 1/2011 |
| WO | WO 2012/050308 | 4/2012 |
| WO | WO 2013/164176 | 11/2013 |
| WO | WO 2014/196609 | 12/2014 |
| WO | WO 2016/105019 | 6/2016 |
| WO | WO 2017/023094 | 2/2017 |
| WO | WO 2017/023095 | 2/2017 |
| WO | WO 2017/080767 | 5/2017 |
| WO | WO 2017/180126 | 10/2017 |

OTHER PUBLICATIONS

International Search Report and Written Opinion dated Mar. 20, 2019 issued in Application No. PCT/KR2018/015706.
International Search Report and Written Opinion dated Mar. 20, 2019 issued in Application No. PCTKR2018/015710.
International Search Report and Written Opinion dated Mar. 28, 2019 issued in Application No. PCT/KR2018/015713.
Russian Office Action dated Mar. 30, 2021 issued in RU Application No. 2020122677/10(039004).

(56) References Cited

OTHER PUBLICATIONS

Russian Office Action dated Apr. 20, 2021 issued in RU Application No. 2020122682/10(039009).
United States Office Action dated Jul. 1, 2021 issued in co-pending related U.S. Appl. No. 16/766,233.
European Search Report dated Jul. 29, 2021 issued in Application No. 18889271.5.
Chinese Office Action dated Jul. 28, 2021 issued in Application No. 201880080796.2.
Chinese Office Action dated Aug. 4, 2021 issued in Application No. 201880080831.0.
European Search Report dated Jul. 29, 2021 issued in Application No. 18887635.3.
Chinese Office Action dated Sep. 2, 2021 issued in CN Application No. 201880080793.9.
United States Office Action dated Sep. 28, 2021 issued in co-pending related U.S. Appl. No. 16/766,562.
European Search Report dated Aug. 9, 2021 issued in EP Application No. 18889452.1.
Chinese Office Action dated Aug. 20, 2021 issued in CN Application No. 201880080785.4.
Russian Office Action dated May 11, 2021 issued in Application 2020122686/10(039013).
International Search Report (with English Translation) and Written Opinion dated Mar. 20, 2019 issued in Application No. PCT/KR2018/015709.
U.S. Appl. No. 16/766,562, filed May 22, 2020.
U.S. Appl. No. 16/766,215, filed May 21, 2020.
U.S. Appl. No. 16/766,233, filed May 21, 2020.
U.S. Appl. No. 16/768,379, filed May 29, 2020.
U.S. Appl. No. 16/767,899, filed May 28, 2020.
European Search Report dated Jul. 22, 2021 issued in EP Application No. 18888053.8.
Chinese Office Action dated Aug. 23, 2021 issued in CN Application No. 201880081068.3.
U.S. Office Action dated Oct. 28, 2021 issued in U.S. Appl. No. 16/766,215.

* cited by examiner

[Fig. 1]
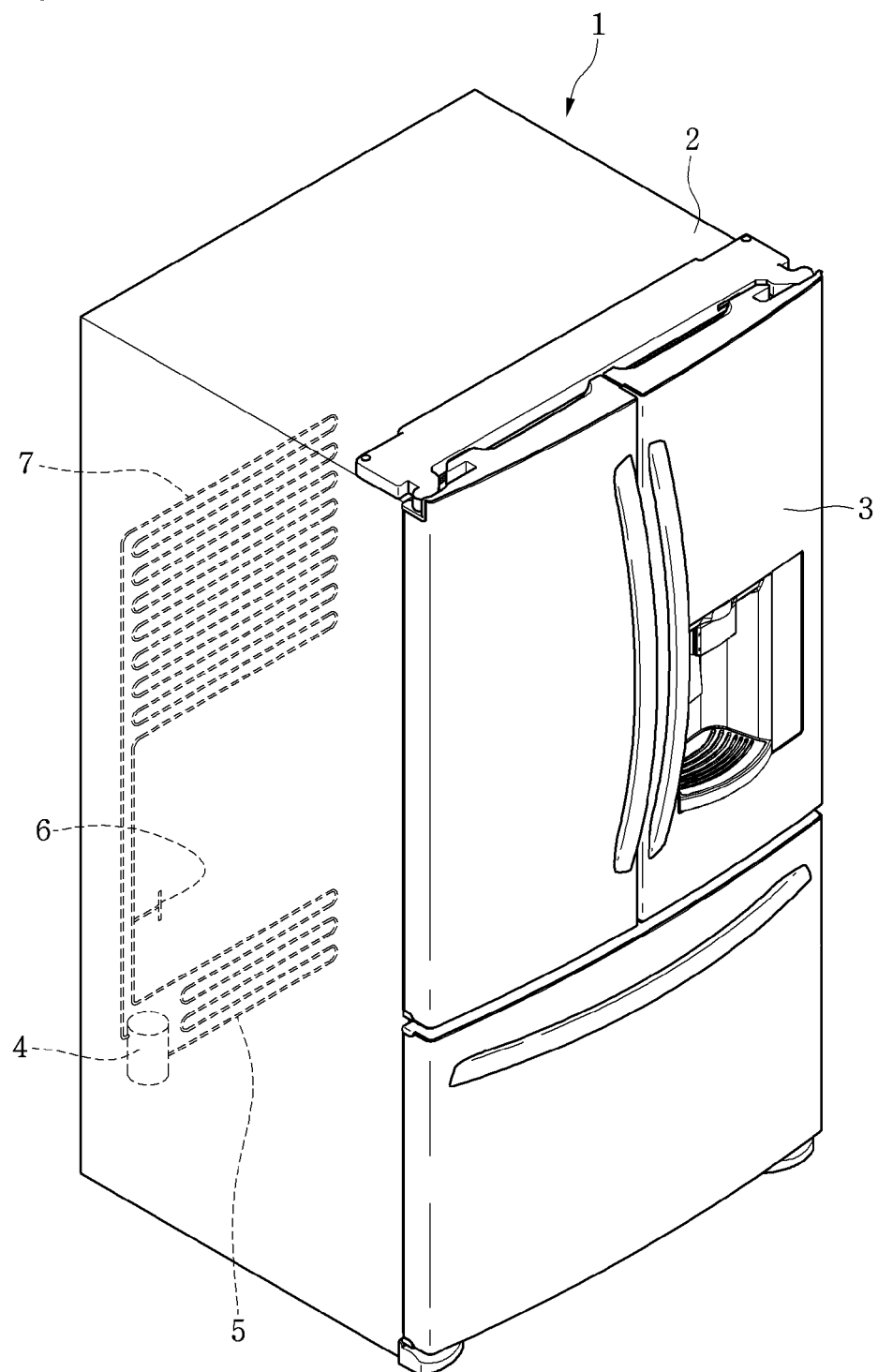

[Fig. 2]
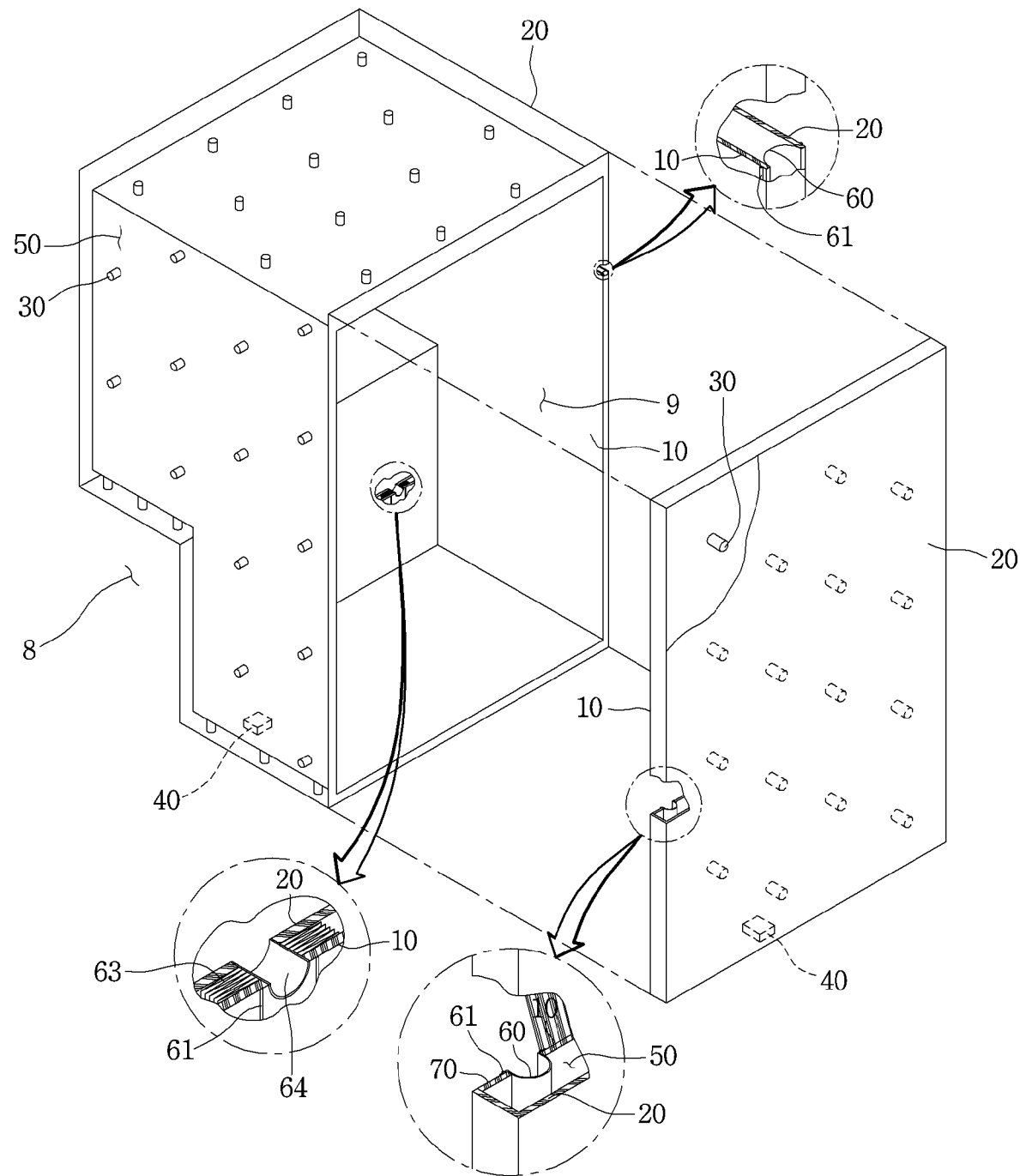

[Fig. 3]
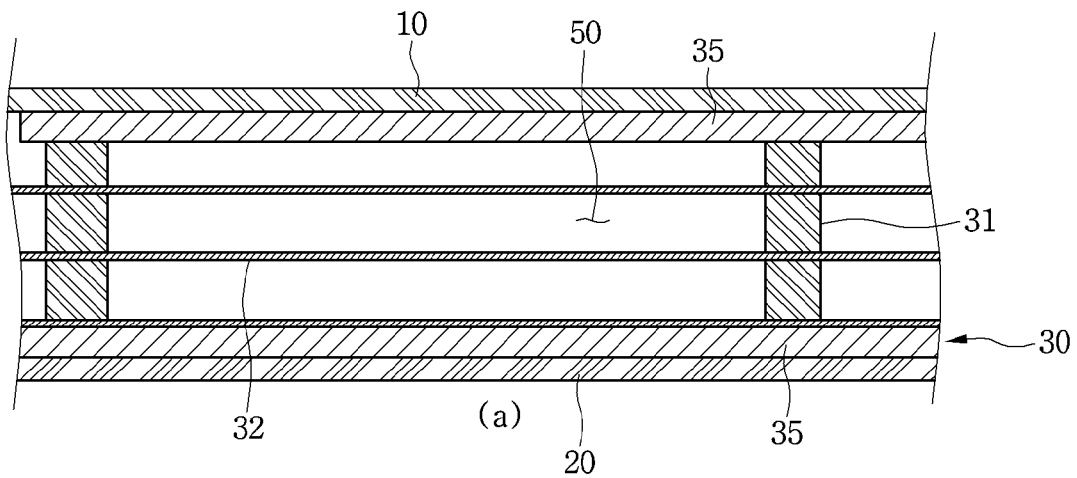
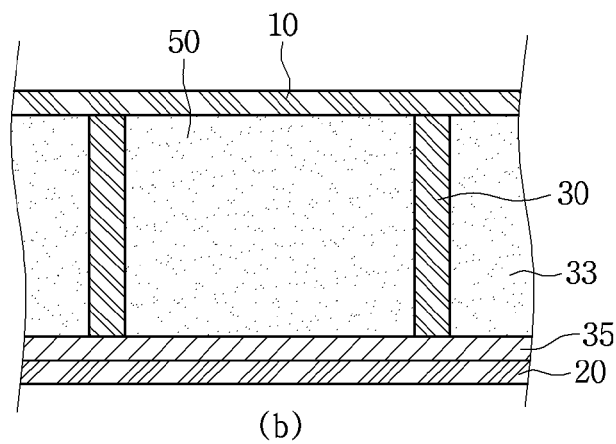
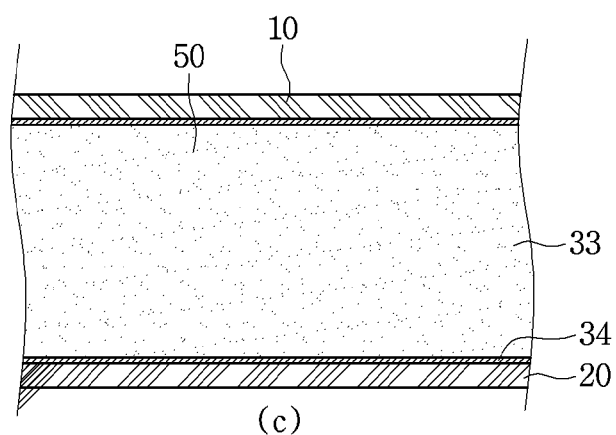

[Fig. 4]
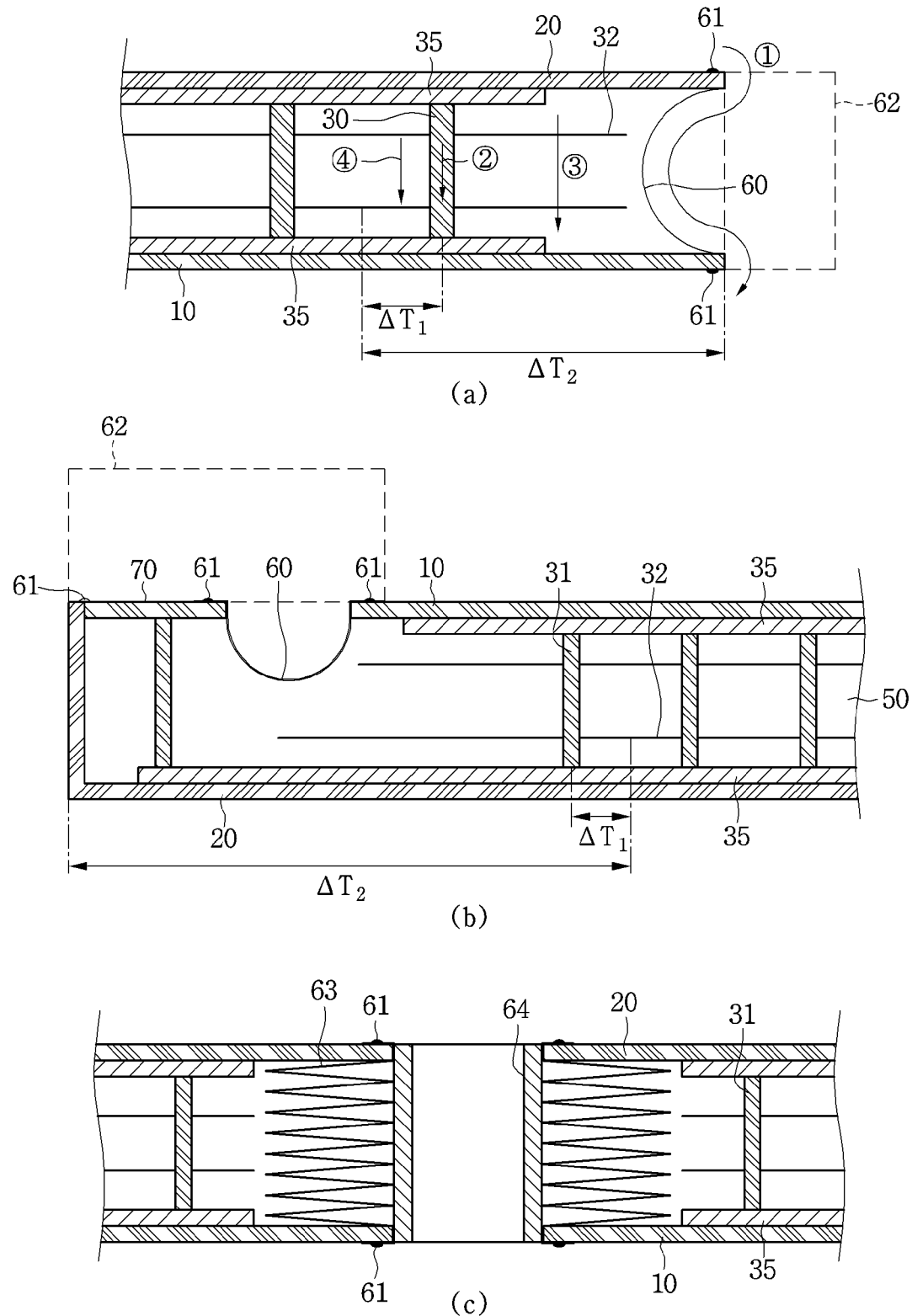

[Fig. 5]
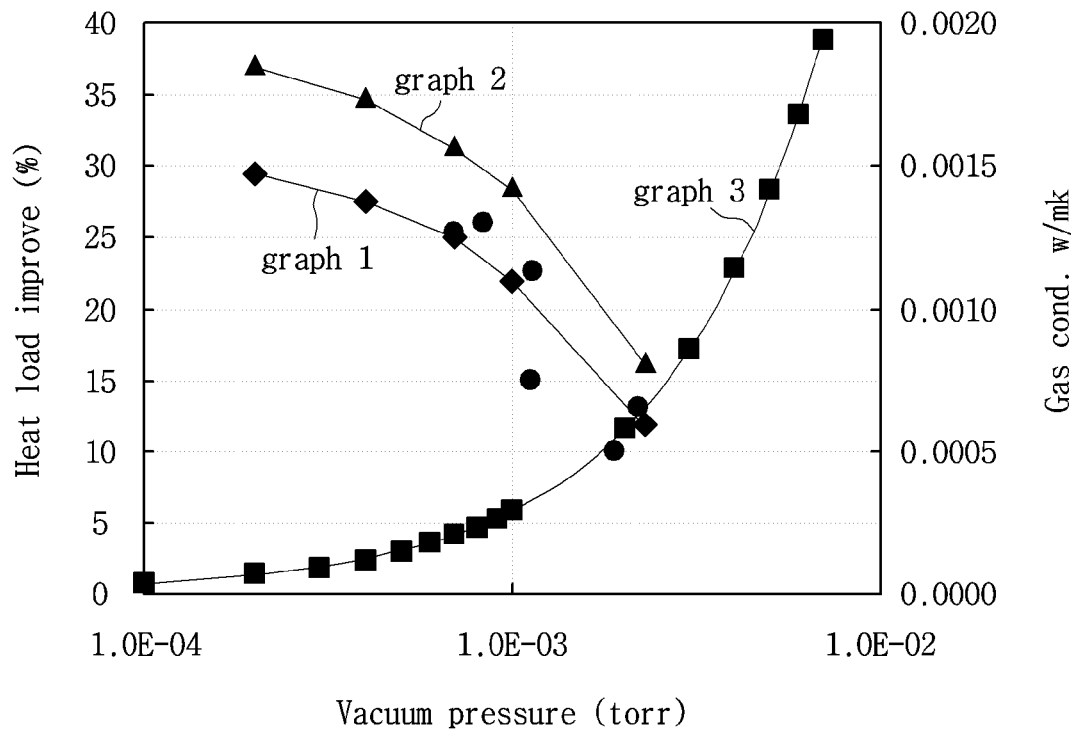
[Fig. 6]
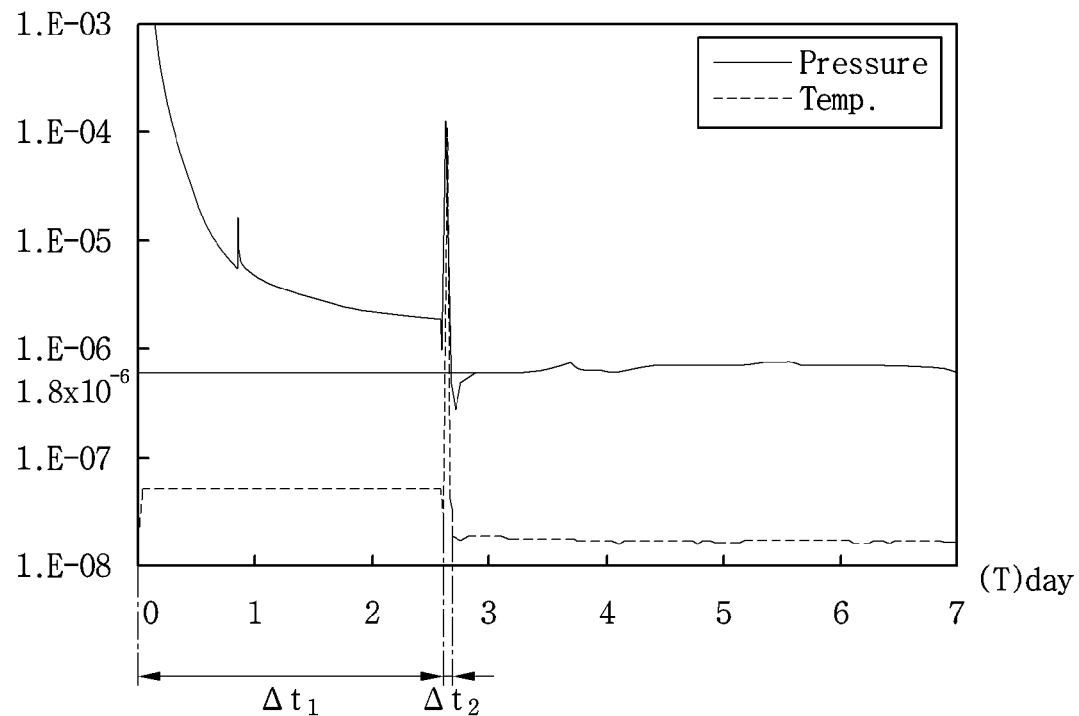

[Fig. 7]
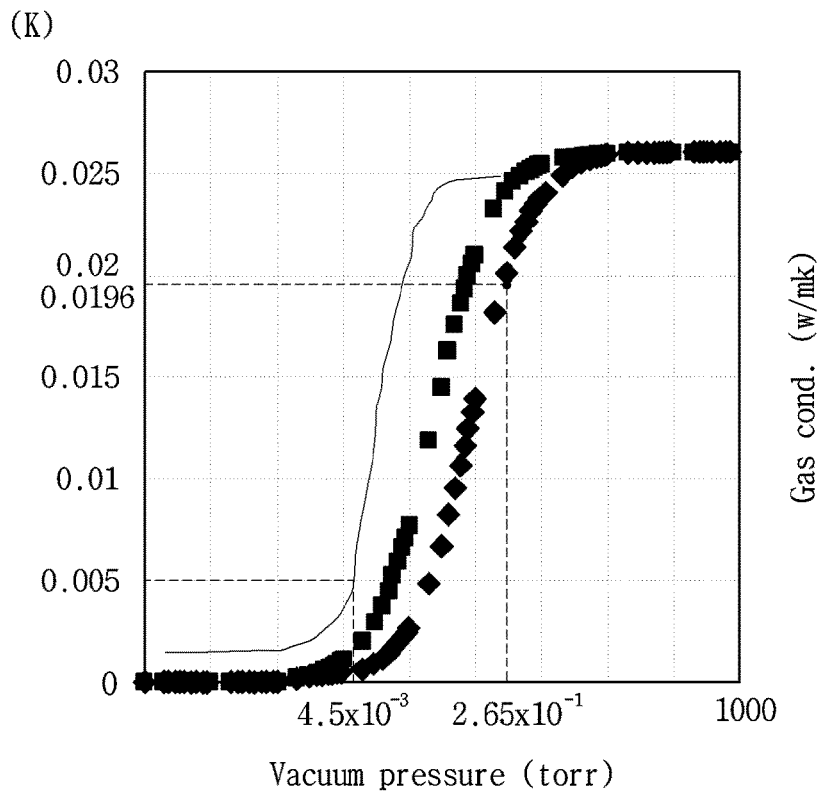
[Fig. 8]
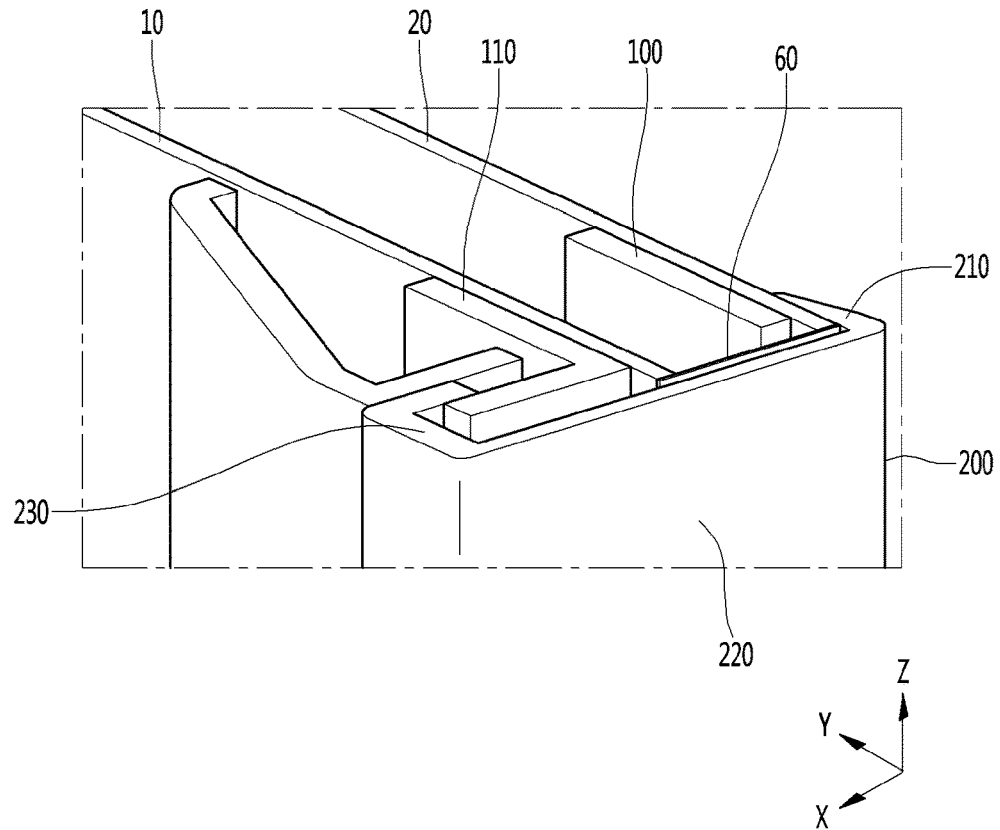

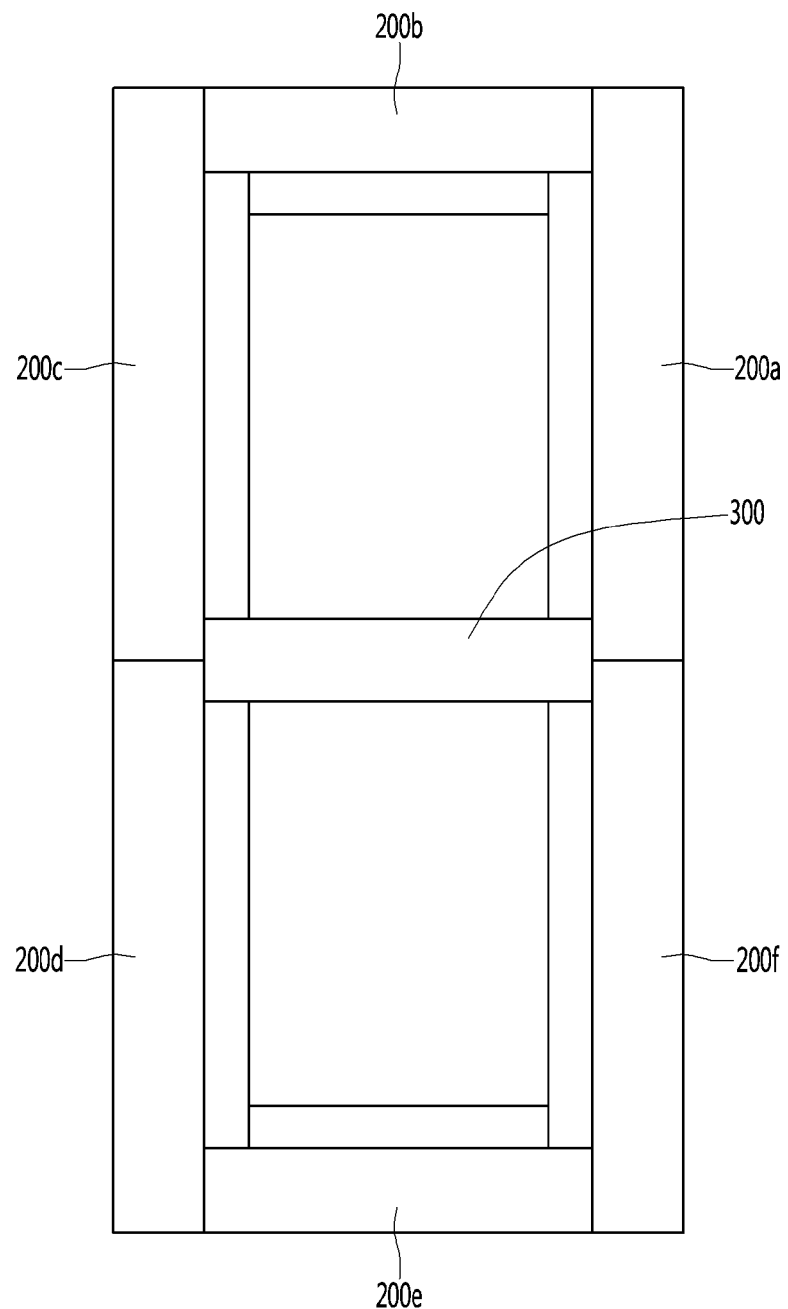
[Fig. 9]

[Fig. 10]
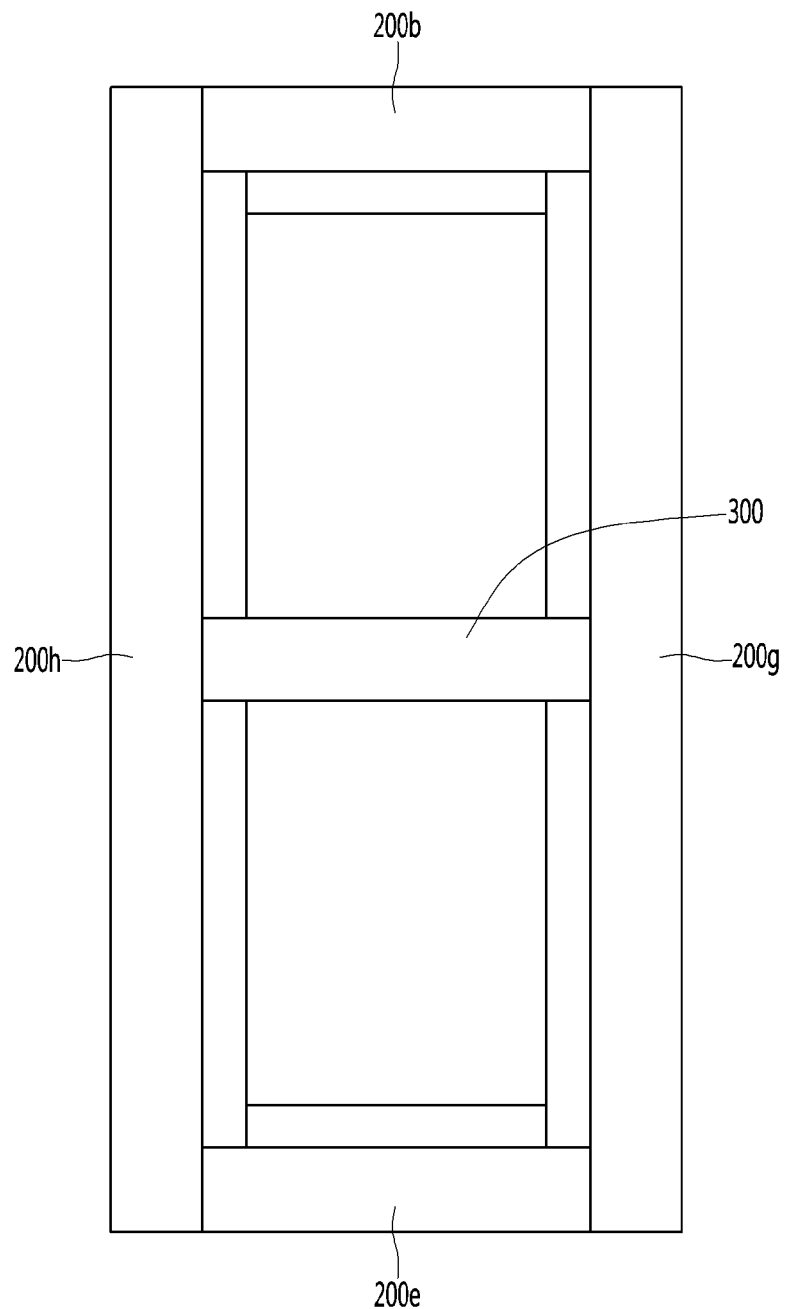

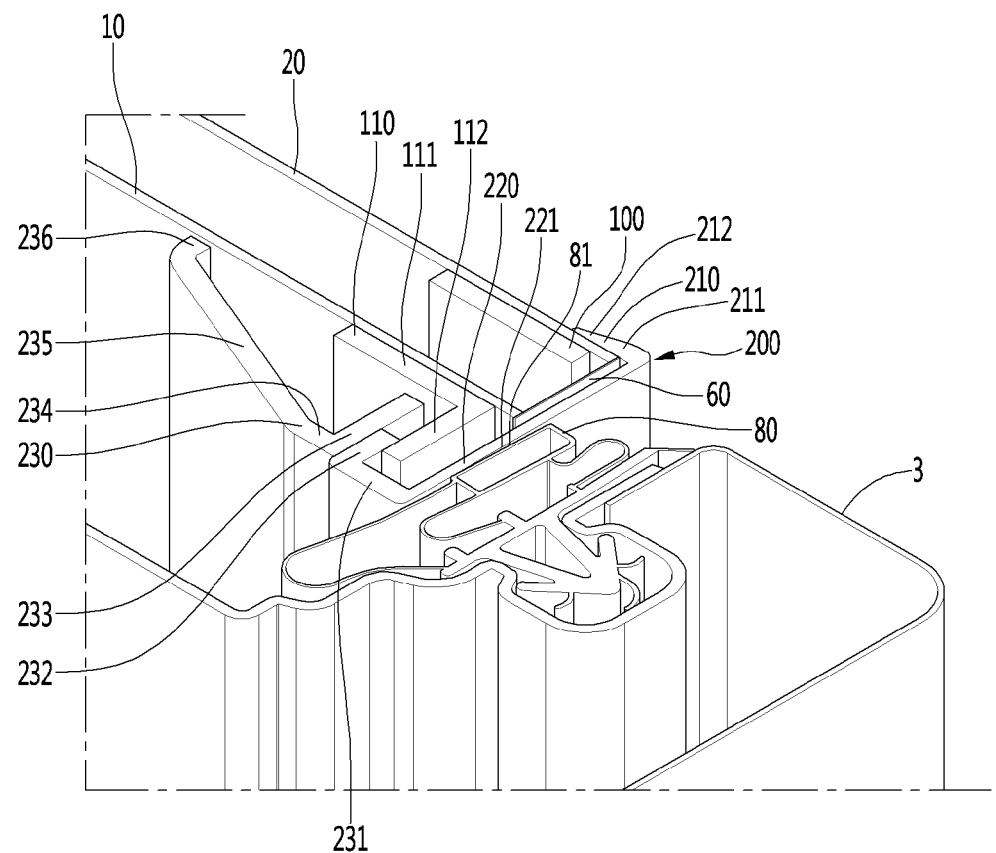
[Fig. 11]

[Fig. 12]
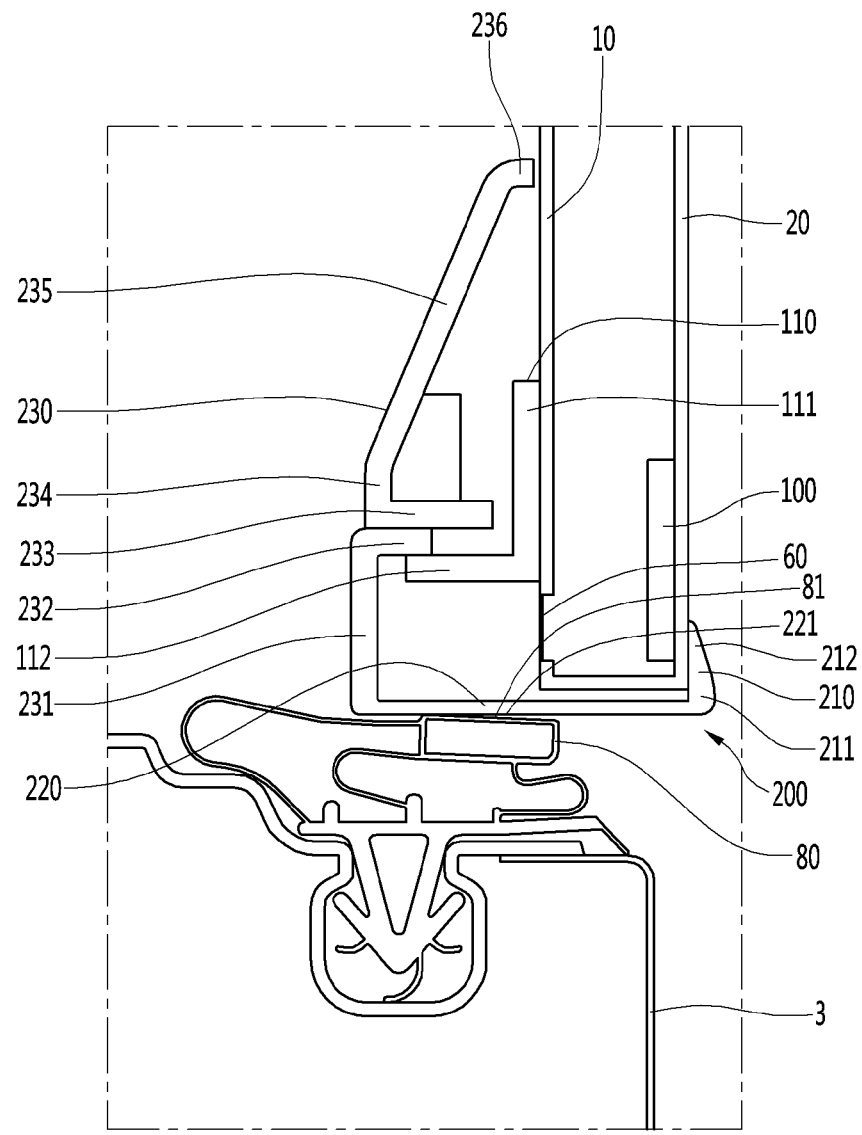

[Fig. 13]
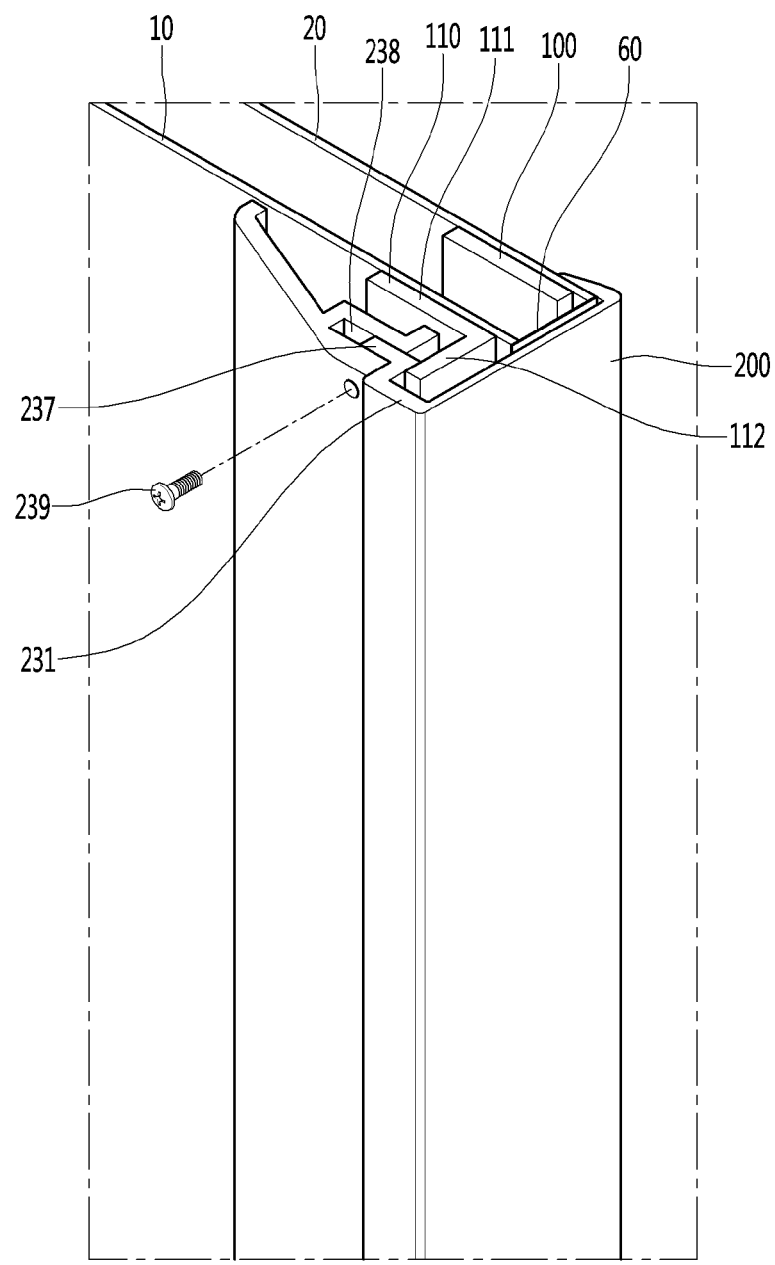

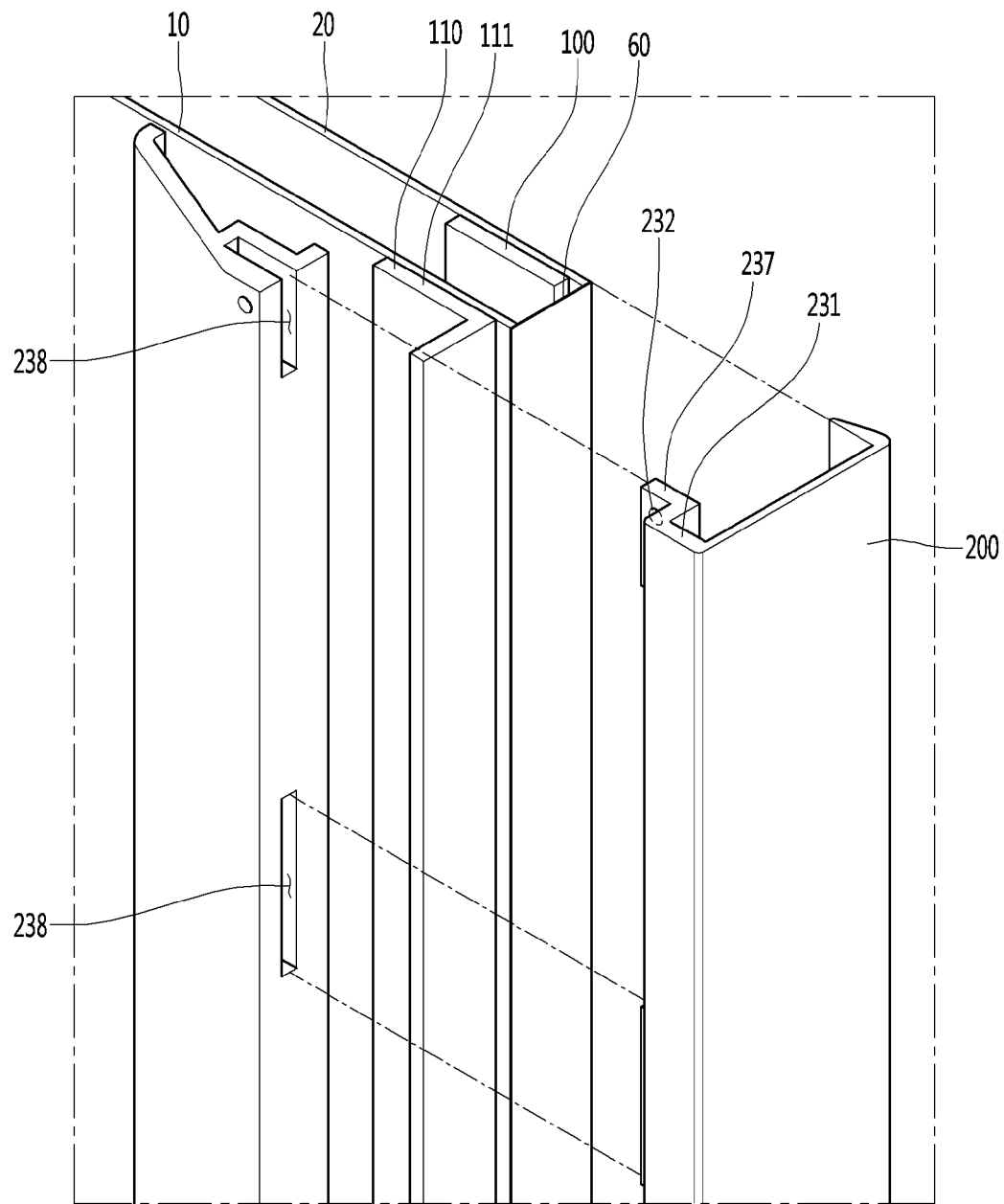
[Fig. 14]

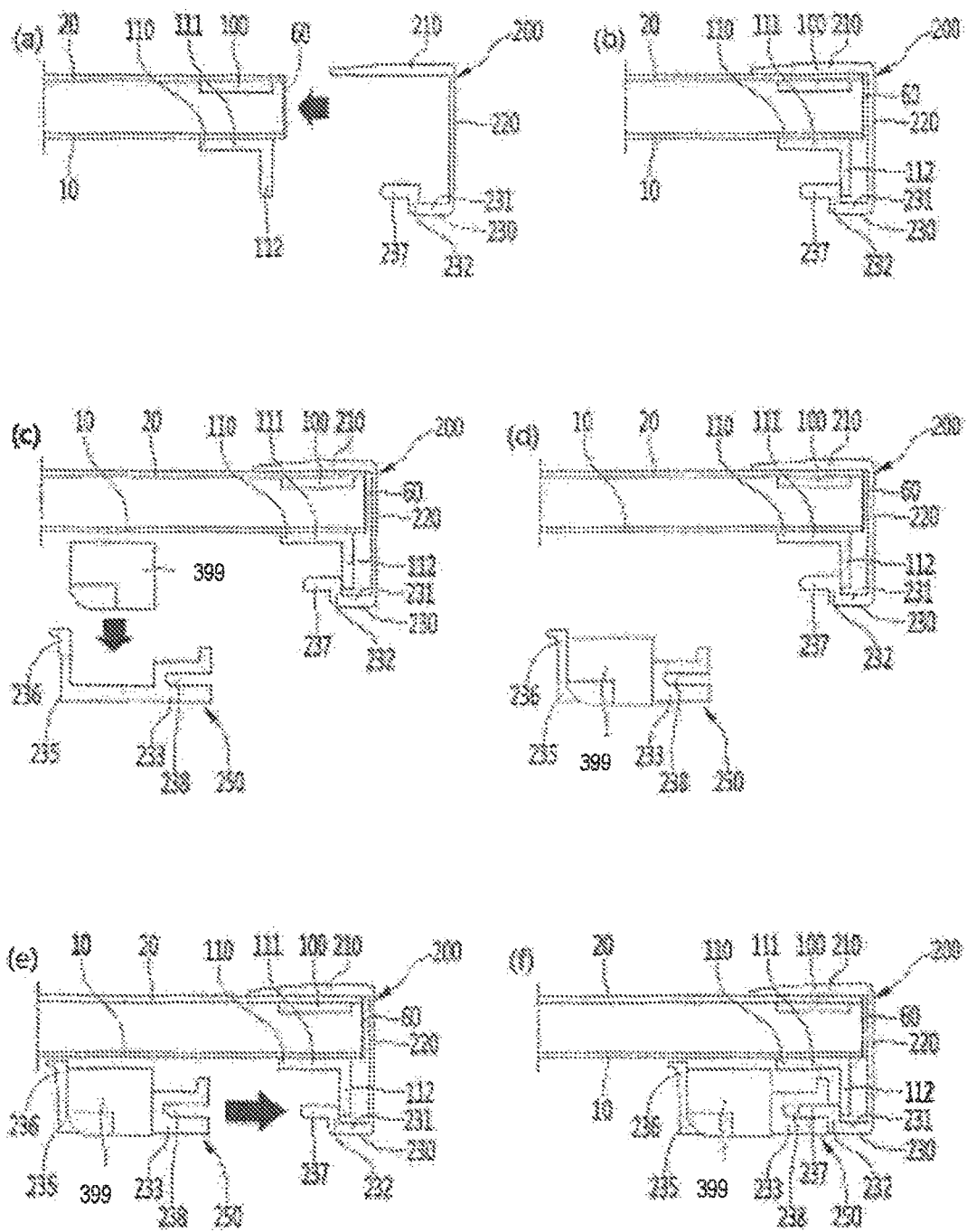

[Fig. 16]
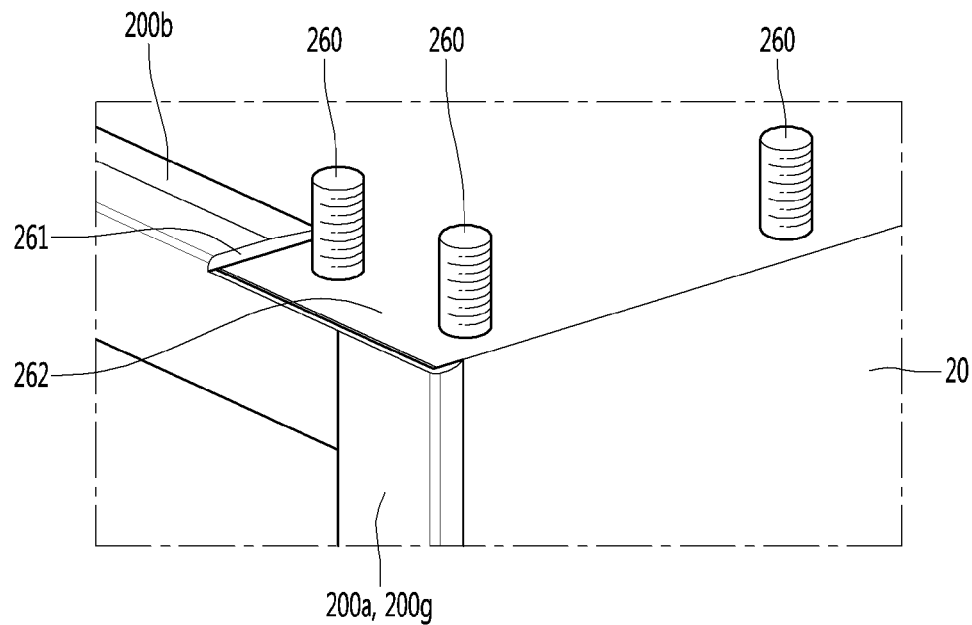
[Fig. 17]
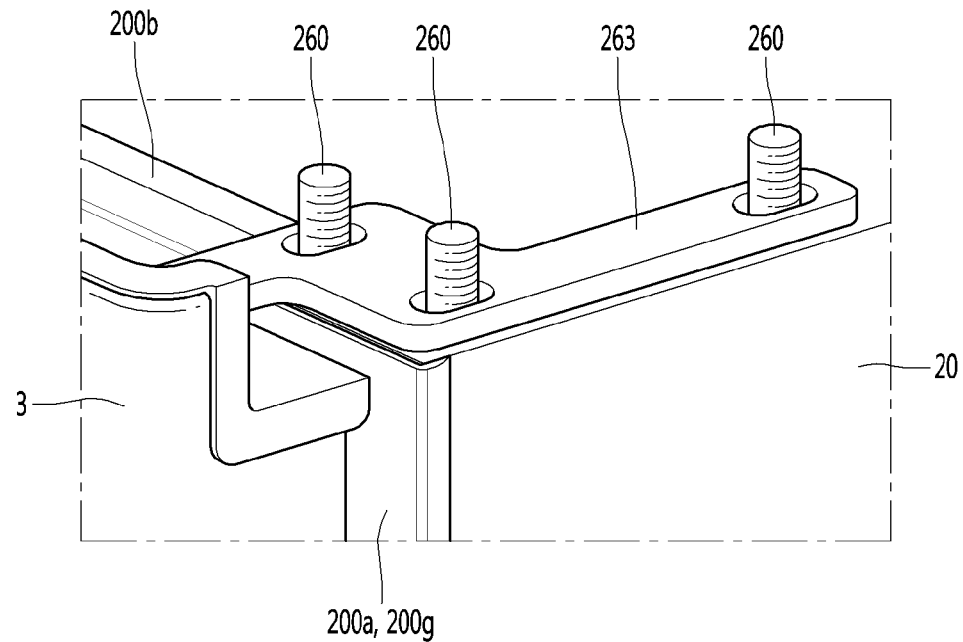

[Fig. 18]
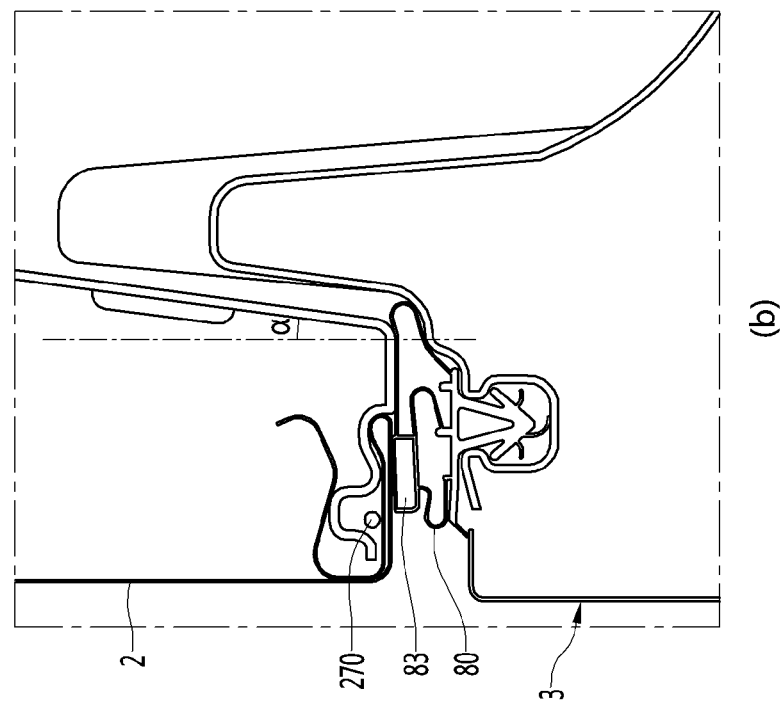
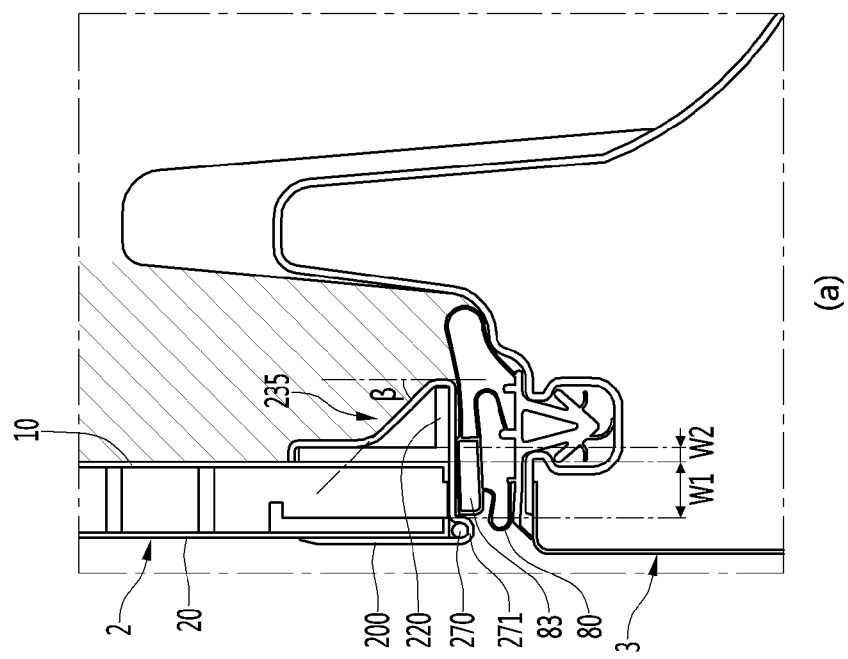

[Fig. 19]
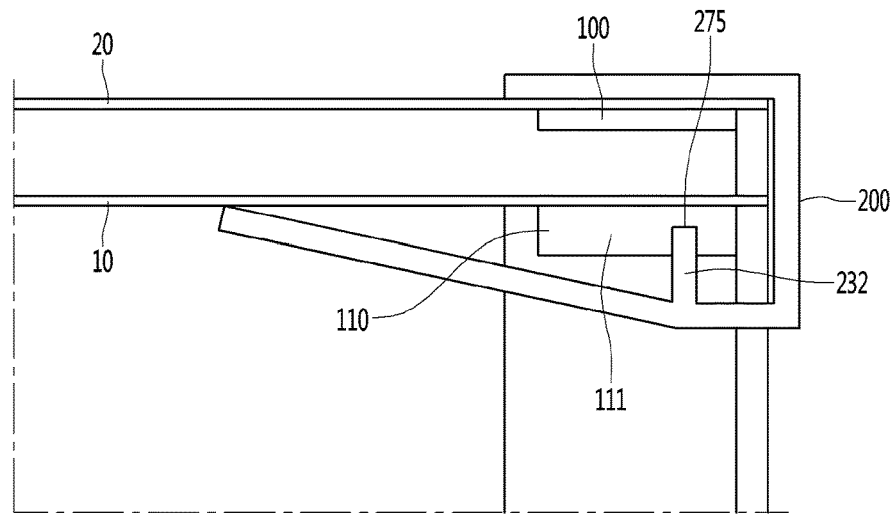
[Fig. 20]
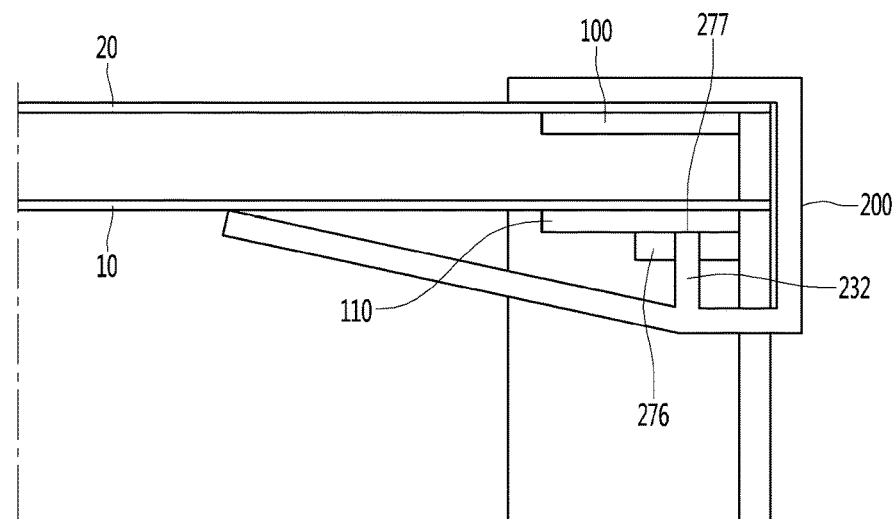
[Fig. 21]
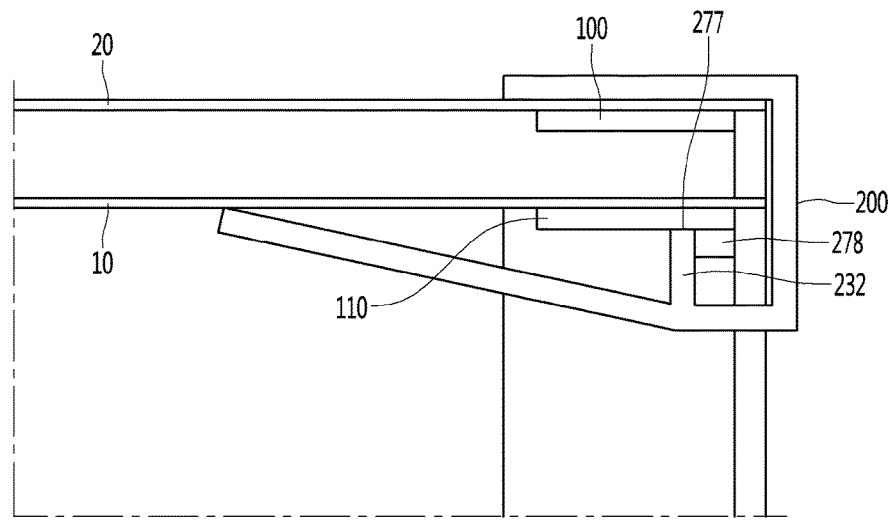

[Fig. 22]
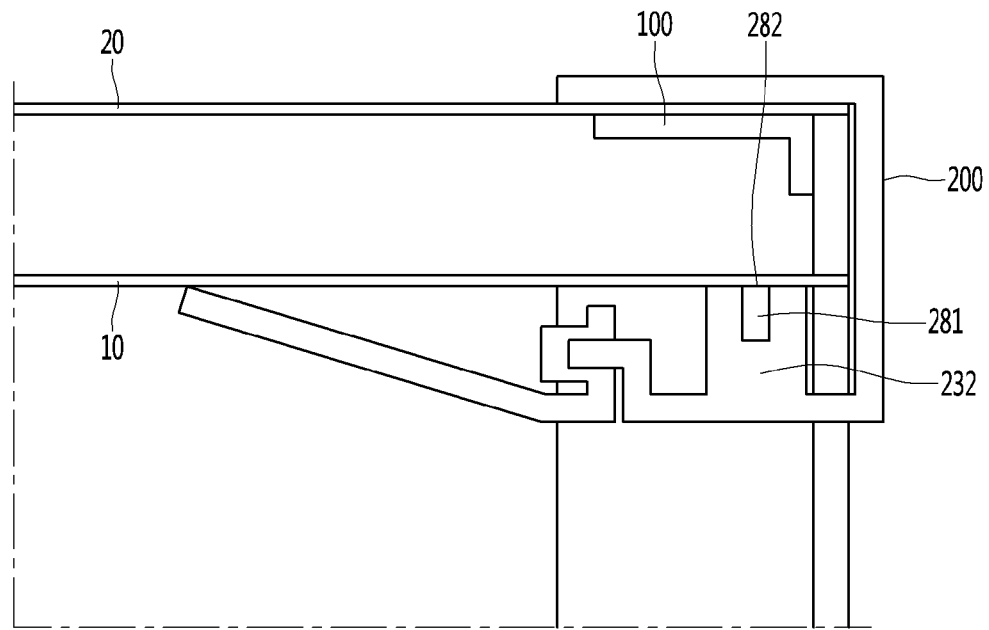
[Fig. 23]
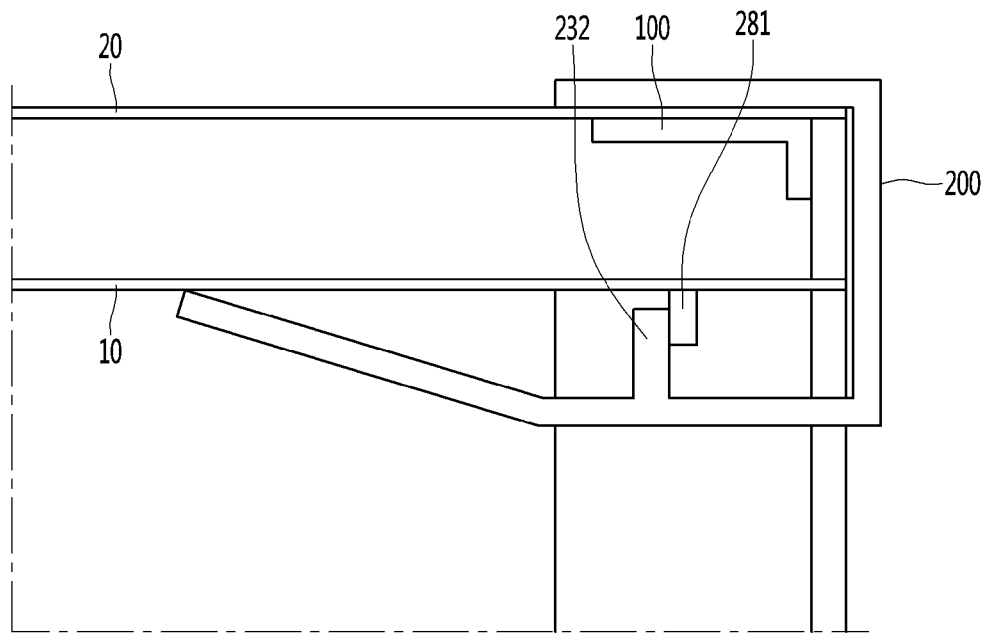

[Fig. 24]
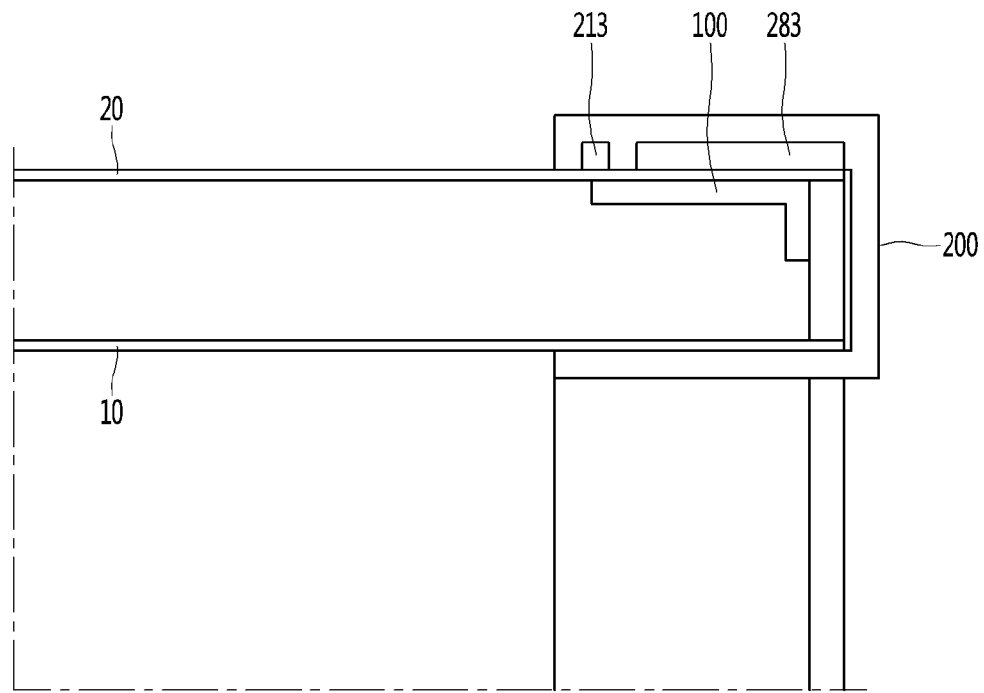
[Fig. 25]
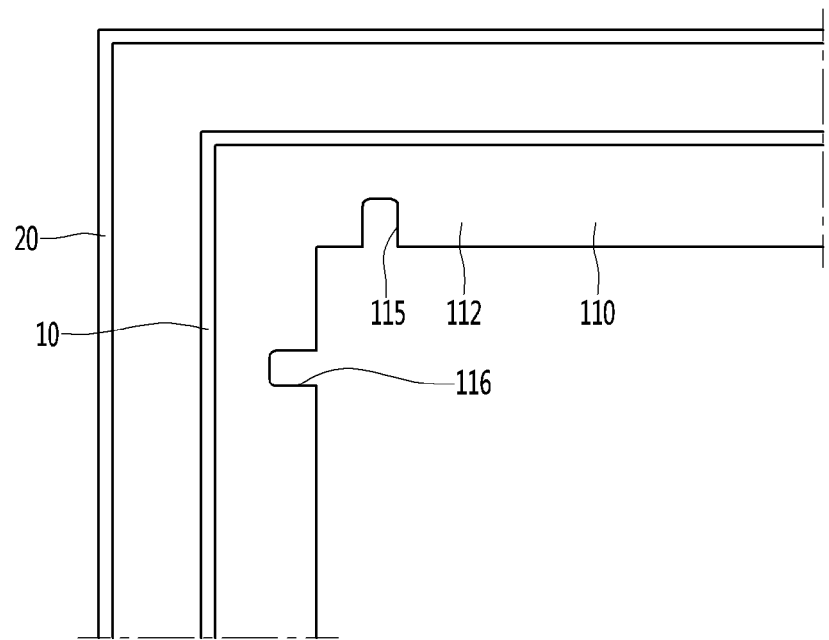

[Fig. 26]
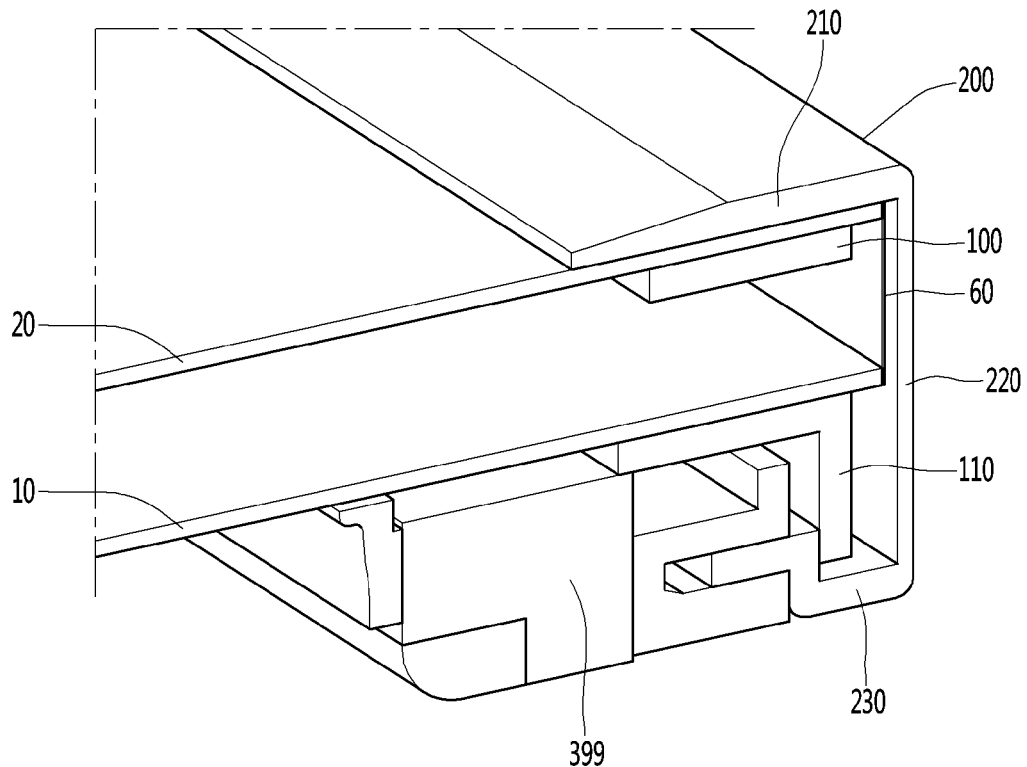
[Fig. 27]
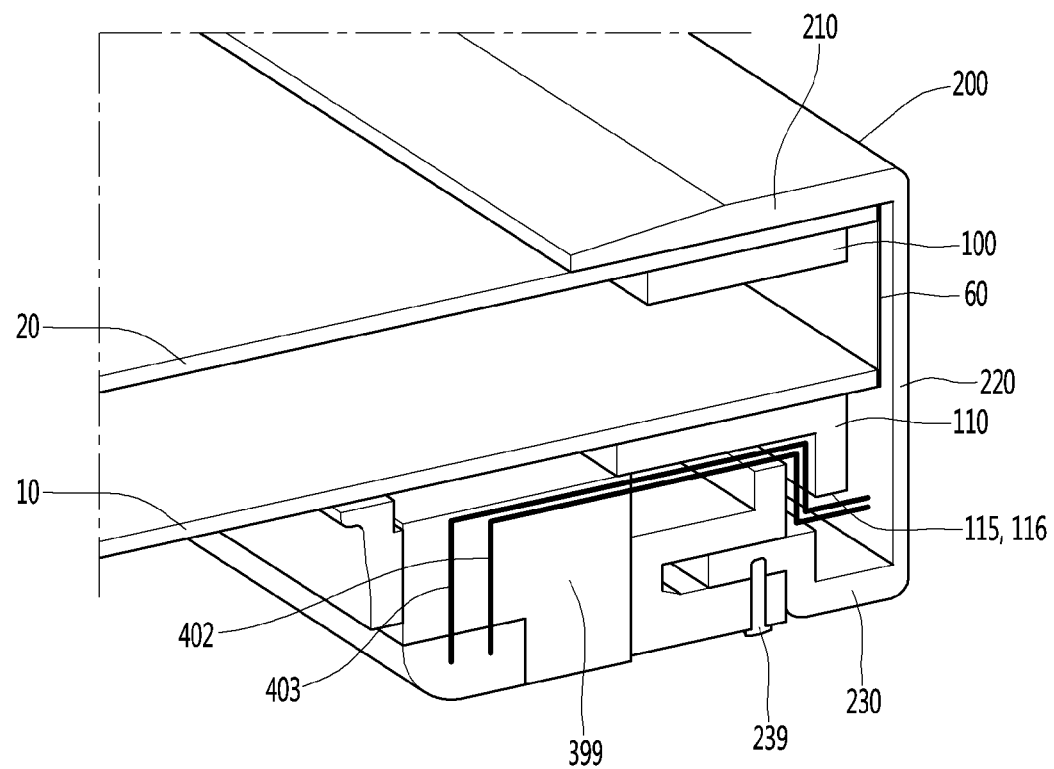

[Fig. 28]
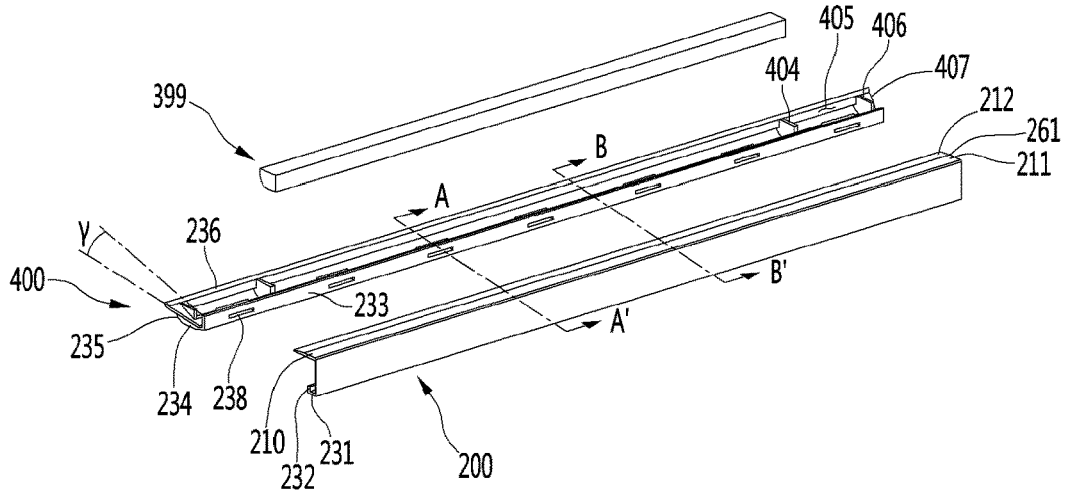
[Fig. 29]
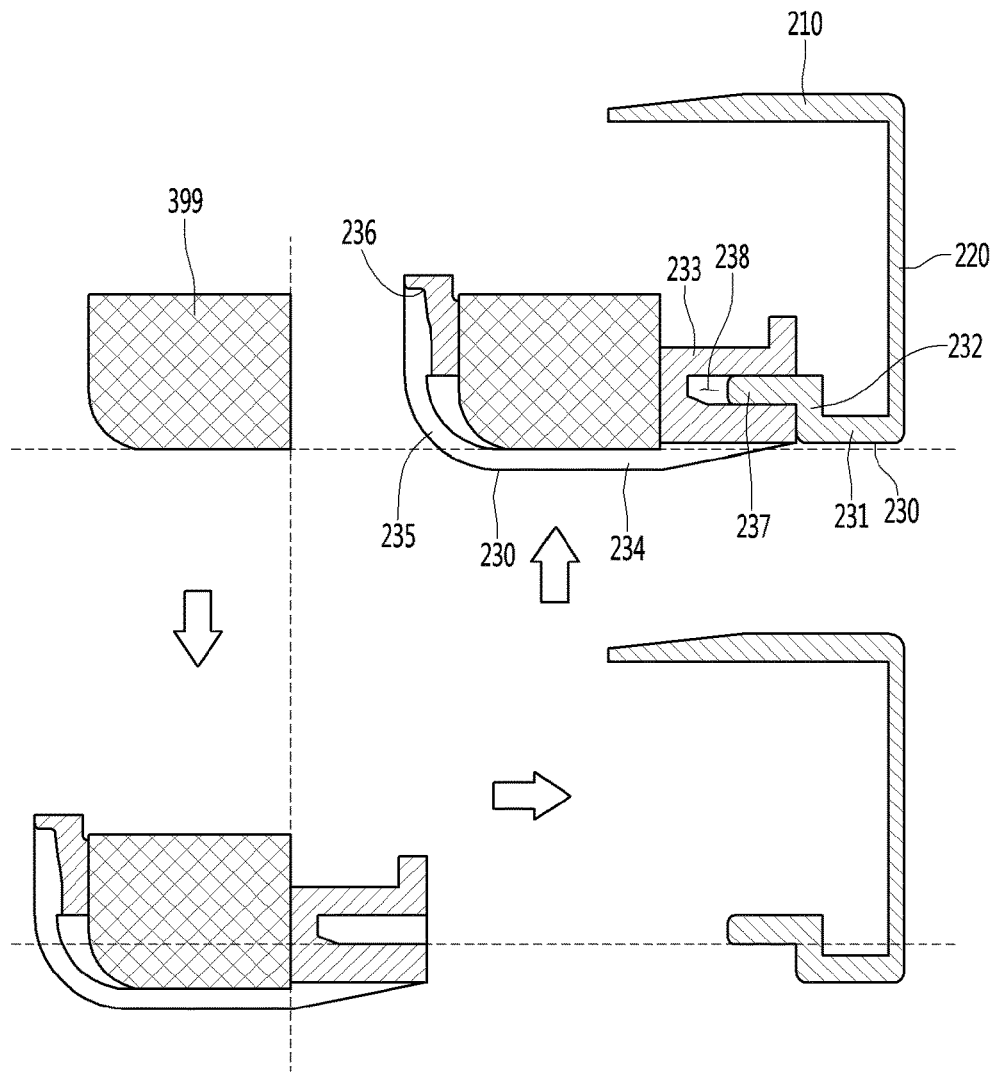

[Fig. 30]
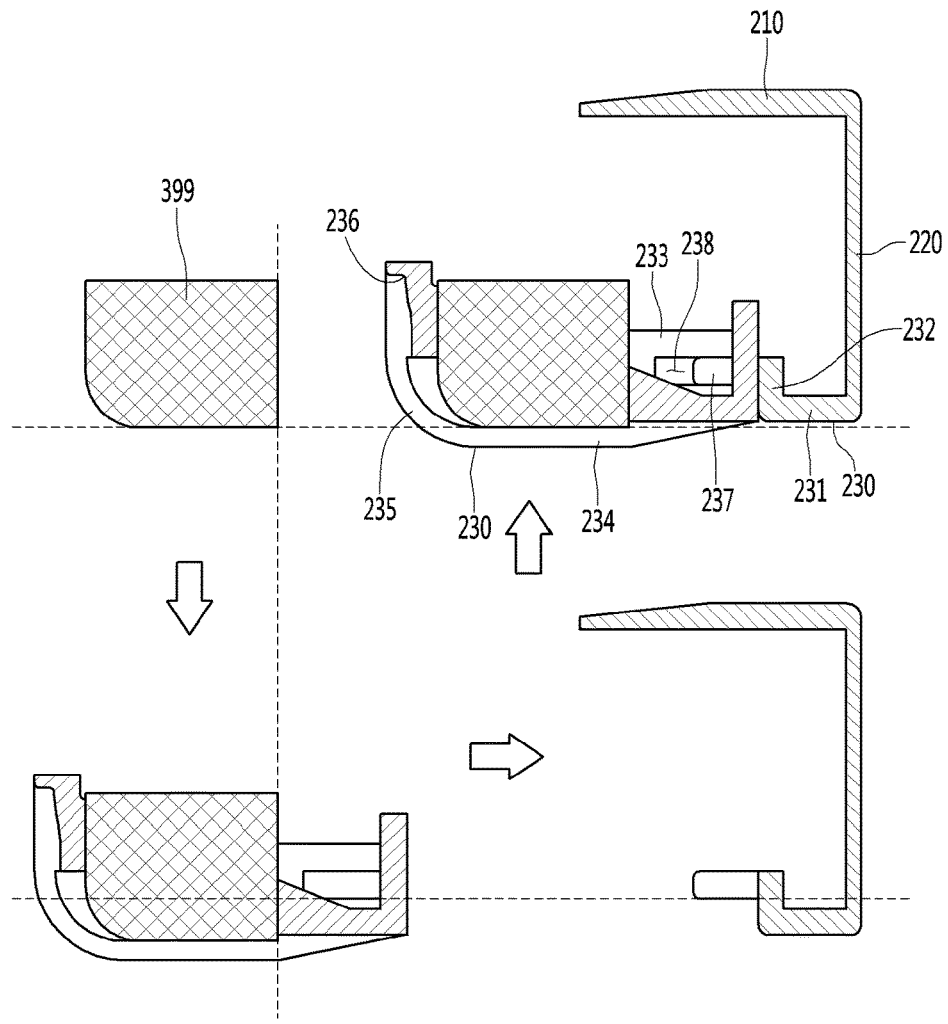
[Fig. 31]
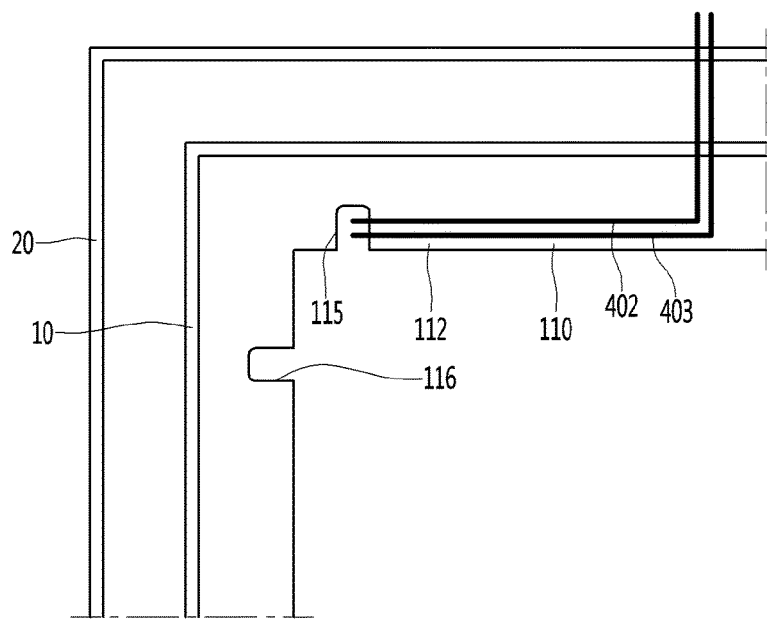

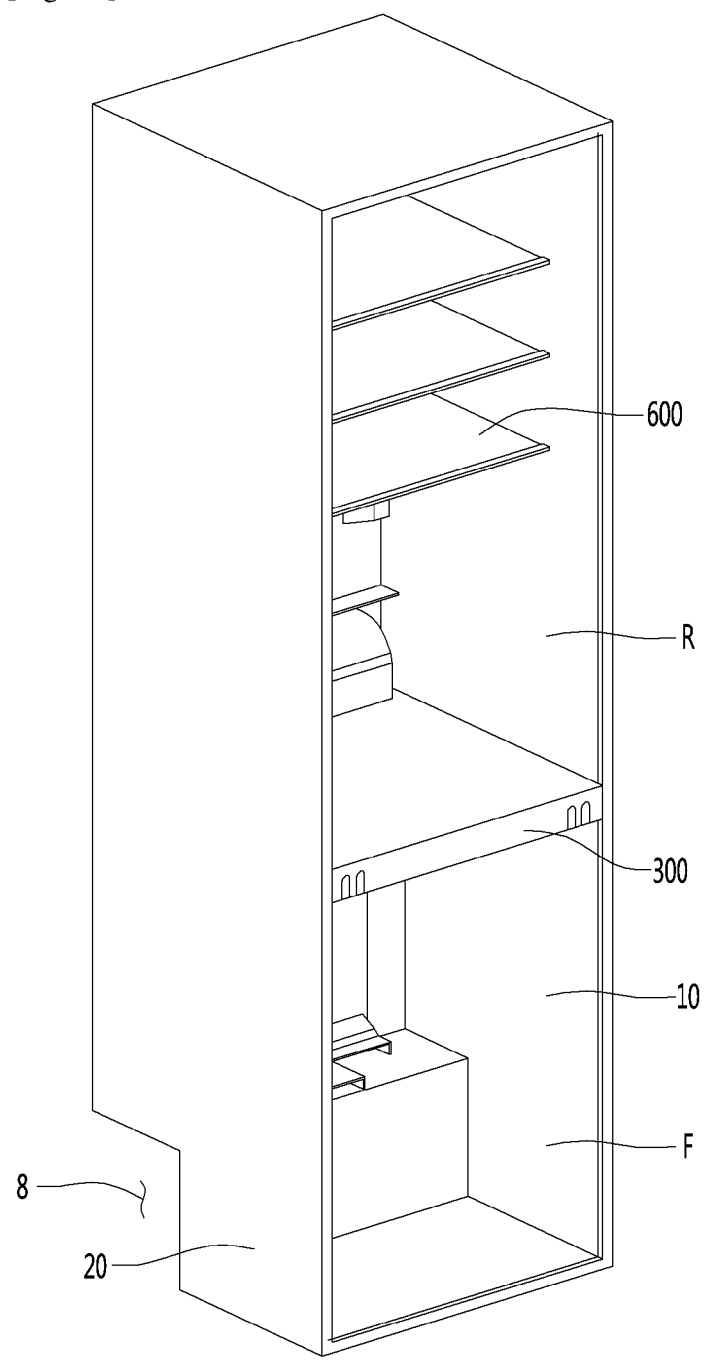
[Fig. 32]

[Fig. 33]
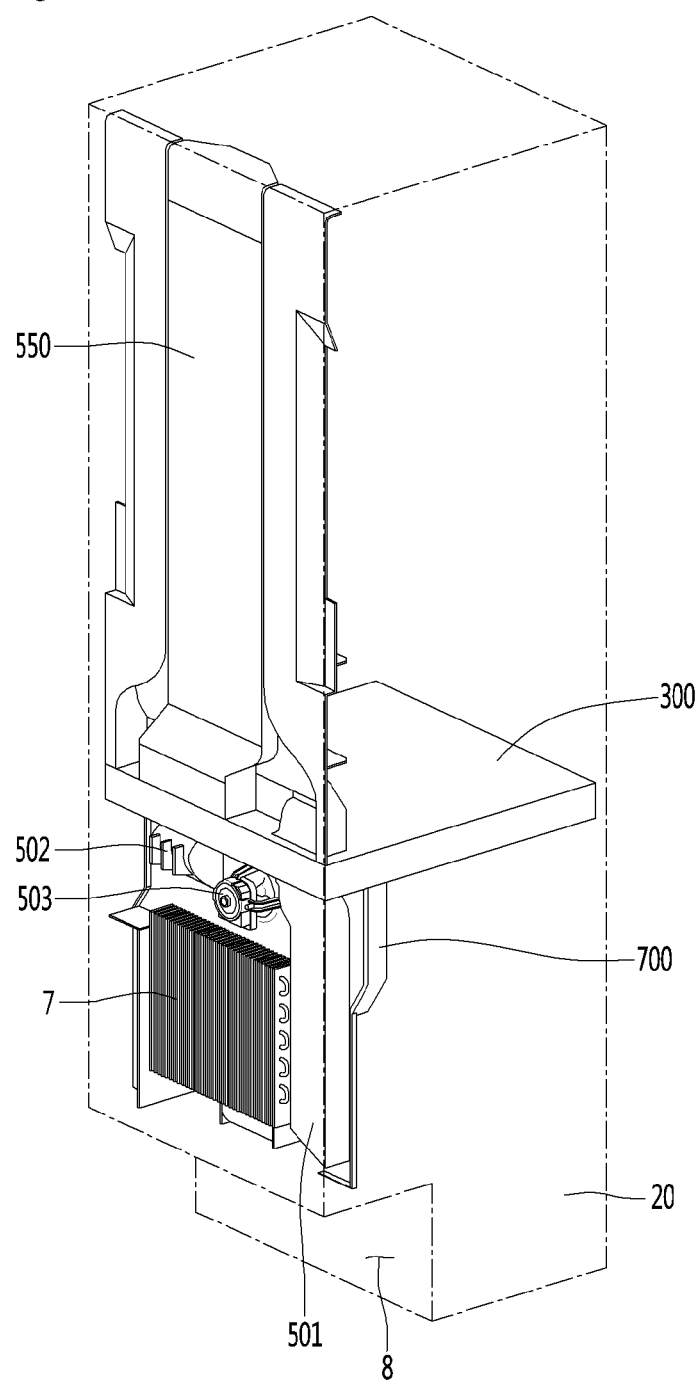

[Fig. 34]
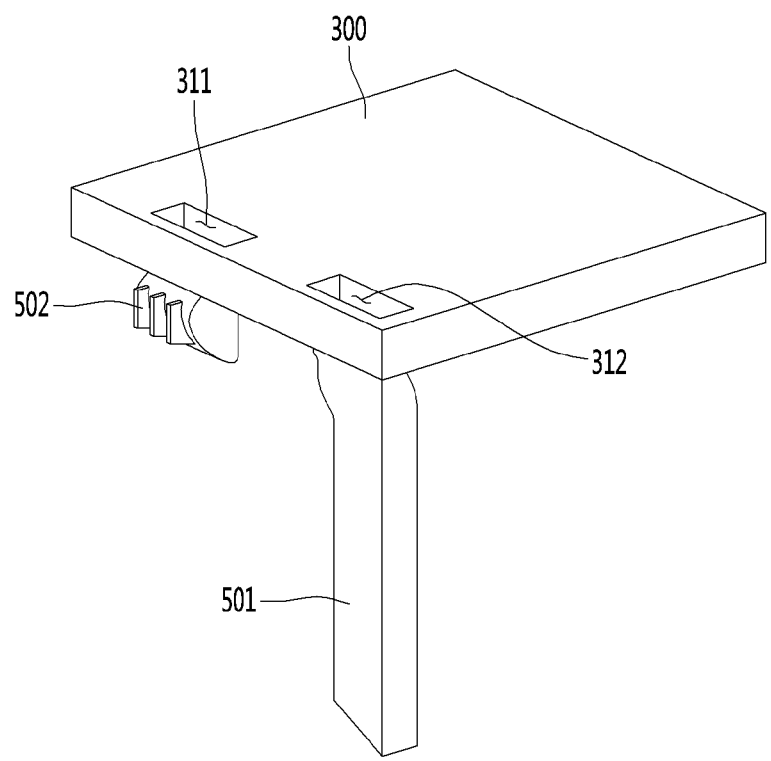

[Fig. 35]
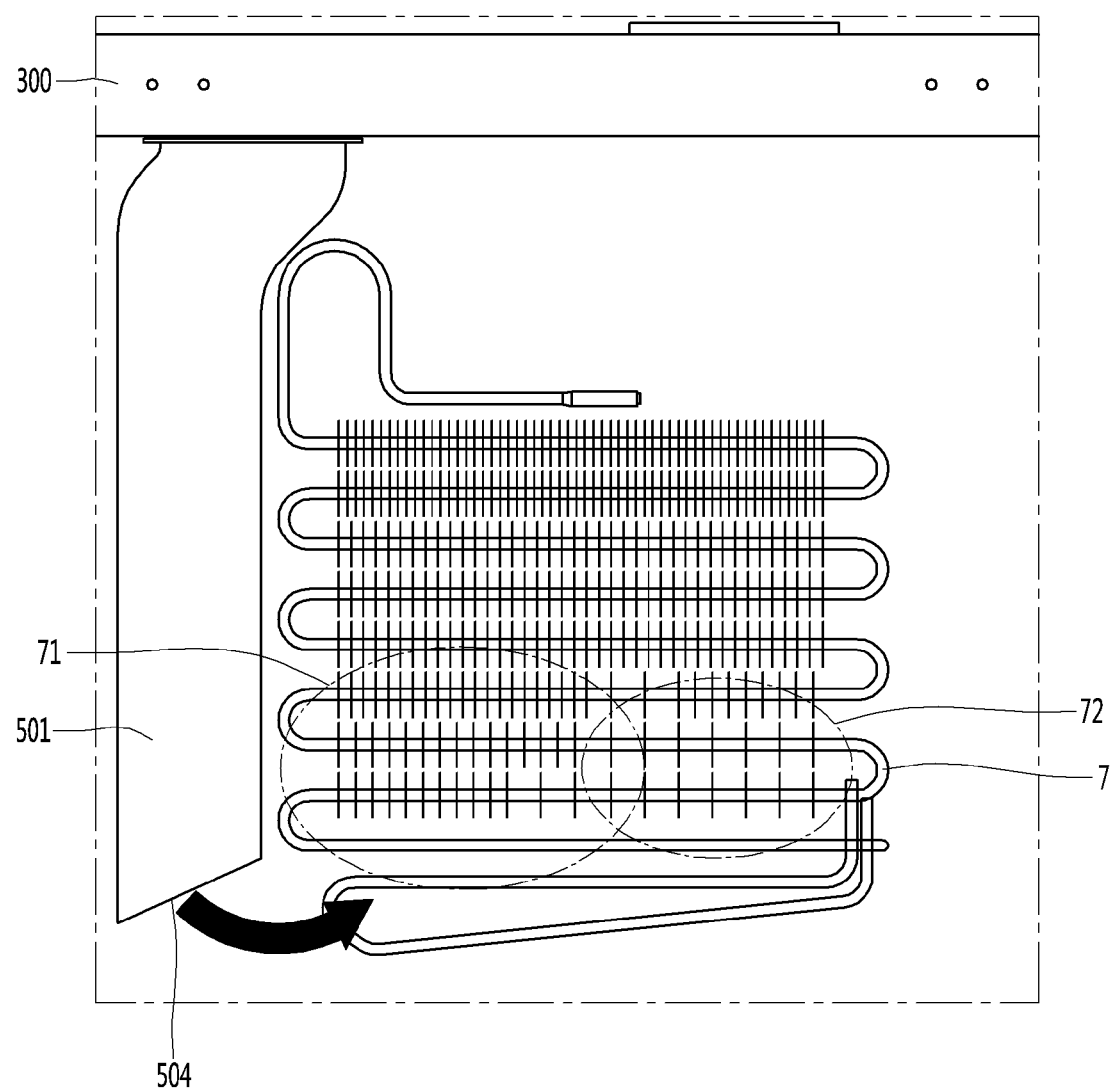

[Fig. 36]
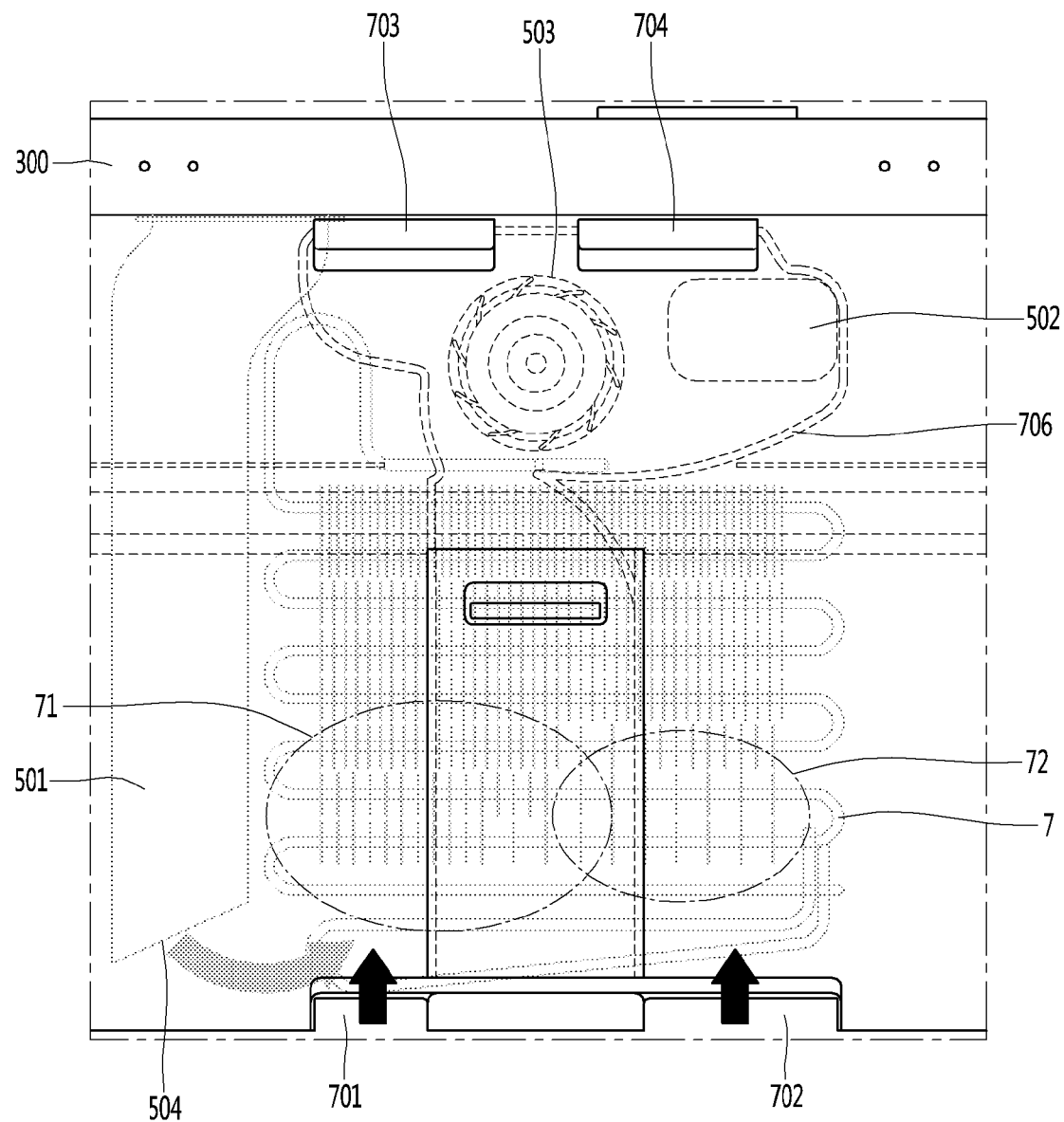

[Fig. 37]
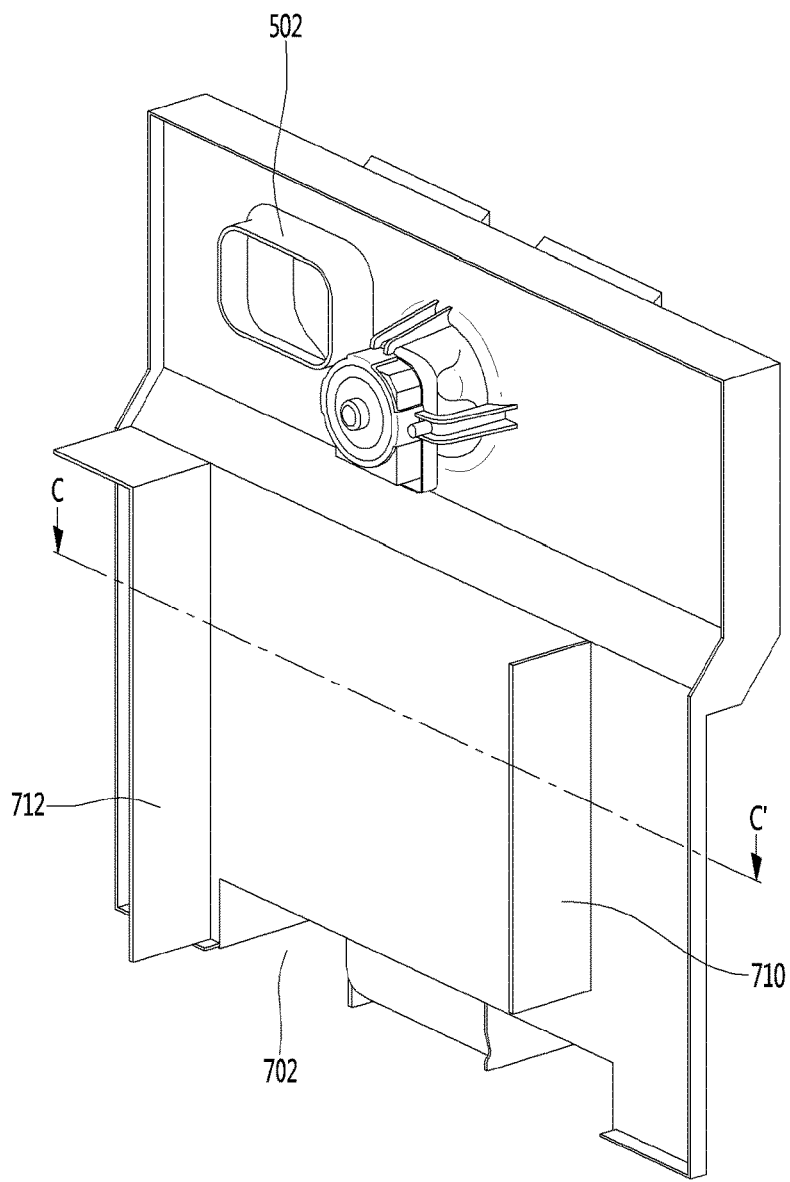
[Fig. 38]
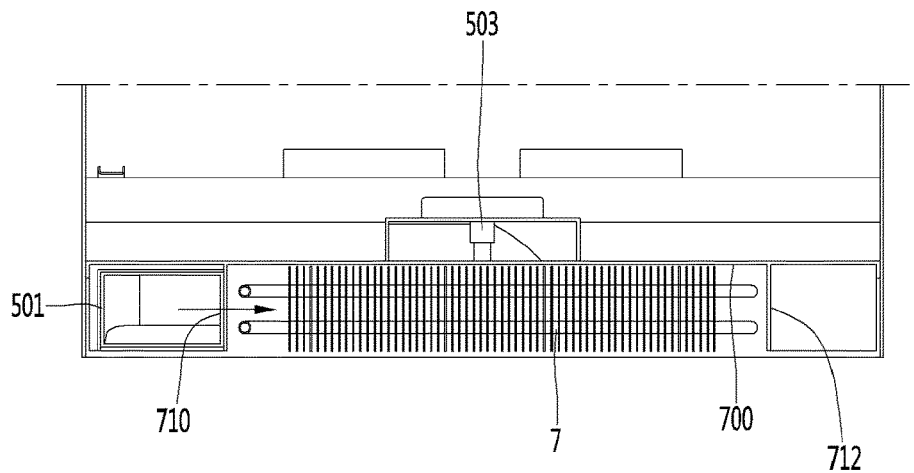

[Fig. 39]
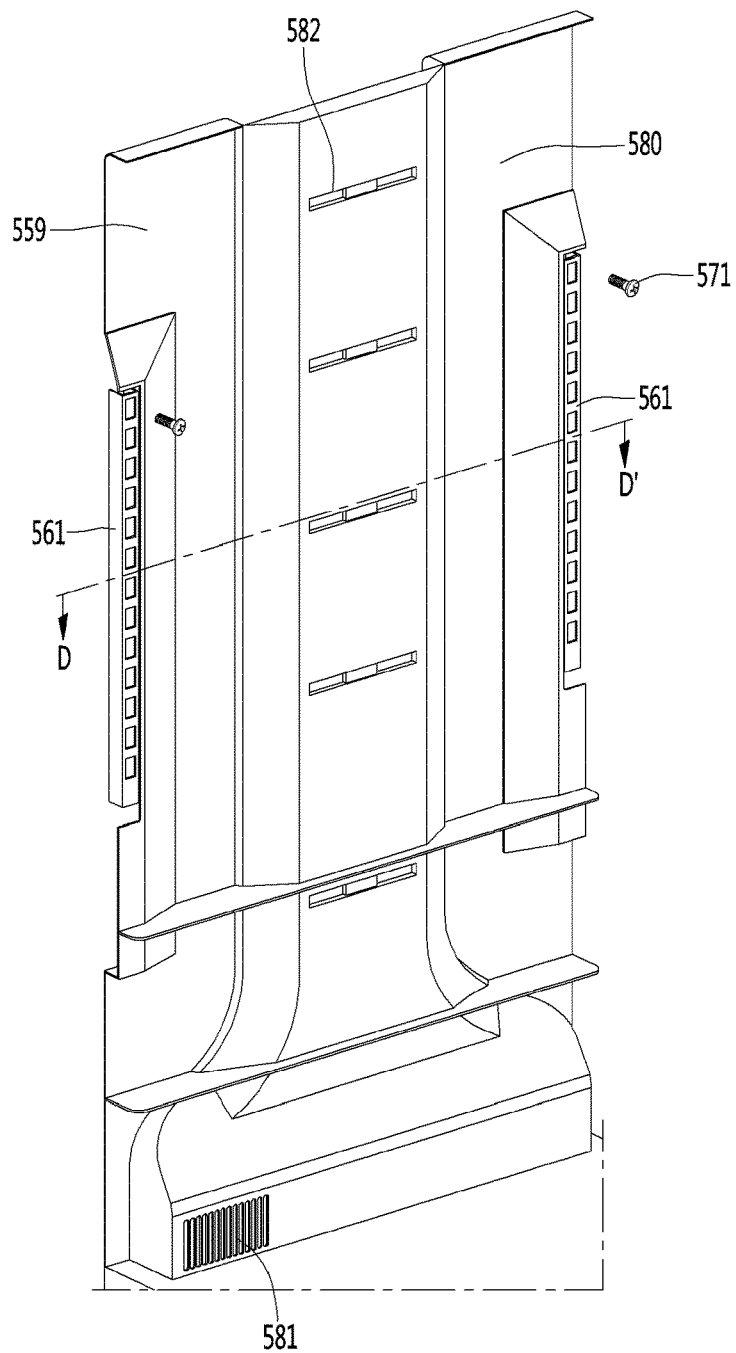
[Fig. 40]
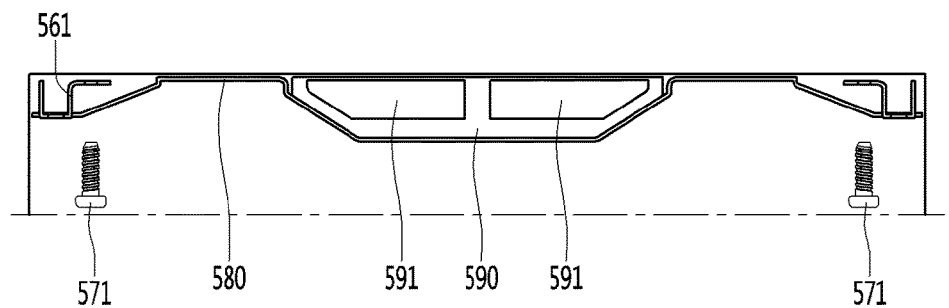

[Fig. 41]
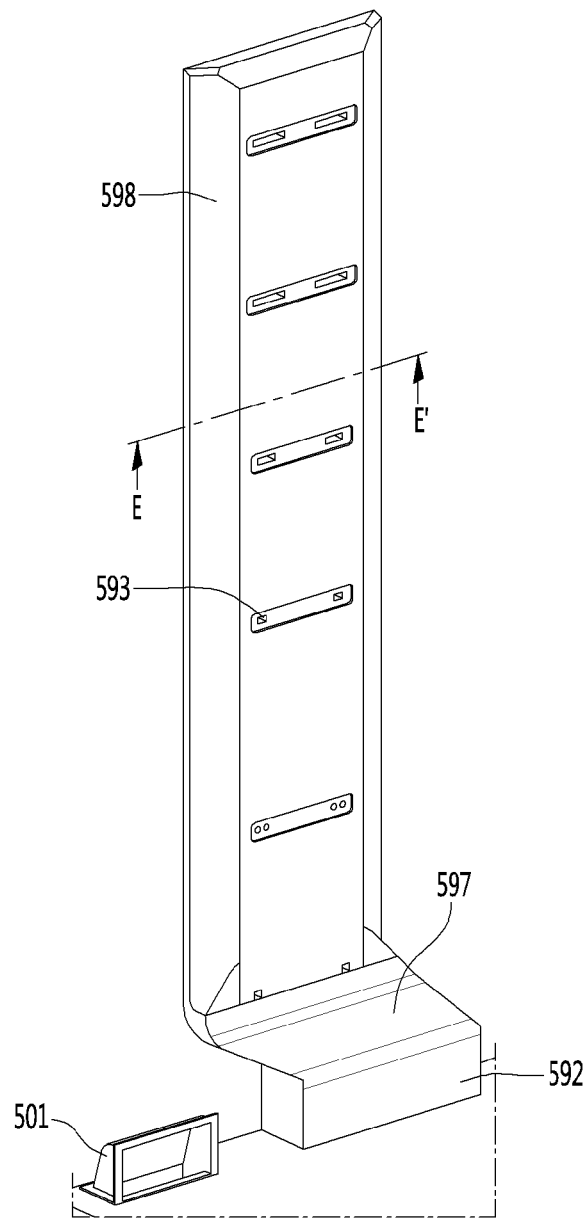
[Fig. 42]
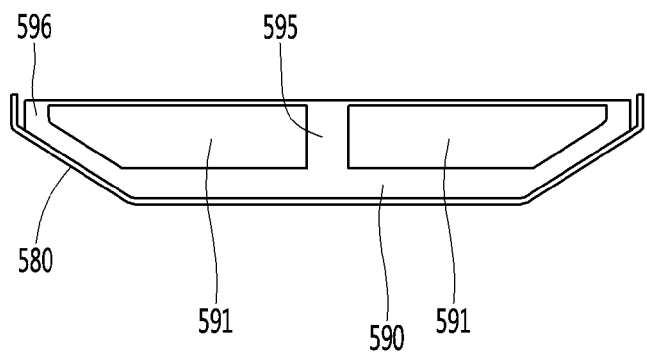

[Fig. 43]
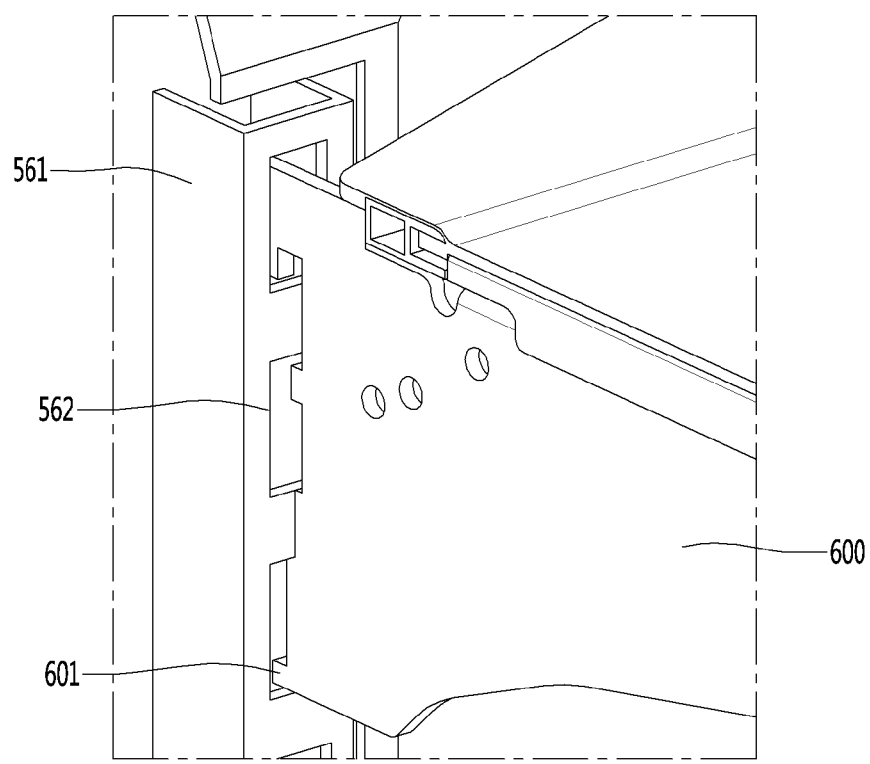

[Fig. 44]
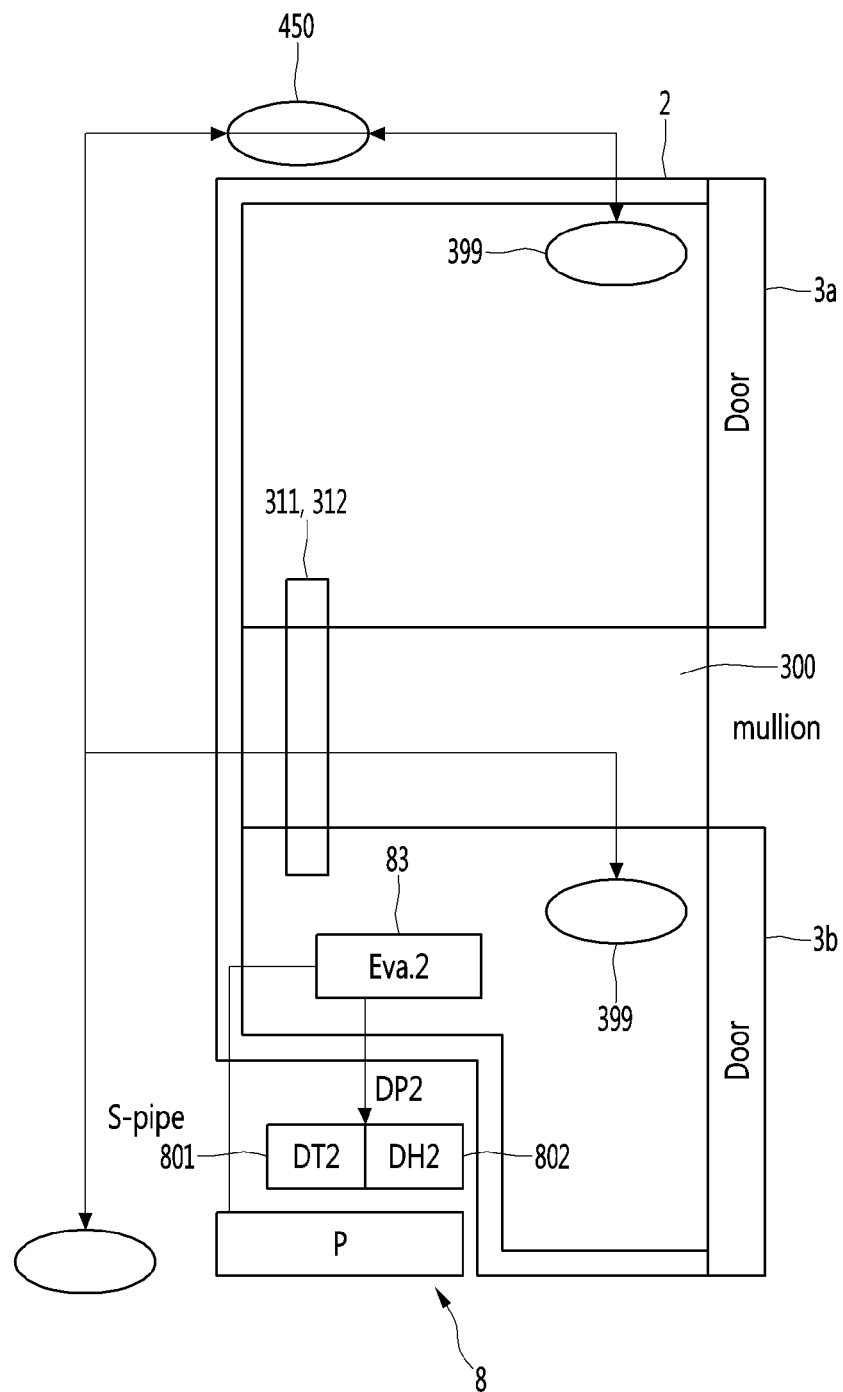

[Fig. 45]
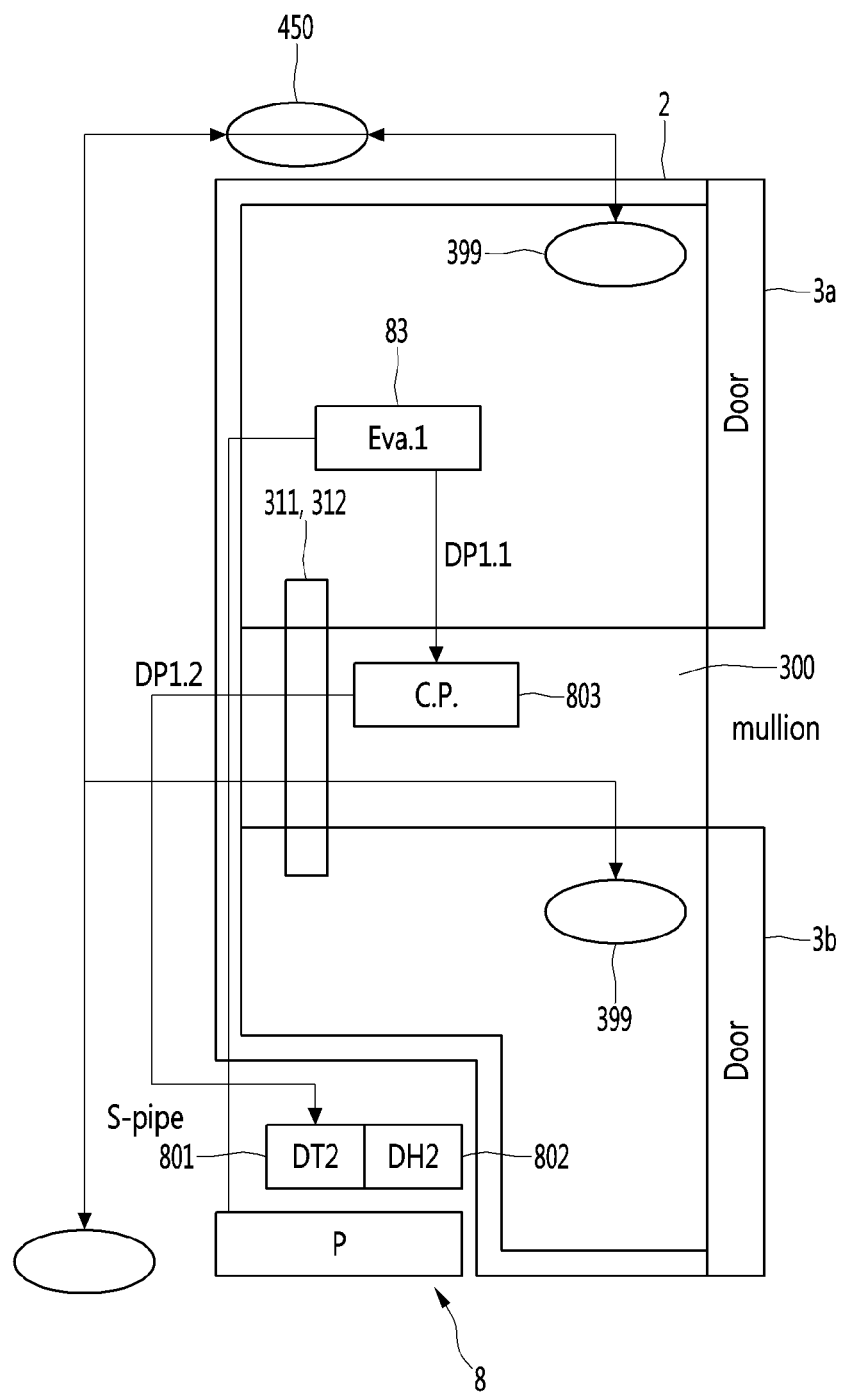

[Fig. 46]
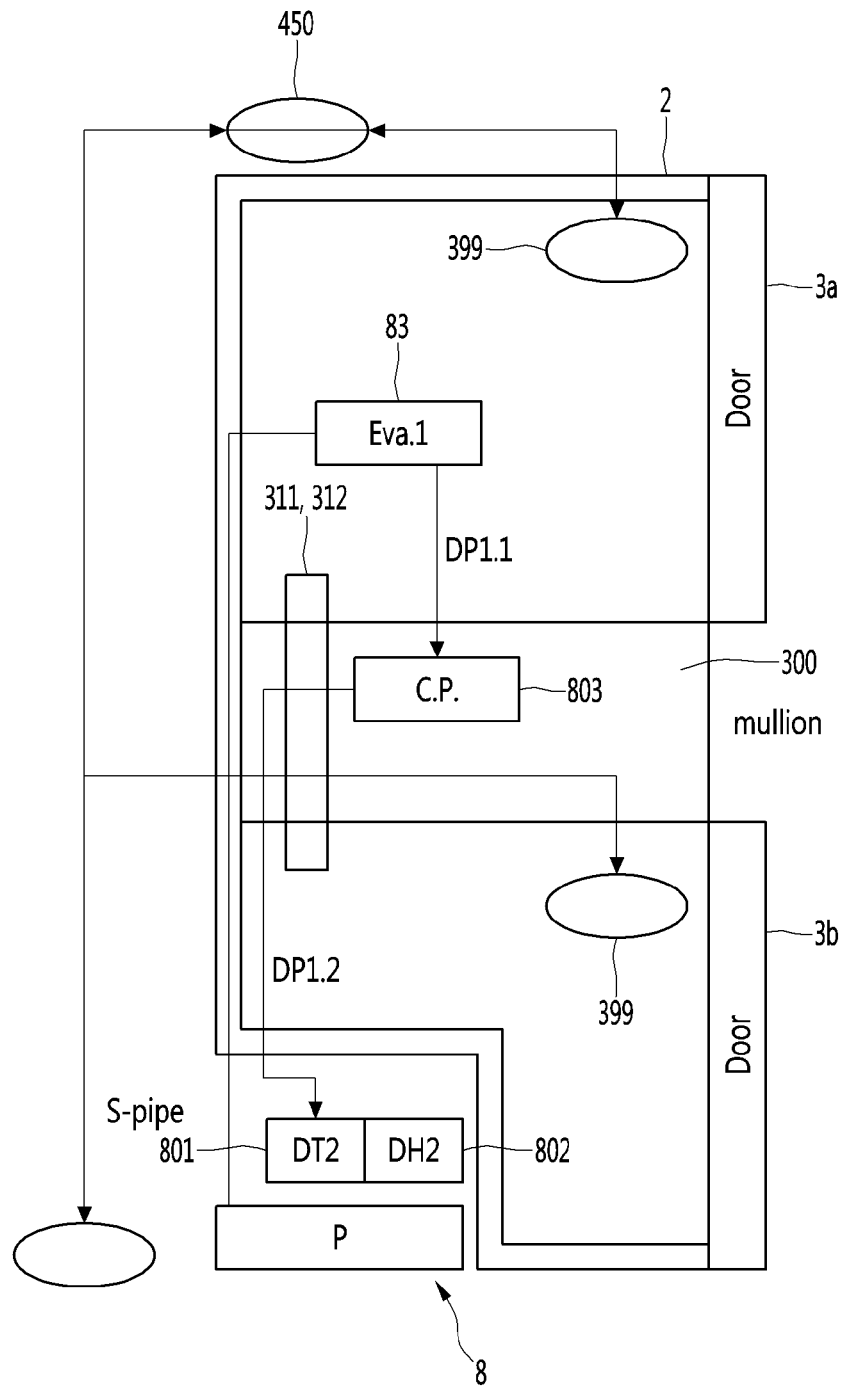

[Fig. 47]
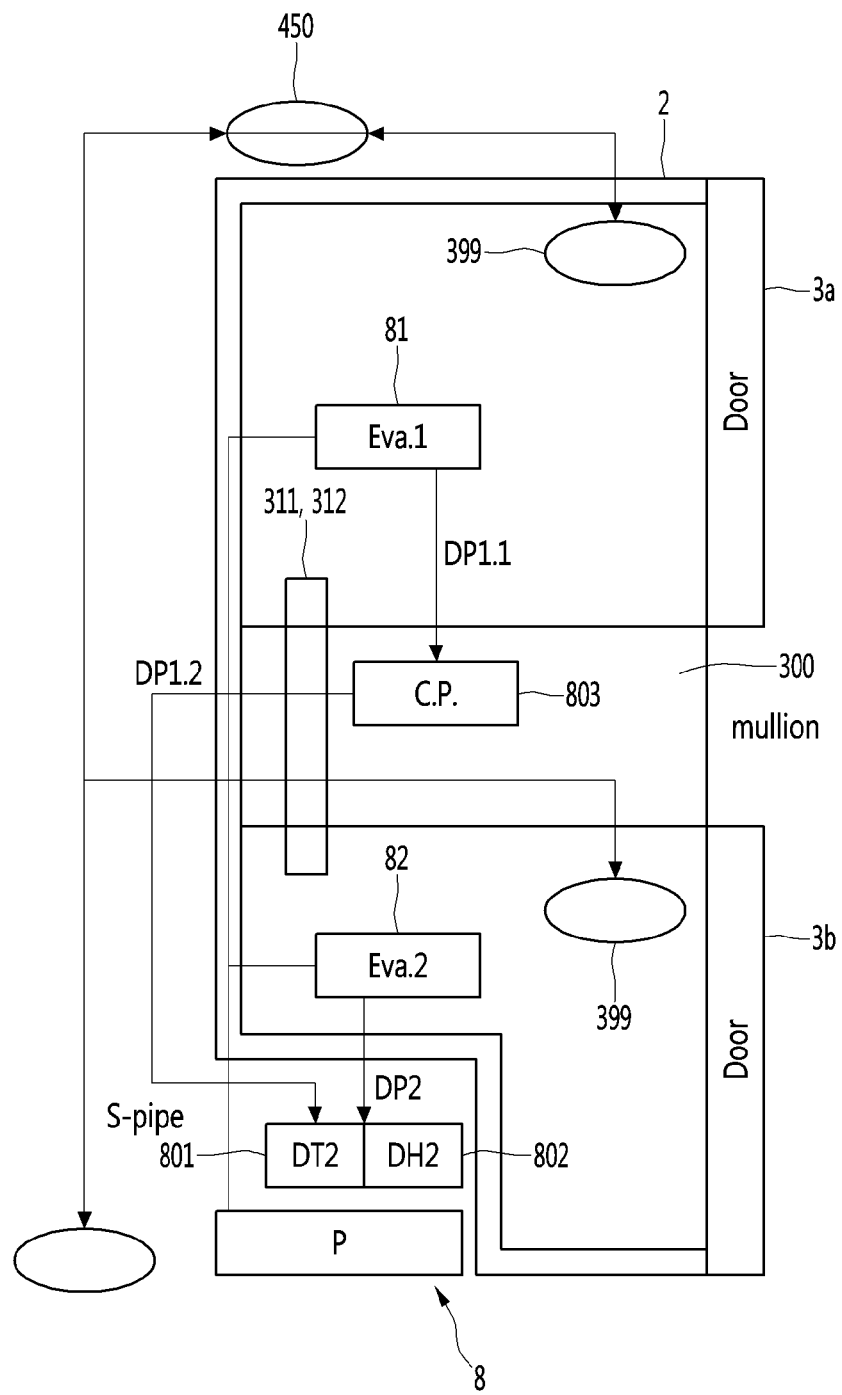

[Fig. 48]
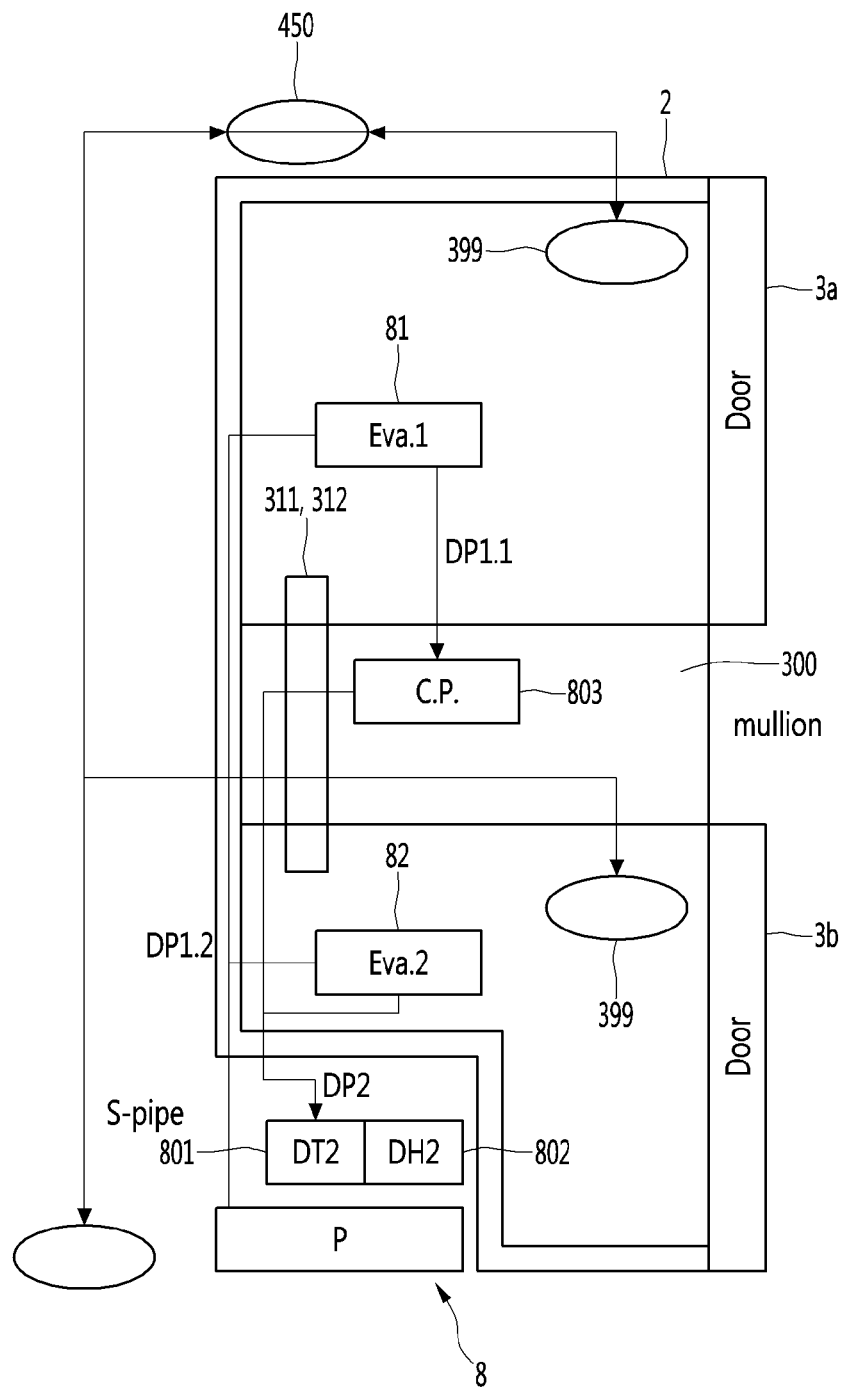

[Fig. 49]
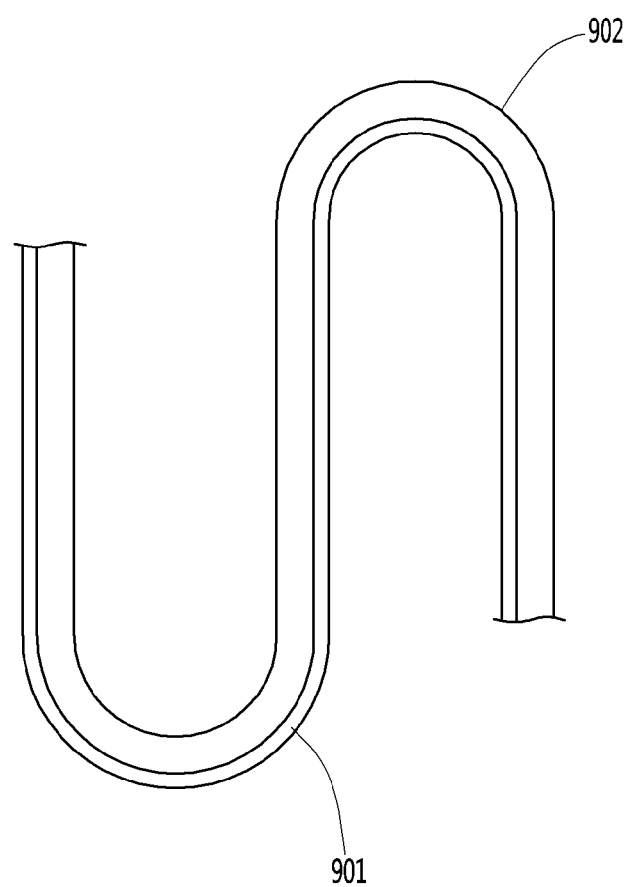

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2018/015709, filed Dec. 11, 2018, which claims priority to Korean Patent Application No. 10-2017-0171666, filed Dec. 13, 2017, whose entire disclosures are hereby incorporated by reference.

TECHNICAL FIELD

The present invention relates to a vacuum adiabatic body and a refrigerator.

BACKGROUND ART

A vacuum adiabatic body is a product for suppressing heat transfer by vacuuming the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2040226956A1 (Reference Document 3). However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

As a further alternative, the applicant of the present invention has filed Korean Patent Application Publication No. 10-2017-0016187, a vacuum adiabatic body and a refrigerator. The present technology proposes a refrigerator in which both the main body and the door are provided as vacuum adiabatic bodies.

The vacuum adiabatic body itself only performs an adiabatic action, and necessary parts are required to be installed in a product such as a refrigerator to which the vacuum adiabatic body is applied, but there is no consideration about it.

DISCLOSURE OF INVENTION

Technical Problem

The present invention has been made in view of the background described above and provides a method for securing efficient operation of a storage chamber in a case where a plurality of storage chambers are provided as a single vacuum insulation body.

The present invention proposes a refrigerator which improves the placement efficiency of parts in a case of providing a plurality of storage chambers with a single vacuum adiabatic body.

The present invention proposes a refrigerator in which pipeline connection is effectively performed in a case of providing a plurality of storage chambers with a single vacuum adiabatic body.

Solution to Problem

A vacuum adiabatic body according to the present invention includes a plate member which constitutes a wall of the vacuum adiabatic body; a reinforcing member which is provided at a peripheral portion of the at least one plate member to reinforce the strength of the plate member; and a drain pipe which passes through a third space except for the reinforcing member and through which water passes. According to the present invention, it is possible to secure connection means which draws out the defrost water generated in the inside of the vacuum insulation bodies having a different temperature.

A pair of refrigerant pipes penetrating and passing through the third space except for the reinforcing member are included, so that space utilization of the vacuum adiabatic body can be improved while minimizing the decrease in strength.

The pair of refrigerant pipes may include a heat exchange curved pipe provided in the inner space of the third space to improve the efficiency of the refrigeration system and improve space utilization.

A refrigerator according to the present invention includes: a vacuum adiabatic body which has an opening for a single accommodation space in which a product is accommodated; a mullion which divides the accommodation space into at least two spaces of different properties and is provided as an adiabatic member to insulate the at least two spaces; a first door which opens and closes one of the at least two spaces; a second door which opens and closes another space of the at least two spaces; a drain pipe which penetrates the vacuum adiabatic body and guides the defrost water generated in the evaporator to the outside of the vacuum adiabatic body; and a part which is placed inside the accommodation space. Accordingly, a single refrigerator can be divided to provide storage houses having different temperature atmospheres from each other. In addition, by guiding the defrost water to the outside, the inside of the storage house can be normally maintained.

The evaporator may be placed in any one of the at least two spaces and the mullion may be provided with a cold air flow path for sending and receiving cool air from any one of the at least two spaces to the other one of the at least two spaces. Accordingly, it is possible to simplify the construction by utilizing a cold air classification system using a large-capacity evaporator.

A cold air collecting pipe which guides cool air collected from any one of the at least two spaces to the other one of the at least two spaces among the cold air flow paths to the evaporator is further included, and the cold air collecting pipe may be aligned in a line with the evaporator. Accordingly, provision of a mechanism in a narrow space can provide a larger space in the refrigerator.

The extending direction of the refrigerant pipe of the evaporator and the cold air collecting pipe may be aligned in a line with each other. Accordingly, since the parts are placed in series, the space inside the refrigerator can be remarkably increased.

A cold air collecting pipe which guides cool air collected from the other one of the at least two spaces to any one of the at least two spaces among the cold air flow paths to the evaporator is further included, and the fins provided to the evaporator may be provided denser at a closed position to the cool air collecting pipe than at a far position from the cool air collecting pipe. Accordingly, the heat exchange of the evaporator is uniformly provided as a whole, and the heat exchange efficiency can be improved.

At any one side of the evaporator, a suction-side division wall for preventing bypass of the air cooled by the evaporator may be provided. Accordingly, it is possible to increase the heat exchange efficiency by preventing the mixing of the air at the inlet and the outlet of the evaporator.

The cool air flow path further includes a multi-duct in which a cool air supply flow path and a cool air collecting flow path having different traveling directions of cool air is included, which extends to be long to any one surface of the other space of at least two spaces and of which an inflow end portion of the cold air is provided which being bent toward the center of any one surface, in order to uniformly send cool air to the inside part of the other one of the at least two spaces. According to the present invention, it is possible to entirely and smoothly supply the cold air to the storage space to which cold air is supplied even by the compact structure.

A shelf rack which is provided on any one surface of the other space of the at least two spaces and fastened to the inner surface of the vacuum adiabatic body; a multi-duct which uniformly guides cool air into the other one of the at least two spaces; and a flow path cover which is fastened to the inner surface of the vacuum adiabatic body together with the shelf and accommodates the multi-duct therein. Accordingly, the shelf can be stably fixed in the vacuum adiabatic body.

A cold air collecting pipe which guides cool air collected from the other space of the at least two spaces to any one space of the at least two spaces to the evaporator, among the cold air flow paths is further included, and the cool air sucked to the evaporator side from any one space of the at least two spaces can be sucked less at a position close to the cool air collecting pipe than at a position far from the cool air collecting pipe. Accordingly, heat exchange with respect to the entire area of the evaporator can be efficiently performed.

A defrost water connection part provided inside the mullion may be further included to primarily collect the defrost water. Accordingly, the space utilization can be increased, and a large space inside the refrigerator can be secured.

A drain heater may be provided inside the mullion. Accordingly, a narrow space can be secured more efficiently.

A heat exchange curved pipe may be included in the mullion so that the refrigerant pipes connecting the machine chamber and the evaporator perform heat exchange with each other. Accordingly, the vacuum space part can be utilized to further improve the efficiency of the heat exchange.

A first evaporator and a second evaporator, which are placed in at least two spaces of the at least two spaces, respectively, can be included. In this case, the individual control efficiency for each storage space can be improved.

The defrost water generated in the first evaporator and the second evaporator can be drawn out to the outside of the vacuum adiabatic body through the single drain pipe. Accordingly, there is an advantage that the number of parts can be reduced by using a single element together, the manufacturing cost thereof becomes cheaper, and the manufacturing convenience thereof is improved.

The defrost water generated in the first evaporator and the second evaporator may be collected in the machine chamber through the vacuum adiabatic body at different positions. Accordingly, there is an advantage that the defrost water can be discharged immediately.

A power supply line may be provided at the mullion to supply power to the part. Accordingly, there is an advantage that the space inside the refrigerator is increased and the space utilization thereof is increased.

The refrigerator according to the present invention includes a refrigerant pipeline connecting a machine chamber and an evaporator in a refrigerator having a vacuum adiabatic body as a wall, the refrigerant pipeline can include a first flow path passing a space inside the refrigerator; a second flow path passing through an space outside the refrigerator; and a third flow path which is placed in the mullion so that the discharge flow path from the evaporator and the discharge flow path from the machine chamber exchange heat with each other. Accordingly, high space utilization can be obtained and the storage space can be further increased.

Advantageous Effects of Invention

According to the present invention, it is possible to supply cold air to the inside space of the vacuum adiabatic body in accordance with the purpose of storage, thereby improving the space usability.

According to the present invention, the defrost water generated from the evaporator in the refrigerator can be treated outside of the vacuum adiabatic body without the influence of other portions.

According to the present invention, it is possible to optimize the wiring of electricity and the pipeline of the vacuum adiabatic body to further increase the space inside the refrigerator.

BRIEF DESCRIPTION OF DRAWINGS

FIG. 1 is a perspective view of a refrigerator according to an embodiment.

FIG. 2 is a view schematically showing a vacuum adiabatic body used in a main body and a door of the refrigerator.

FIG. 3 is a view showing various embodiments of an internal configuration of a vacuum space part.

FIG. 4 is a view showing various embodiments of conductive resistance sheets and peripheral portions thereof.

FIG. 5 illustrates graphs showing changes in adiabatic performance and changes in gas conductivity with respect to vacuum pressures by applying a simulation.

FIG. 6 illustrates graphs obtained by observing, over time and pressure, a process of exhausting the interior of the vacuum adiabatic body when a supporting unit is used.

FIG. 7 illustrates graphs obtained by comparing vacuum pressures and gas conductivities.

FIG. 8 is a sectional perspective view illustrating a peripheral portion of the vacuum adiabatic body.

FIGS. 9 and 10 schematically illustrate a front surface of the main body in a virtual state where the inner surface part is unfolded.

FIG. 11 is a sectional view illustrating a contact part illustrated in a state where the main body is closed by the door.

FIG. 12 is a sectional view illustrating a contact part of a main body and a door according to another embodiment.

FIG. 13 and FIG. 14 are partial cutaway perspective views illustrating an inner surface part, FIG. 13 is a view illustrating a state where fastening thereof is completed and FIG. 14 is a view illustrating a fastening process thereof.

FIG. 15 is a view for sequentially explaining fastening of a sealing frame in a case of an embodiment in which the sealing frame is provided as two members;

FIG. 16 and FIG. 17 are views illustrating any one end portion of the sealing frame, FIG. 16 is a view illustrating before the door hinge is installed, and FIG. 17 is a view illustrating a state where the door hinge is installed.

FIG. 18 is a view for explaining the effect of the sealing frame according to the present invention in comparison with the technique of the related art, FIG. 18(a) is a sectional view illustrating a contact part between a main body-side vacuum adiabatic body and a door according to the present invention, and FIG. 18(b) is a sectional view illustrating the main body and the door according to the related art.

FIGS. 19 to 24 are views illustrating various embodiments in which a sealing frame is installed;

FIG. 25 is a view observing the upper right side of the main body-side vacuum adiabatic body from the front.

FIGS. 26 and 27 are sectional views illustrating a corner portion of the vacuum adiabatic body in a state where the lamp is installed, FIG. 26 is a sectional view illustrating a portion through which the wiring of the lamp does not pass, and FIG. 27 is a sectional view illustrating a portion through which the wiring of the lamp passes.

FIG. 28 is an exploded perspective view illustrating a peripheral portion of the part.

FIGS. 29 and 30 are sectional views taken along line A-A' and line B-B' in FIG. 28.

FIG. 31 is a view observing a side portion of the upper side part of the refrigerator from the front.

FIG. 32 is a front perspective view illustrating the main body-side vacuum adiabatic body.

FIG. 33 is a rear perspective view illustrating the main body-side vacuum adiabatic body.

FIG. 34 is a rear perspective view illustrating mullions separated and observed.

FIG. 35 is a front view illustrating the evaporator observed from the front in a state where a fan module and a freezing chamber flow path guide are removed.

FIG. 36 is a front view illustrating the evaporator observed from the front in a state where the fan module and freezing chamber flow path guide are installed.

FIG. 37 is a view illustrating peripheral parts of the evaporator observed from the rear.

FIG. 38 is a sectional view taken along line C-C' in FIG. 37.

FIG. 39 is a perspective view illustrating a refrigerating chamber flow path guide.

FIG. 40 is a sectional view taken along line D-D' in FIG. 39.

FIG. 41 is a rear perspective view illustrating a refrigerating chamber in a state where a refrigerating chamber flow path cover is removed;

FIG. 42 is a sectional view taken along line E-E' in FIG. 41;

FIG. 43 is a view for explaining the support operation of the shelf.

FIGS. 44 to 49 are views schematically illustrating another embodiment of a refrigerator which uses a single vacuum adiabatic body and divides the inner space of the vacuum adiabatic body with mullions.

BEST MODE FOR CARRYING OUT THE INVENTION

Hereinafter, specific embodiments of the present invention are proposed with reference to the drawings. However, there is no intention to limit the idea of the invention to the embodiments described below, a person skilled in the art which understands the idea of the present invention can easily propose other embodiments included within the scope of the same idea by adding, changing, and deleting constituent elements, or the like, but it will be understood that other embodiments are also included within the scope of the present invention.

Hereinafter, the drawings presented for the explanation of the embodiments may simply display parts which differ from the actual products, be exaggerated, simple, or detailed, however, this is to facilitate the understanding of the technical idea of the present invention, and should not be construed as being limited to sizes, structures, and shapes illustrated in the drawings. However, preferably, the actual shape may be illustrated as much as possible.

In the following embodiments, unless the embodiments do not collide with each other, the description of any one embodiment may be applied to the description of another embodiment, and some configurations of any one embodiment may be applied to another configuration in a state where only a specific part thereof is modified.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as a gap part between the first and second plate members 10 and 20. Also, the vacuum adiabatic body includes the conductive resistance sheets 60 and 63 for preventing heat conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body can be fabricated without using the radiation resistance sheet 32.

Referring to FIG. 3c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

A case where the porous substance 33 is filled in the vacuum space part 50 will be described in detail later.

FIG. 4 is a view showing various embodiments of the conductive resistance sheets and peripheral portions thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. So as to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side part of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math FIG. 1.

$$eK_{solid\ conduction\ heat} > eK_{radiation\ transfer\ heat} > eK_{gas\ conduction\ heat}$$ Math FIG. 1

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m$^2$) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 6 illustrates graphs obtained by observing, over time and pressure, a process of exhausting the interior of the vacuum adiabatic body when the supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more (Δt1). After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

FIG. 7 illustrates graphs obtained by comparing vacuum pressures and gas conductivities.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is middle between the vacuum pressure when only the supporting unit is used and the vacuum pressure when only the porous substance is used. In a case where only the porous substance is used, the lowest vacuum pressure can be created and used.

FIG. 8 is a sectional perspective view illustrating the peripheral portion of the vacuum adiabatic body.

Referring to FIG. 8, a first plate member 10, a second plate member 20, and a conductive resistance sheet 60 are provided. The conductive resistance sheet 60 may be provided as a thin plate to resist thermal conduction between the plate members 10 and 20. The conductive resistance sheet 60 is provided as a thin plate and is provided as a flat surface in the drawing, but may be pulled inward to have a curved shape when vacuum is applied to the vacuum space part 50.

Since the conductive resistance sheet 60 is in the form of a thin plate and has low strength, the conductive resistance sheet can be broken even by a small external impact. When the conductive resistance sheet 60 is broken, the vacuum of the vacuum space part is destroyed and the performance of the vacuum adiabatic body is not exerted. So as to solve this problem, a sealing frame 200 may be provided on the outer surface of the conductive resistance sheet 60. According to the sealing frame 200, since the parts of the door 3 or other external products indirectly contacts the conductive resistance sheet 60 through the sealing frame 200 without directly contacting the conductive resistance sheet 60, the breakage of the conductive resistance sheet 60 can be prevented. In order that the sealing frame 200 does not transfer an impact to the conductive resistance sheet 60, the gap between the two members may be spaced from each other and a buffer member may be interposed therebetween.

So as to reinforce the strength of the vacuum adiabatic body, the plate members 10 and 20 may be provided with a reinforcing member. For example, the reinforcing member may include a first reinforcing member 100 fastened to a peripheral portion of the second plate member 10 and a second reinforcing member 110 fastened to a peripheral portion of the first plate member 10. As the reinforcing members 100 and 110, a member can be applied which may be thicker or have a higher strength than the plate members 10 and 20 to such an extent that the strength of the vacuum adiabatic body can be increased. The first reinforcing member 100 may be provided in the inner space of the vacuum space part 50 and the second reinforcing member 110 may be provided on the inner surface part of the main body 2.

It is preferable that the conductive resistance sheet 60 is not in contact with the reinforcing members 100 and 110. This is because the thermal conductive resistance characteristic generated in the conductive resistance sheet 60 is destroyed by the reinforcing member. In other words, this is because the width of the narrow heat bridge for resisting the heat conduction is greatly expanded by the reinforcing member, and the narrow heat bridge characteristic is destroyed.

Since the width of the internal space of the vacuum space part 50 is narrow, the section of the first reinforcing member 100 may be provided in a flat plate shape. The second reinforcing member 110 provided on the inner surface of the main body 2 may be provided in a shape in which the section thereof is bent.

The sealing frame 200 may include an inner surface part 230 which is placed in an inner space of the main body 2 and supported by the first plate member 10, an outer surface part 210 which is placed in an outer space of the main body 2 and supported by the second plate member 20, and a side surface part 220 which is placed in a side surface of a peripheral portion of the vacuum adiabatic body constituting the main body 2, covers the conductive resistance sheet 60, and connects the inner surface part 230 and the outer surface part 210.

The sealing frame 200 may be made of a resin that permits slight deformation. The mounting position of the sealing frame 200 can be maintained by an interaction between the inner surface part 230 and the outer surface part 210, that is, by a catching action therebetween. In other words, the setting position of the sealing frame may not deviate.

The fixing position of the sealing frame 200 will be described in detail.

First, the movement of the plate members 10 and 20 in the extending direction (y-axis direction in FIG. 8) on the plane may be fixed by the inner surface part 230 being engaged with and supported by the second reinforcing member 110. More specifically, the position movement of the sealing frame 200 falling out from the vacuum adiabatic body to the outside may cause the inner surface part 230 to be engaged with the second reinforcing member 110 and be interrupted. On the contrary, the position movement of the sealing frame 200 moving to the inside of the vacuum adiabatic body may be interrupted by at least one of, firstly, the action of the inner surface part 230 to be engaged with and supported by the second reinforcing member 110 (this action can be acted in both directions including an elastic restoring force of the sealing frame provided as resin), secondly the action of the side surface part 220 to be stopped with respect to the plate parts 10 and 20, and thirdly the action of the movement of the inner surface part 230 with respect to the first plate member 10 in the y-axis direction to be blocked.

The movement of the plate members 10 and 20 in a direction extending perpendicular to the end surfaces of the plate members 10 and 20 (x-axis direction in FIG. 8) may be fixed by the outer surface part 210 being engaged to and supported by the second plate member 20. As an auxiliary action, the movement of the plate members 10 and 20 in the x-axis direction may be interrupted by the action of the inner surface part 230 to hold the second reinforcing member 110 and the action of contacting the inner surface part 230 with the second reinforcing member 110.

The movement of the sealing frame 200 in the extending direction (z-axis direction in FIG. 8) can be stopped by at least one of the first action of the inner surface part 230 of anyone sealing frame 200 to be in contact with the inner surface part of the other sealing frame 200 and a second action that the inner surface part 230 of anyone sealing frame 200 is in contact with the mullion 300.

FIGS. 9 and 10 schematically illustrate the front face of the main body, and, in the drawing, it should be noted that the sealing frame 200 is in a virtual state where the inner surface part 230 is unfolded in a direction parallel to the side surface part 220.

Referring to FIGS. 9 and 10, the sealing frame 200 may include members 200*b* and 200*e* which seal the upper and lower peripheral portions of the main body 2, respectively. The side peripheral portions of the main body 2 can be divided according to whether the spaces in the refrigerator divided based on the mullion 300 are sealed separately (in a case of FIG. 9) or integrally (in a case of FIG. 10).

In a case where the side peripheral portions of the main body 2 are separately sealed as illustrated in FIG. 9, it can be divided into four sealing frames 200*a*, 200*c*, 200*d*, and 200*f*. In a case where the side peripheral portions of the main body 2 are integrally sealed as illustrated in FIG. 10, it can be divided into two sealing frames 200*g* and 200*c*.

In a case where the side peripheral portions of the main body 2 are sealed by the two sealing frames 200*g* and 200*c* as illustrated in FIG. 10, since the two fastening operations are required, the manufacturing is facilitated, but, it is necessary to cope with a fear of loss of cold air by occurring heat transfer between the separated storehouses with heat conduction of the sealing frame.

In a case where the side peripheral portions of the main body 2 are sealed by the four sealing frames 200*a*, 200*c*, 200*d*, and 200*f* as illustrated in FIG. 9, since it is required four fastening operations, the manufacturing is inconvenient, but, heat conduction between the sealing frames is obstructed, and heat transfer between the separated storehouses is reduced, thereby reducing the loss of cold air.

Meanwhile, the embodiment of the vacuum adiabatic body illustrated in FIG. 8 can preferably exemplify a main body-side vacuum adiabatic body. However, it does not exclude that the sealing frame 200 is provided to the door-side vacuum adiabatic body. However, in general, since the gasket is provided on the door 3, it is more preferable that the sealing frame 200 is provided on the main body-side vacuum adiabatic body. In this case, the side surface part 220 of the sealing frame 200 can have a further advantage that the side surface part 220 can provide a width sufficient for the gasket to contact.

In detail, the width of the side surface part 220 is provided to be wider than the adiabatic thickness of the vacuum adiabatic body, that is, the width of the vacuum adiabatic body, so that the adiabatic width of the gasket can be provided sufficiently wide. For example, in a case where the adiabatic thickness of the vacuum adiabatic body is 10 mm, it is possible to provide a large storage space in the refrigerator, thereby increasing the accommodation space of the refrigerator. However, there is a problem that, in a case where the adiabatic thickness of the vacuum adiabatic body is 10 mm, a gap sufficient for the gasket to contact cannot be provided. In this case, since the side surface part 220 can provide a wide gap corresponding to the contact area of the gasket, it is possible to effectively prevent the loss of the cold air through the contact gap between the main body 2 and the door 3. In other words, in a case where the contact width of the gasket is 20 mm, even if the adiabatic thickness of the vacuum adiabatic body is 10 mm, the width of the side surface part 220 can be provided to be 20 mm or more in correspondence with the contact width of the gasket.

It can be understood that the sealing frame 200 performs the function of sealing to prevent shielding of the conductive resistance sheet and loss of cold air.

FIG. 11 is a sectional view illustrating the contact part illustrated in a state where the main body is closed by the door.

Referring to FIG. 11, the gasket 80 is interposed in a boundary surface between the main body 2 and the door 3. The gasket 80 can be fastened to the door 3 and can be provided as a deformable member as a flexible material. The gasket 80 includes a magnet as one part and when the magnet pulls and approaches the magnetic body (i.e., magnetic body of peripheral portion of main body), the contact surface between the main body 2 and the door can block the leakage of the cold air by the sealing surface having a predetermined width by the action of the gasket 80 being smoothly deformed.

Specifically, when the gasket sealing surface 81 of the gasket is in contact with the side surface part 220, the side surface part sealing surface 221 having a sufficient width can be provided. The side surface part sealing surface 221 may be defined as a contact surface on the side surface part 220 which is correspondingly in surface contact with the gasket sealing surface 81 when the gasket 80 is in contact with the side surface part 220.

According to this, it is possible to secure sealing surfaces 81 and 221 having a sufficient area regardless of the adiabatic thickness of the vacuum adiabatic body. This is because even if the adiabatic thickness of the vacuum adiabatic body is narrow, for example, even if the adiabatic thickness of the vacuum adiabatic body is narrower than the gasket sealing surface 81, if the width of the side surface part 220 is increased, the side surface part sealing surface 220 having a sufficient width can be obtained. In addition, regardless of the deformation of the member which may affect the deformation of the contact surface between the main body and the door, the sealing surfaces 81 and 221 having a sufficient area can be secured. This is because it is possible to provide a predetermined clearance in and out of the side surface part sealing surface 221 in designing the side surface part 220 so that even if slight deformation occurs between the sealing surfaces 81 and 221, the width and area of the sealing surface can be maintained.

In the sealing frame 200, the outer surface part 210, the side surface part 220, and the inner surface part 230 are provided so that the set position thereof can be maintained. Simply, the outer surface part 210 and the inner surface part 230 has a pursing shape, that is, the structure of a concave groove, so that the configuration which holds the end portion of the vacuum adiabatic body, more precisely, the plate members 10 and 20 can be provided. Here, It can be understood that the concave groove has a constitution of the concave groove as a configuration in which the width between the end portion of the outer surface part 210 and the end portion of the inner surface part 230 is smaller than the width of the side surface part 220.

The fastening of the sealing frame 200 will be briefly described. Firstly, the side surface part 220 and the outer surface part 210 is rotated in a direction of the second plate 20 in a state where the inner surface part 230 is engaged with the second reinforcing member 110. Then, the sealing frame 200 is elastically deformed, and the outer surface part 210 moves inward along the outer surface of the second plate member 20 so that the fastening can be completed. When the fastening of the sealing frame 200 is completed, the sealing frame 200 can be restored to the original shape thereof designed before the deformation. When the fastening is completed, the installation position thereof can be maintained as described above.

The detailed configuration and detailed action of the sealing frame 200 will be described.

The outer surface part 210 may include an extension part 211 outside the refrigerator which extends inward from an end of the second plate member 20, and an contact part 212 outside the refrigerator which is in contact with the outer surface of the second plate member 20 at end of the extension part 211 outside the refrigerator.

The extension part 211 outside the refrigerator has a predetermined length so as to have a predetermined length so as to prevent the removal of the outer surface part 210 due to the external weak acting force. In other words, the outer surface part 210 is not completely removed from the second plate member 20 even if the outer surface part 210 is forced so as to be pulled toward the door due to the user's carelessness. However, since, if the outer surface part 210 is excessively long, there is difficulty in intentional removal at the time of repair and the fastening operation becomes difficult, it is preferable that the outer surface part 210 is limited to a predetermined length.

The contact part 212 outside the refrigerator may be provided with a structure in which the end of the extension part 211 outside the refrigerator is slightly bent toward the surface outside the second plate member 20. According to this, sealing by the contact between the outer surface part 210 and the second plate member 20 becomes perfect, so that foreign matter can be prevented from being introduced.

The side surface part 220 is provided as a width which is bent at an angle of about 90 degrees from the outer surface part 210 toward the opening of the main body 2 and secures a sufficient width of the side surface part sealing surface 221. The side surface part 220 may be provided thinner than the inner surface part 210 and the outer surface part 230. This may have a purpose of permitting elastic deformation at the time of fastening or removing the sealing frame 200 and a purpose of not permitting a distance to cause a magnetic force between the magnet installed on the gasket 80 and the magnetic body on the main body side to be weakened. The side surface part 220 may have a purpose of protecting the conductive resistance sheet 60 and arranging the outer appearance as an exposed portion of the exterior. In a case where the adiabatic member is laid inside the side surface part 220, the adiabatic performance of the conductive resistance sheet 60 can be reinforced.

The inner surface part 230 is bent and extends from the side surface part 220 by about 90 degrees in an inner direction of the refrigerator, that is, the rear surface direction of the main body. The inner surface part 230 performs an action for fixing the sealing frame 200, an action for installing parts necessary for the operation of a product to which a vacuum adiabatic body is installed such as a refrigerator, and an action for preventing the inflow of outer foreign matters into the inside.

The action corresponding to each configuration of the inner surface part 230 will be described.

The inner surface part 230 includes an extension part 231 inside the refrigerator which is bent and extends from an inner end portion of the side surface part 220; and a first member fastening part 232 which is bent from the inner end portion of the extension part 231 inside the refrigerator to an outside direction, that is, toward the inner surface of the first plate member 10. The first member fastening part 232 may be in contact with and is engaged with the protrusion part 112 of the second reinforcing member 110. The extension part 231 inside the refrigerator may provide a gap which extends to an inside of the refrigerator so that the first member fastening part 232 is engaged inside the second reinforcement member 110.

The first member fastening part 232 may be engaged with the second reinforcing member 110 to draw the supporting action of the sealing frame 200. The second reinforcement member 110 may further include a base part 111 which is fastened to the first plate member 10 and a protrusion part 112 which bends and extends from the base part 111. The inertia of the second reinforcing member 110 is increased by the structure of the base part 111 and the protrusion part 112 so that the ability to resist the bending strength can be increased.

The second member fastening part 233 may be fastened to the first member fastening part 232. The first and second member fastening parts 232 and 233 may be provided as separate members to be fastened to each other and may be provided as a single member from at the time of the design thereof.

The second member coupling part 233 may further be provided with a gap forming part 234 that further extends to the inside of the refrigerator from the inner end portion of the second member fastening part 233. The gap forming part 234 may serve as a portion for providing a gap or space where parts necessary for the operation of the appliance such as a refrigerator provided as the vacuum adiabatic body are placed.

An inclined part 235 inside the refrigerator is further provided inside the gap forming part 234. The inclined part 235 inside the refrigerator may be provided so as to be inclined so as to approach the first plate member 10 toward the end thereof, that is, toward the inside of the refrigerator. In the inclined part 235 inside the refrigerator, the gap between the sealing frame and the first plate member is provided to be reduced as being directed to the inside thereof so that the volume of the sealing frame 200 occupying the space inside the refrigerator is reduced as much as possible and it is possible to expect an effect of securing a space in which a part such as a lamp is mounted by the cooperation with the gap forming part 234.

An contact part 236 inside the refrigerator is provided at the inner end portion of the inclined part 235 inside the refrigerator. The contact part 236 inside the refrigerator may be provided in a structure in which the end of the inclined part 235 inside the refrigerator is slightly bent toward the inner surface side of the first plate member 10. According to this, sealing by the contact between the inner surface part 230 and the first plate member 10 is perfect, so that it is possible to prevent the inflow of foreign matter or the like.

In a case where an accessory part such as a lamp is installed on the inner surface part 230, the inner surface part 230 may be divided into two parts so as to achieve the purpose of convenience of installation of the part. For example, the inner surface part can be divided into a first member which provides the extension part 231 inside the refrigerator and the first member fastening part 232, and a second member which provides the second member fastening part 233, the gap forming part 234, the inclined part 235 inside the refrigerator, and the contact part 236 inside the refrigerator. The first member and the second member are fastened to each other in such a manner that the second member fastening part 233 is fastened to the first member fastening part 232 in a state where a product such as a lamp is mounted on the second member. Of course, it does not exclude that the inner surface part 230 is provided in a more various manner. For example, the inner surface part 230 may be provided as a single member.

FIG. 12 is a sectional view of a contact part of the main body and the door according to another embodiment. The present embodiment is characteristically different in the position of the conductive resistance sheet and accordingly the change of the other portions.

Referring to FIG. 12, in this embodiment, the conductive resistance sheet 60 may be provided in the inside of the refrigerator rather than on the end peripheral portion of the vacuum adiabatic body. The second plate member 20 may extend beyond the outside of the refrigerator and the peripheral portion of the vacuum adiabatic body. In some cases, the second plate member 20 may extend a certain length to the inside of the refrigerator. In a case of this embodiment, it can be seen that a conductive resistance sheet can be provided at a position similar to the conductive resistance sheet of the door-side vacuum adiabatic body illustrated in FIG. 4b.

In this case, it is preferable that the second reinforcing member 110 is moved to the inside of the refrigerator without being in contact with the conductive resistance sheet 60 so as to avoid affecting the high thermal conductive adiabatic performance of the conductive resistance sheet 60. This is to achieve the function of the heat bridge of the conductive resistance sheet. Accordingly, the conductive resistance sheet 60 and the second reinforcing member 110 are not in contact with each other, and the conductive adiabatic performance by the conductive resistance sheet and the strength reinforcement performance of the vacuum insulation member by the reinforcing member can be achieved at the same time.

This embodiment can be applied to a case where perfect thermal protection and physical protection against the peripheral portion of the vacuum adiabatic body are required.

FIGS. 13 and 14 are partial cutaway perspective views illustrating the fastening of the two members in the embodiment in which the inner surface part is divided into two members. FIG. 13 is a view illustrating a state where fastening of the two members is completed and FIG. 14 is a view illustrating a fastening process of the two members.

Referring to FIGS. 13 and 14, the first member fastening part 232 is engaged with the protrusion part 112 of the second reinforcing member 110 and the outer surface part 210 is supported by the second plate member 20. Accordingly, the sealing frame 200 can be fixed to the peripheral portion of the vacuum adiabatic body.

At least one first member insertion part 237 which is bent and extends in the inside direction of the refrigerator may be provided at the end portion of the first member fastening part 232, preferably, for each sealing frame 200 installed in the refrigerator. A second member insertion recess 238 may be provided at a position corresponding to the first member insertion part 237. The first member insertion part 237 and the second member insertion recess 238 are similar in size and shape to each other so that the first member insertion part 237 can be inserted into, fitted into, and fixed to the second member insertion recess 238.

The fastening of the first member and the second member will be described. The second member is aligned with respect to the first member so that the second member insertion recess 238 corresponds to the first member insertion part 237 in a state where the first member is fastened to the peripheral portion of the vacuum adiabatic body. By inserting the first member insertion part 237 into the second member insertion recess 238, the two members can be fastened.

Meanwhile, at least a portion of the second member insertion recess 238 may be provided smaller than the first member insertion part 237 so as to prevent the fastened second member from being removed from the first member. Thereby, both members can be tightly fitted to each other. So as to perform an action of being engaged and supported after the second member insertion recess 238 and the first member insertion part 237 are inserted to a predetermined depth, at some point after a predetermined depth, a protrusion and a groove can be provided at both members, respectively. In this case, after the two members are inserted at a certain depth, the two members may be further inserted beyond steps so that the fixing of the two members may be performed to be more stable. Of course, the worker feels that the correct insertion has been performed through the light feeling.

The two members constituting the inner surface part can be fixed in the position and the coupling relation by the configuration in which the two members are fitted and coupled. Alternatively, in a case where the load is large due to the action of the second member fixing the separate part, the first member and the second member are fastened to each other by a separate fastening member such a fastener 239 inside the refrigerator.

FIG. 15 is a view for sequentially illustrating the fastening of the sealing frame in a case of the embodiment in which the sealing frame is provided as two members. Particularly, the case where the part is provided on the inner surface part is exemplified.

Referring to FIG. 15(a), the sealing frame 200 is fastened to the peripheral portion of the vacuum adiabatic body. At this time, the fastening can be performed by using the elastic deformation of the sealing frame 200 and the restoring force according to the elastic deformation without a separate member such as a screw.

For example, in a state where the inner surface part 230 is engaged with the second reinforcing member 110, the connection point between the inner surface part 230 and the side surface part 220 may be used as a center of rotation, and the side surface part 220 and the outer surface part 210 are rotated in a direction of the second plate member 20. This action can cause the elastic deformation of the side surface part 220.

Thereafter, the outer surface part 210 moves inward from the outer surface of the second plate member 20 and the elasticity restoring force of the side surface part 220 acts so that the outer surface part 210 can be lightly fastened to the outer surface of the second plate member 20. When the fastening of the sealing frame 200 is completed, the sealing frame 200 can be seated in the original position thereof designed to the designed original shape.

Referring to FIG. 15(b), a state where the fastening of the first member of the sealing frame 200 is completed is illustrated. The side surface part 220 may be formed to be thinner than the outer surface part 210 and the inner surface part 230 so that the sealing frame 200 can be fastened to the peripheral portion of the vacuum adiabatic body by elastic deformation and elastic restoring action of the sealing frame.

Referring to FIG. 15(c), the part seating member 250 as a second member that provides the inner surface part 230 is provided as a separate part. The part seating member 250 is a part on which the part 399 is placed and the set position thereof can be supported, and the additional function necessary for the action of the part 399 can be further performed. For example, in the present embodiment, in a case where the part 399 is a lamp, the gap forming part 234 may be provided on the part seating member 250 as a transparent member. Therefore, this allows the light emitted from the lamp to pass through the inner surface part 230 and to be emitted into the refrigerator and allows the user to identify the product in the refrigerator.

The part seating member 250 may have a predetermined shape that can be fitted with the part 399 to fix the position of the part 399 so that the part 399 is seated.

FIG. 15(d) illustrates a state where the part 399 is placed on the part seating member 250.

Referring to FIG. 15(e), the part seating member 250 on which the part 399 is seated is aligned in a predetermined direction so as to be fastened to the first member that provides the inner surface part. In the embodiment, the first member fastening part 232 and the second member insertion recess 238 can be aligned to each other in the extending direction so that the first member fastening part 232 is fitted to the second member insertion recess. Of course, although not limited in this way, it may be preferably proposed to enhance the ease of assembly.

The first member fastening part 232 is slightly larger than the second member insertion recess 238 so that the first member fastening part 232 and the second member insertion recess 238 are tightly fitted to each other, and an engagement structure such as a step and a protrusion can be introduced for light insertion.

Referring to FIG. 15(f), the inner surface part in a state where the assembling is completed can be seen.

FIGS. 16 and 17 are views illustrating any one end portion of the sealing frame, FIG. 16 is a view before the door hinge is installed, and FIG. 17 is a view a state where the door hinge is installed.

In a case of a refrigerator, a door hinge is provided at the connection part so that the door-side vacuum adiabatic body is fastened to the main body-side vacuum adiabatic body in a state of being capable of being rotated. The door hinge has to have a predetermined strength and can prevent door sagging due to the own weight thereof in a state where the door is fastened and prevent the main body from being distorted.

Referring to FIG. 16, so as to fasten the door hinge 263, a door fastener 260 is provided on the main body-side vacuum adiabatic body. Three door fasteners 260 may be provided. The door fastener 260 can be directly or indirectly fixed to the second plate member 20, the reinforcing members 100 and 110, and/or a separate additional reinforcing member (for example, additional plate which is further provided to outer surface of second plate member). Here, direct fixing may be referred to as one by a fusion method such as welding, and indirect fixing may be referred to as a fastening method using an auxiliary fastening tool or the like instead of the method such as fusion or the like.

Since the door fastener 260 is required to have a high supporting strength, the door fastener 260 can be fastened while contacting the second plate member 20. For this, the sealing frame 200 may be cut, and the sealing frame 200 to be cut may be an upper sealing frame 200b at the upper corner of the main body-side vacuum adiabatic body. In addition, the sealing frame 200 to be cut may be a right sealing frame 200a, 200f, and 200g at the right corner of the main body-side vacuum insulating body and the lower sealing frame 200e at the lower edge of the main body-side vacuum insulating body. If the door installation direction is different, the sealing frame 200 to be cut may be a left sealing frame 200a, 200f, and 200g at the left corner of the main body-side vacuum adiabatic body.

The sealing frame 200 to be cut may have a cut surface 261 and the second plate member 20 may have a door fastener seating surface 262 to which the door fastener 260 is fastened. Accordingly, the door fastener seating surface 262 can be exposed to the outside by the cut of the sealing frame 200, and an additional plate member can be further interposed in the door fastener seating surface 262.

The end portion of the sealing frame 200 may not be entirely removed, but a portion of the sealing frame 200 may be removed only at a portion where the door fastener 260 is provided. However, it is more preferable to remove all the end portion of the sealing frame 200 so as to facilitate the manufacturing and to firmly support and fasten the door hinge 263 on the side of the vacuum adiabatic body.

FIG. 18 is a view for explaining the effect of the sealing frame according to the present invention in comparison with the related art, FIG. 18(a) is a sectional view of a contact part between the main body-side vacuum adiabatic body and a door according to the present invention, and FIG. 18(b) is a sectional view illustrating the main body and the door according to the related art.

Referring to FIG. 18, in the refrigerator, a hotline may be installed at the contact part between the door and the main body so as to prevent dew formation due to abrupt temperature change. As the hotline is closer to the outer surface and the peripheral portion of the main body, dew formation can be removed even with a small heat capacity.

According to the embodiment, the hotline 270 may be placed in an inner space of a gap between the second plate member 20 and the sealing frame 200. A hot-line accommodation part 271 in which the hotline 270 is placed may be further provided in the sealing frame 200. Since the hotline 270 is placed outside the conductive resistance sheet 60, the amount of heat transferred to the inside of the refrigerator is also small. This makes it possible to prevent dew formation of the main body and the door contact part even with a smaller heat capacity. In addition, by allowing the hotline 270 to be relatively placed on the outside of the refrigerator, that is, a portion which is bent between the peripheral portion of the main body and the outer surface of the main body, it is possible to prevent entry of heat into the refrigerator space.

In the embodiment, the side surface part 220 of the sealing frame 200 may have a portion w1 which is aligned with the gasket 80 and the vacuum space part 50 and a portion w2 which is not aligned with the vacuum space part 50 and is aligned with the refrigerator space. This is the portion provided by the side surface part 220 to ensure sufficient cold air blocking by the magnet. Therefore, the sealing action by the gasket 80 can be sufficiently achieved by the sealing frame 200.

In the embodiment, the inclined part 235 inside the refrigerator is provided to be inclined toward the inner surface of the first plate member 10 at a predetermined angle b. This can increase the volume in the refrigerator like a hatched portion and can provide an effect of enabling a narrow space inside the refrigerator to make more widely available. In other words, it is possible to widely utilize the space in the vicinity of the door by inclining the inclined part inside the refrigerator in a direction opposite to the predetermined angle a directed toward the space inside the refrigerator as in the related art. For example, it is possible to accommodate more food in the door and to obtain more space which can accommodate the various parts necessary for the operation of the appliance.

Hereinafter, FIGS. 19 to 24 illustrate various embodiments in which the sealing frame 200 is installed.

Referring to FIG. 19, the second reinforcing member 110 may provide only the base part 111 and may not provide the protrusion part 112. In this case, a groove 275 may be provided in the base part 111. The end portion of the first member fastening part 232 may be inserted into the groove 275. This embodiment can be preferably applied in a case of a product which can provide sufficient strength without providing the protrusion part 112 in the second reinforcing member 110.

In a case of the present embodiment, as a process of the end portion of the first member fastening part 232 being fitted in the groove 275 and aligned when the sealing frame 200 is fastened, the sealing frame 200 is fastened to the end portion of the vacuum adiabatic body.

According to the fastening action between the groove 275 and the first member fastening part 232, by only the fastening between the inner surface part 230 of the sealing frame 200 and the second reinforcing member 110, it is possible to stop the movement of the sealing frame 200 in the y-axis direction.

Referring to FIG. 20, when this embodiment is compared with the embodiment illustrated in FIG. 19, this embodiment differs from the embodiment illustrated in FIG. 19 in that a reinforcing base part 276 is further provided to the base part 111. The reinforcing base part 276 is further provided with a groove 277 so that the end portion of the first member fastening part 232 can be inserted. This embodiment can be applied when it is necessary to reinforce the strength to a predetermined level even though the protrusion part 112 is not provided to the second reinforcing member 110 due to lack of the installation space, interference, or the like. In other words, it is preferably applied when the strength reinforcement effect of the main body-side vacuum adiabatic body can be provided at a level of strength reinforcement that can be obtained by further installing a reinforcing base 276 at the outer end of the base part 111.

A groove 277 is provided in the reinforcing base part 276 and the end portion of the first member fastening part 232 is fitted and aligned in the groove portion 277 so that the sealing frame 200 can be fastened to the end portion of the vacuum adiabatic body.

Even in a case of the fastening action of the groove 277 and the first member coupling part 232, the movement of the sealing frame 200 in the y-axis direction can be stopped only by only fastening between the inner surface part 230 of the sealing frame 200 and the second reinforcing member 110.

Referring to FIG. 21, when the present embodiment is compared with the embodiment illustrated in FIG. 19, the present embodiment differs from the embodiment illustrated in FIG. 19 in that the base part 111 is further provided with a reinforcing protrusion 278. The end portion of the first member fastening part 232 may be engaged with the reinforcing protrusion 278. Even if the second reinforcing member 110 is not provided with the protrusion part 112 or the reinforcing base part 276 due to lack of the installation space, interference, or the like, the present embodiment can be applied when the strength thereof is reinforced to a predetermined level and there is a need to ensure that the first member fastening part 232 is engaged. In other words, by further installing the reinforcing protrusion 278 at the outer end portion of the base part 111, the effect of reinforcing the strength of the main body-side vacuum adiabatic body can be obtained. In addition, the reinforcing protrusion 278 can be preferably applied because the reinforcing protrusion can provide an engagement action of the first member fastening part 232.

The first member fastening part 232 is engaged and supported to the reinforcing protrusion 278 so that the sealing frame 200 can be fastened to the end portion of the vacuum adiabatic body.

The embodiment illustrated in FIGS. 19 to 21 illustrates a case where the inner surface part 230 is provided as a single product without being separated into the first member and the second member and is fastened to the vacuum adiabatic body. However, the inner surface part may be separated into two members without being limited thereto.

Although the embodiment described above provides a case where the second reinforcing member 110 is provided, the following embodiments will describe fastening of the sealing frame 200 in a case where no additional reinforcing member is provided inside the first plate member 10.

Referring to FIG. 22, the first reinforcing member 100 is provided to reinforce the strength of the vacuum adiabatic body, but the second reinforcing member 110 is not separately provided. In this case, the inner protrusion 281 may be provided on the inner surface of the first plate member 10 so that the sealing frame 200 is fastened. The inner protrusion 281 can be fastened to the first plate member 10 by welding, fitting, or the like. The present embodiment can be applied in a case where the sufficient strength of the main body-side vacuum adiabatic body can be obtained only by the reinforcing members provided in the first reinforcing member 100, that is, the vacuum space part 50, or in a case where the reinforcing member can be installed on a side of the second plate member 20.

The first member fastening groove 282 may be provided in the first member fastening part 232 so as to be capable of being fitted and fixed to the inner protrusion 281. In the first member fastening groove 282, by inserting the inner protrusion 281, the fastening position of the sealing frame 200 can be fixed.

Referring to FIG. 23, when being compared with the embodiment illustrated in FIG. 22, FIG. 23 characteristically differs from the embodiment illustrated in FIG. 22 in that, in FIG. 23, the first member fastening groove 282 is not provided. According to the present embodiment, the position of the sealing frame 200 can be supported by one end of the first member fastening part 232 being supported by the inner protrusion 281.

When being compared with the embodiment illustrated in FIG. 22, in this embodiment, there is a disadvantage that the movement of the sealing frame 200 in the y-axis direction is stopped only in one direction instead of stopping the movement of the sealing frame 200 in the y-axis direction in both directions. However, an advantage that a worker can conveniently work at the time of fastening the sealing frame 200 can be expected.

The embodiment illustrated in FIGS. 19 to 23 is provided as a configuration in which a side of the first plate member 10 is fixed, and the movement of a side of the second plate member 20 such as sliding is allowed. In other words, the second plate member 20 and the outer surface part 210 are allowed to be relatively slidable, and the relative movement of the first plate member 10 and the inner surface part 230 is not allowed. Such a configuration can be configured opposite to each other. Hereinafter, such a configuration is proposed.

Referring to FIG. 24, an outer protrusion 283 may be provided on the outer surface of the second plate member 20 and an outer engagement part 213 may be provided on the outer surface part 210 of the sealing frame 200. The outer engagement part 213 can be engaged with the outer protrusion 283 and supported.

In a case of the present embodiment, the inner surface part 230 of the sealing frame 200 may be allowed to move with respect to the inner surface part of the first plate member 10, such as a sliding. In this embodiment, mounting and fixing of the sealing frame 200 differ only in the direction and the same description can be applied.

Various embodiments may be further proposed in addition to the embodiment related to FIG. 24. For example, the reinforcing members 100 and 110 may be further installed on the second plate member 20, and the various structures of FIGS. 19 to 21 may be provided with respect to the reinforcing member. Also, the outer engagement part 213 may be provided as a groove structure as illustrated in FIG. 22.

According to the present embodiment, there is a difference in a configuration in which the fastening direction of the sealing frame 200 can be provided in a direction opposite to the original embodiment. However, the fundamental action of the sealing frame can be obtained in the same way.

Hereinafter, a description will be given of a configuration in which a part is installed to an appliance such as a refrigerator to which a vacuum adiabatic body is applied and a wiring is applied to the part.

FIG. 25 is a front view of the upper right side of the main body-side vacuum adiabatic body.

Referring to FIG. 25, a reinforcing member 100, more specifically, a second reinforcing member 110 is provided together with the first plate member 10 and the second plate member 20. The second reinforcing member 110 is placed on the inner surface of the first plate member 10 to reinforce the strength of the main body-side vacuum adiabatic body. The second reinforcing member 110 is provided in the form of a long rod along the corner of the vacuum adiabatic body to reinforce the strength of the vacuum adiabatic body.

The protrusion part 112 of the second reinforcing member 110 may be provided with a slit. The slits 115 and 116 serve as holes through which wirings pass so that the worker can conveniently locate the wirings. It is possible to prevent breakage of the wiring due to the bending of the wiring by placing the wiring in the slit.

The slit may be provided as a first slit 115 which is provided in the second reinforcing member 110 at the corner portion of the upper surface of the vacuum adiabatic body or as a second slit 116 which is provided in the second reinforcing member 11 in the side corner portion of the vacuum insulating member. The slit may be provided corresponding to the portion through which the wiring passes, and may be formed at another position of the second reinforcing member 110.

In a case of the embodiment, a lamp which illuminates the interior of the refrigerator is exemplified as a part, and a slit can be provided at the end portion of each edge to guide the wiring of the part (see 399 in FIG. 26).

Since the slits 115 and 116 can serve as stress concentration points for weakening the strength of the reinforcing member, it is preferable to remove the protrusion part 112 to the height of the level at which the wiring escapes from the part such as the lamp without removing the entire protrusion part 112 as much as possible.

The vertex portions of the slits 115 and 116 may be chamfered to provide smooth round-shaped vertices. According to this configuration, the wiring passing through the slit can be prevented from being broken.

FIG. 26 and FIG. 27 are sectional views of a corner portion of the vacuum adiabatic body in a state where the lamp is installed, FIG. 26 is a sectional view illustrating a portion through which the lamp wiring does not pass, and FIG. 27 is a sectional view illustrating a portion through which the lamp wiring passes. Hereinafter, as a part, the lamp will be described as an example, and the part may be referred to as the lamp but may be referred to as the part.

Referring to FIGS. 26 and 27, it is possible to confirm a state where the part 399 is installed, and the lamp is placed inside the gap forming part 234 as a part necessary for the refrigerator. Wires 402 and 403 of the part 399 extend outward at a gap between the inner surface part 230 and the second reinforcing member 110. Specifically, the wires 402 and 403 of the part 399 extend outward at a gap part between the first member fastening part 232, the second member fastening part 233, and the second reinforcing member 110.

The end portion of the second member fastening part 233 is spaced apart from the base part 112 by a predetermined gap so as to provide a gap through which the wirings 402 and 403 can pass in the second member fastening part 233. Of course, the second member fastening part 233 may be provided with a slit such as that provided in the protrusion part 112.

Referring to FIG. 26, the first member fastening part 232 and the protrusion part 112 are in contact with each other for supporting the sealing frame 200. Referring to FIG. 27, the slits 115 and 116 may extend beyond the end of the first member fastening part 232. The wiring can be drawn out of the protrusion part 112 through the gap between the slits 115 and 116 and the end portions of the first member fastening part 232. According to the configuration of the slits 115 and 116, the wirings 402 and 403 can be guided to the outside through the slit, and at this time, there may be no interference structure that can break the wiring.

FIG. 28 is an exploded perspective view illustrating the peripheral portion of the part.

Referring to FIG. 28, a part 399, a part fixing frame 400 on which the part 399 is seated, and the sealing frame 200 are illustrated.

The part fixing frame 400 provides a portion of the inner surface part 230 of the sealing frame 200. The part fixing frame 400 has constituent elements for seating the part 399 thereon.

The part fixing frame 400 has a shape elongated in one direction and is a member corresponding to the second member constituting the inner surface part when observed in the section thereof and can provide the second member fastening part 233, the gap forming part 234, the inclined part 235 inside the refrigerator, and the contact part 236 inside the refrigerator. Functions and actions of configurations already described can be applied to each configuration when observed in the section thereof.

In the part fixing frame 400, a second member insertion recess 238 can be provided at a position corresponding to the first member insertion part 237 which is bent and extended in the inner direction of the refrigerator in the end portion of the first member fastening part 232. The first member insertion part 237 and the second member insertion recess 238 are similar in size and shape to each other so that the first member insertion part 237 can be inserted into, fitted into, and fixed to the second member insertion recess 238. The first member insertion part 237 and the second member insertion recess 238 can be fastened by an additional fastener in the refrigerator 239. In other cases, the part fixing frame 400 may be directly fastened to the second reinforcing member 110.

The inner spaces of the gap forming part 234 and the inclined part 235 inside the refrigerator may form a space in which the part 399 is seated. A part seating rib 404 may be provided on the inner surfaces of the gap forming part 234 and the inclined part 235 inside the refrigerator. The part seating rib 404 can fix the lamp seating position as a portion where both end portions of the lamp main body are supported.

The electric wire accommodation ribs 406 may be formed on the outside of the part seating ribs 404. The gap part between the part seating rib 404 and the electric wire accommodation rib 406 may provide an electric wire accommodation part 405. The electric wire accommodation part 405 provides a space in which an electric wire for applying power to the part 399 is placed or a predetermined part necessary for the operation of the part 399 can be accommodated. The electric wire accommodation ribs 406 and the electric wire accommodation part 405 may be provided on both sides of the part fixing frame 400. Accordingly, inventory costs can be reduced through the common use of parts.

The wirings 402 and 403 drawn outward from the electric wire accommodation part 405 can pass through the gap part between the upper end of the first member fastening part 233 and the base part 111. The wires 402 and 403 can pass through the slits 115 and 116, enter the gap part between the side surface part 220 and the protrusion part 112 of the sealing frame 200 and be guided elsewhere along the gap part therebetween.

An inclined rib 407 may be provided at both end portions of the part fixing frame 400. The inclined ribs 407 are provided so as to be widened toward the rear from the front end portion of the part fixing frame 400. In the drawing, when referring to an index line extending along the electric wire accommodation rib 406 and an index line extending along the end portion of the inclined rib 407, the structure of the inclined rib will be more accurately understood in a case where the angle g therebetween is referred.

In the inclined ribs 407, the part fixing frame 400 is in contact with the inner surface part 230 of the sealing frame 200 adjacent to the part fixing frame 400 to eliminate the gap between the members. This makes it possible to provide a wider internal space in the refrigerator in a case of a refrigerator. For example, the part fixing frame 400 and the adjacent sealing frame 200 can be accurately in contact with each other in accordance with the inclination angle of the inclined part 235 inside the refrigerator provided as b In FIG. 18.

FIGS. 29 and 30 are sectional views taken along line A-A' and B-B' in FIG. 28, and are illustrated in a time sequence. FIG. 29 can be understood that the sealing frame and the part fixing frame are fastened, and FIG. 30 is a view which can be understood that the sealing frame and the part fixing frame are aligned with each other.

Referring to FIGS. 29 and 30, in a case where the part 399 is placed on the part fixing frame 400 and the part on the lower side of the part 399 is a lamp, the gap forming part 234 is provided as a transparent member and light can be emitted. This allows the light emitted from the lamp to pass through the inner surface part 230 and to be emitted to the refrigerator, allowing the user to identify the product in the refrigerator.

The part fixing frame 400 on which the part 399 is seated is aligned in a predetermined direction so as to be fastened to the sealing frame 200. In the embodiment, the first member insertion part 237 and the second member insertion recess 238 are aligned to each other in the extending direction of each member so that the first member insertion part 237 can be fitted into the second member insertion recess 238.

The first member insertion part 237 is slightly larger than the second member insertion recess 238 so that the first member insertion part 237 and the second member insertion recess 238 can be tightly fitted to each other and an engaging structure such as a step and a protrusion may be introduced for light insertion.

The path of the wiring drawn out to the outside of the protrusion part 112 of the second reinforcing member 110 through the slits 115 and 116 will be described.

FIG. 31 is a view observing a side portion of the upper side part of the refrigerator from the front.

Referring to FIG. 31, the wirings 402 and 403 drawn through the slit 115 can move in any direction along the gap between the protrusion part 112 and the side surface portion 220 of the sealing frame 200.

The moved wiring can be drawn out to an outside through an appropriate position, for example, a central part of the upper surface. The drawn wire can be connected to the controller.

Hereinafter, the distribution of cold air through mullions will be described.

FIG. 32 is a front perspective view illustrating the main body-side vacuum adiabatic body, and FIG. 33 is a rear perspective view illustrating the main body-side vacuum adiabatic body.

With reference to FIGS. 32 and 33, the vacuum adiabatic body having the first plate member 10 inside the refrigerator and the second plate member 20 outside the refrigerator can divide the inner space into the refrigerating chamber R and the freezing chamber F by the mullion 300.

The mullions are a division wall which divides the inner part of the main body into a first main body and a second main body, and the inner part of the division wall may be filled with a material such as resin that provides an adiabatic member. The division wall may have a heat transfer rate lower than the heat transfer rate of air but a higher heat transfer rate than the third space, which is the vacuum space part.

A machine chamber 8 is provided on the outer lower part of the vacuum adiabatic body and refrigeration system elements such as a compressor, a condenser, and an expander can be accommodated as already described. Shelves 600 are placed in the refrigerating chamber R and the freezing chamber F to efficiently accommodate the stored contents.

The freezing chamber F is provided with an evaporator 7 to provide cool air. The cool air provided by the evaporator 7 can be smoothly supplied into the freezing chamber F by the freezing chamber flow path guide 700. A part of the cool air provided in the evaporator 7 may be supplied to the refrigerating chamber flow path guide 550 so that cool air can be smoothly supplied into the refrigerating chamber R.

The fan module 503 provided on the upper side of the evaporator 7 provides negative pressure so that the heat-exchanged air in the refrigerating chamber and the freezing chamber passes through the evaporator. In other words, the fan module 503 can create a negative pressure environment at the outlet end of the evaporator 7 so that relatively hot air is introduced into the evaporator 7.

The cool air provided from the evaporator is supplied to the refrigerating chamber flow path guide 550 through the cold air discharge pipe 502 and the relatively hot air in the refrigerating chamber R sucked through the refrigerating chamber flow path guide 550 may flow into the evaporator 7 through the cold air collecting pipe 501 again.

The cool air discharge pipe 502 and the cool air collecting pipe 501 can pass through the mullion 300. This is because the refrigerating chamber and the freezing chamber must be insulated by the mullion.

Meanwhile, the mullion 300 may be made a non-metal such as resin to reduce the heat transfer between the refrigerating chamber R and the freezing chamber F and may be fastened to a plate member made of a metal.

In the mullion 300 and the plate member 10, a connecting member having a predetermined shape bent in an 'L' section may be fastened to the plate member and the mullion 300 may be mounted on the connecting member. Alternatively, A metal bolt is fastened to the plate member by a welding method or the like and the mullion 300 and the bolt may be connected to a predetermined non-metal connecting member to connect the mullion and the plate member. At this time, the connecting member may be provided as a non-metal to prevent heat transfer between the mullion and the plate member. Alternatively, the plate member may be formed into a predetermined shape so that the mullion 300 is seated on the formed and bent portion.

FIG. 34 is a rear perspective view illustrating mullions separated and observed.

Referring to FIG. 34, the mullion 300 can divide the inner space of the vacuum adiabatic body into a refrigerating chamber R and a freezing chamber F. To this end, the outer surface of the mullion 300 can be in contact with the inner surface of the first plate member 10 as described above.

The cold air discharge pipe 502 may be aligned with the cold air supply flow path 311 provided in the mullion 300. The cool air discharge pipe 502 can be aligned with the fan module 503 to receive cool air and the flow path resistance passing through the cool air discharge pipe 502 by a damper provided in the cool air discharge pipe 502 can be adjusted. In some cases, the damper may completely block the cold air discharge pipe 502 or may be completely opened. The cool air supply flow path 311 can supply cool air to the refrigerating chamber flow path guide 550 side.

The cold air collecting pipe 501 can be aligned with the cold air collecting flow pipe 312 provided in the mullion 300 and relatively hot air can flow through the refrigerating chamber by the positive pressure of the cold air supplied to the refrigerating chamber flow path guide 550 through the cold air discharging pipe 502.

The circulation path of the refrigerant flowing through the refrigerating chamber and the freezing chamber around the evaporator 7 will be described in detail.

FIG. 35 is a front view illustrating the evaporator observed from the front in a state where the fan module and freezing chamber flow path guide are removed; and FIG. 36 is a front view illustrating the evaporator observed from the front in a state where the fan module and freezing chamber flow path guide are installed.

Referring to FIG. 35, the cold air collecting pipe 501 may be placed on the left side of the evaporator 7. In other words, the evaporator 7 and the cold air collecting pipe 501 may be arranged in a line. More specifically, the cold air collecting pipe may be aligned with the extending direction of the refrigerant pipe provided in the evaporator 7. Accordingly, the evaporator 7 can be brought into close contact with the inner surface of the rear wall of the vacuum adiabatic body as much as possible, and the effect that the space inside the refrigerator is wider can be expected.

A collecting pipe discharge port 504 is provided at the end of the cold air collecting pipe 501 and is cut to be inclined in a direction toward the evaporator 7. Therefore, the air discharged from the cold air collecting pipe 501 can be guided to the evaporator 7 side well.

A refrigerant pipe and a fin are installed on the evaporator 7. The fin may be tightly installed on the side close to the cold air collecting pipe 501 to provide a fin dense area 71 and a fin loose area 72 can be provided on the side far from the cold air collecting pipe 501. Accordingly, more heat exchange action can be performed on the air collected in the refrigerating chamber relatively hotter than the air collected in the freezing chamber. More specifically, it is possible to increase the heat exchange efficiency of the evaporator 7 by making the collected air from the relatively hot refrigerating chamber be more guided to the fin dense area 71 in which the fins are dense. Such heat exchange efficiency increasing action can be further elevated because the cold air collecting pipes 501 are aligned in a line on the left side of the evaporator.

Referring to FIG. 36, freezing chamber suction ports 701 and 702 are provided on the lower left and right sides of the freezing chamber flow path guide 700, respectively. Freezing chamber discharge ports 703 and 704 are provided on the upper left and right sides of the freezing chamber flow path guide 700, respectively. One freezing chamber discharge port 705 is also provided at the center part of the freezing chamber flow path guide 700.

The freezing chamber flow path guide 700 is provided with a plate-like structure for guiding the air flow path so that the relative air sucked in the freezing chamber and the refrigerating chamber can be prevented from flowing backward. For example, the ribs 706 provided in the freezing chamber flow path guide 700 may be configured such that the air that has passed through the evaporator 7 and the fan module 503 guides to the freezing chamber discharge ports 703, 704, and 705 and the cold air discharge pipe 502 and prevented from flowing back to the evaporator side.

The first freezing chamber suction port 701 and the second freezing chamber suction port 702 may be provided asymmetrically. The first freezing chamber suction port 701 is positioned on the side closer to the cold air collecting pipe 501 and the second freezing chamber suction port 702 is positioned on the far side from the cold air collecting pipe 501. In this case, the area of the first freezing chamber suction port 701 may be provided to be smaller than the area of the second freezing chamber suction port 702. Here, the area is proportional to the suction amount and may be inversely proportional to the flow path resistance. According to this configuration, the heat exchange efficiency of the fin dense zone 71 can be further increased.

The air passing through the evaporator 7 passes through the fan module 503, is discharged, and then divided into several parts.

First, cool air can be discharged through the freezing chamber discharge ports 703 and 704 on the upper left and right sides of the freezing chamber flow path guide 700, respectively. Also, the cool air is also discharged through the freezing chamber discharge port 705 provided at the center part of the freezing chamber flow path guide 700. Accordingly, it is possible to reliably perform the cooling operation for the entire area of the freezing chamber F.

Meanwhile, any cold air discharged from the fan module 503 may be guided to the cold air discharge pipe 502 and flow out to the refrigerating chamber R.

FIG. 37 is a view illustrating peripheral parts of the evaporator observed from the rear, and FIG. 38 is a sectional view taken along line C-C' of FIG. 37.

Referring to FIGS. 37 and 38, a first suction-side division wall 710 is provided between the cold air collecting pipe 501 and one side of the evaporator 7 and a second suction-side division wall 712 is provided on the other side of the evaporator 7. The suction-side division walls 710 and 712 prevent the air on the discharge side of the fan module 503 from being bypassed to the air flowing into the evaporator side. The suction-side division walls 710 and 712 may be provided as plate-like members provided in the freezing chamber flow path guide 700.

The second suction-side division wall 712 extends downward longer than the first suction-side division wall 710. Accordingly, the air that can be bypassed, that is, the air passing through the evaporator, can be more accurately blocked from being reabsorbed to the evaporator side.

The second suction-side division wall 712 and the first suction-side division wall 710 are provided on both left and right sides of the evaporator 7, respectively and thus the space inside the refrigerator can be provided larger.

FIG. 39 is a perspective view illustrating the refrigerating chamber flow path guide.

Referring to FIG. 39, the refrigerating chamber flow path guide 550 includes a refrigerating chamber flow path cover 580 having a multi-duct (see 591 in FIG. 41) therein. Shelf racks 561 may be exposed to the outside of the left and right ends of the refrigerating chamber flow path cover 580.

The shelf rack 561 can be fastened to the first plate member 10 by a separate fastening member or by a welding method or the like. As an alternative, the shelf rack 561 can be fastened to the first plate member 10 together with the refrigerating chamber flow path cover 580 by another fastening member 571. In this case, the first plate member 10 is provided with a fastening aid tool such as a boss, and the fastening member 571 supports the refrigerating chamber flow path cover 580 and the self rack 561 together to fasten to the fastening aid tool.

The refrigerating chamber flow path cover 571 may be provided with a refrigerating chamber suction port 581 and a refrigerating chamber discharge port 582. The refrigerating chamber suction port 581 may be aligned with the cold air collecting flow path 312 of the mullion 300. The refrigerating chamber discharge port 582 may communicate with the cold air supply flow path 311 of the mullion 300. A plurality of the refrigerating chamber outlet ports 582 are spaced vertically from the refrigerating chamber flow path cover 580 to cool the entire space of the refrigerating chamber in various ways depending on the purpose. It is preferable that the refrigerating chamber discharge port 582 is provided from the left and right to substantially the center part of the refrigerating chamber so that the refrigerating chamber is entirely cooled.

FIG. 40 is a sectional view taken along line D-D' in FIG. 39.

Referring to FIG. 40, a multi-duct 591 is provided inside the center part of the refrigerating chamber flow path cover 571, and the multi-duct 591 is provided at a substantially central portion when the left and right sides of the refrigerating chamber are entirely observed. Accordingly, the discharged cold air can be uniformly distributed over the entire area of the refrigerating chamber.

The fastening member 571 can fasten the refrigerating chamber flow path cover 580 and the self rack 561 together with the vacuum adiabatic body.

FIG. 41 is a rear perspective view illustrating the refrigerating chamber in a state where the refrigerating chamber cover is removed.

Referring to FIG. 41, the multi-duct 590 is made of an adiabatic material, in which resin is foamed, to prevent dew formation.

The multi-duct 590 has a lower bent portion 597 and an extended part 598 extending upward from the bent portion 597. A cool air inflow end 592 is provided at the lower end of the bent portion 597 to allow cool air to flow. The cool air of the cool air supply flow path 311 may flow cool air into the inner part of the multi-duct 590 through the cool air inflow end 592.

The bent portion 597 allows the cold air supplied to the cold air supply flow path 311 to be deflected to either side with respect to the left and right of the refrigerating chamber R to move to the center part with respect to the left and right of the refrigerating chamber. The extended portion 598 distributes cold air supplied from the bent portion 597 through the cold air discharge port 593 and discharges the cold air. The cool air discharge port 593 may be aligned with the refrigerating chamber discharge port 582 of the refrigerating chamber flow path cover 580.

The upper end part of the cold air collecting pipe 501 illustrated in the lower left of the drawing may be aligned with the refrigerating chamber suction port 581 so that the air in the relatively hot refrigerating chamber flowing from the refrigerating chamber may be directed toward the evaporator.

FIG. 42 is a sectional view taken along line E-E' in FIG. 41, and referring to FIG. 42, the multi-duct 590 may include a housing 596 having multi-channels 591 to which cool air is supplied. In the housing 596, at least two multi-channels 591 divided by a duct division wall 595 are provided in a state of being spaced apart from each other. The multi-channels 591 are spaced apart from each other in the left and right direction so that the cool air supplied into the refrigerating chamber can be smoothly spread over the entire refrigerating chamber when viewed in the left-right direction.

FIG. 43 is a view for explaining the support operation of the shelf and referring to FIG. 43, the shelf rack 561 may be provided with shelf support holes 562 spaced apart from each other in the up and down direction. A shelf rack end 601 at the rear end of the shelf 600 may be inserted into the self support hole 562 to support the weight of the shelf 600.

In order to allow the weight of the shelf 600 to be supported by the shelf rack 561, the shelf rack 561 must be firmly supported on the inner surface of the vacuum adiabatic body. To this end, the number of fastening members 571 for fastening the shelf rack 561 to the first plate member 10 may be increased.

FIGS. 44-49 illustrate various embodiments of a refrigerator using a single vacuum adiabatic body and separating the inner space of the vacuum adiabatic body with the mullion.

The following description is a simplified illustration of a side view of a refrigerator, and therefore may be different from an actual product. Unless otherwise specified, the main body 3 uses a vacuum adiabatic body. In a case where the leader line penetrates the vacuum insulating body, it can be understood that the pipeline or the part line penetrates the vacuum insulating body. In a case where the inner accommodation space of the vacuum adiabatic body is separated, a first door, a second door, and other doors for separating, opening, and closing the respective spaces may be provided. When penetrating the vacuum adiabatic body, members such as a welding pipeline and a corrugated conductive resistance sheet 63 can be applied. It is preferable that a space in which the reinforcing member is installed is avoided when penetrating the vacuum adiabatic body. The welding pipeline and the corrugated conductive resistance sheet 63 may be subjected to a sealing action on the plate member to maintain the sealing of the vacuum space portion. In a case where the leader line passes through the inside of the vacuum adiabatic body, that is, the vacuum space portion, it can be understood that the pipeline and the part line pass through the inside of the vacuum adiabatic body. In the drawings, the mullions are illustrated as dividing the vacuum adiabatic body into upper and lower parts, but the present invention is not limited thereto and may be divided into left and right sides. The mullions can be filled with the adiabatic member so that the divided accommodation spaces can be thermally separated from each other.

Referring to FIG. 44, as illustrated above, in the present embodiment, a cool air supply flow path 311 and a cool air collecting flow path 312 are provided in the mullion 300 so that the cool air in the freezer chamber F is supplied to the refrigerating chamber R.

For the convenience of explanation, the supply path of the power, the supply path of the refrigerant and the cool air, and the discharge path of the defrost water are separately described.

First, the power supply path will be described. The external power supplied from the second space is supplied to the controller 450 on the upper surface of the vacuum adiabatic body that is placed in the second space. The controller 450 supplies the necessary power to the various parts 399 necessary for the operation of the refrigerator. The part 399 may include a lamp and a sensor and is placed in the first space. In a case where the part 399 is a sensor, the controller 450 not only supplies power to the sensor but also receives the sensing signal of the sensor to utilize the signal for controlling the refrigerator. It will be naturally understood that the part 399 also includes a compressor P which forms a refrigeration cycle.

In order to supply power to the first space from the second space via the controller 450, power may pass through the third space as illustrated or may pass through the gap part between the door and the main body.

The controller 450 may be placed in the inner space of the mullion 300. In this case, space utilization can be increased. In other words, only the power passes through the plate member to flow therein, and respective configurations inside the refrigerator can be controlled by a controller installed in the mullion 300. Since the mullion 300 requires a certain thickness for heat insulation, the above configuration can be proposed.

The power supply line can extend through the mullion 300 to supply power to the component 399 placed in the freezing chamber F or to a component adjacent to the mullion.

The supply path of the refrigerant and cool air will be described.

First, cool air is described. It is possible to provide cold air by the integral evaporator 83 placed in the main body 2, that is, the lower freezing chamber F of the first space and the cold air can be first supplied to the inside of the freezing chamber F.

The cold air of the integral evaporator 83 can be supplied to the refrigerating chamber R and circulated through the cold air flow paths 311 and 312 provided in the mullion 300 and other cold air communication structures.

The refrigerant supply to the evaporators 81 and 82 will be described.

The refrigerant can be provided to each evaporator placed in the first space in a state before the evaporation by the member including the compressor P placed in the machine chamber 8 provided in the second space. The refrigerant pipeline may have a flow path placed in the first space and a flow path placed in the second space, respectively. It is preferable for heat exchange between the inlet and outlet of the integral evaporator 83 to improve the efficiency of the refrigeration cycle.

Referring to FIG. 49, it can be seen that the two pipelines of the first refrigerant pipe 901 and the second refrigerant pipe 902 approach each other and heat exchange occurs between the two pipelines of the first refrigerant pipe 901 and the second refrigerant pipe 902. The first refrigerant pipe 901 may extend from the expander inside the machine chamber 8 and the second refrigerant pipe 902 may be a pipeline which extends from the integral evaporator 83. The heat exchange pipelines formed by the contact of the two refrigerant pipes are provided in a curved shape in order to secure a sufficient heat exchange length in a narrow space, so the heat exchange pipelines can be referred to as heat exchange curved pipes or S-pipes.

Referring again to FIG. 44, the S-pipe may be placed in the third space which is the vacuum space of the wall body of each main body, that is, the vacuum adiabatic body. Therefore, it is possible to prevent heat loss, and there is no need for a space for insulating the pipeline separately.

This is explained in more detail using time series. The refrigerant compressed/condensed/expanded in the machine chamber and directed to the integral evaporator 83 perform heat exchange by the heat exchange curved pipe inside the vacuum adiabatic body and supplied to the integral evaporator 83. The refrigerant evaporated in the integral evaporator 83 may perform heat exchange through the heat exchange curved pipe while being discharged.

The heat exchange curved pipe is described as passing through the vacuum space part. However, the present invention is not limited thereto, and may pass through the inner space of the mullion 300 in a case where the inner space of the vacuum space part is insufficient. Since the mullion 300 is thermally insulated, it is possible to obtain the advantage that no separate adiabatic action is needed for the heat exchange curved pipe.

The discharging path of the defrost water will be described.

The defrost water generated in the integral evaporator 83 placed in the first space is collected in the drain tray (DT2) 801 positioned in the machine chamber 8 which is placed in the second space through the third space and is suitably vaporized by the drain heater (DH2) 802 to be capable of being removed.

Here, a drain pipe (also referred to as DP) for connecting the integral evaporator 83 and the drain tray (DT2) 801 may be used to penetrate the third space. The defrost water can pass through the drain pipe. The drain pipe (DP2) may pass through the welding pipeline and corrugated conductive resistance sheet 63. The drain pipe is illustrated as passing through the bottom surface of the vacuum adiabatic body in the drawing, but may also be drawn out through the rear and side surfaces.

Although it is illustrated that the drain pipe passes through the welding pipeline and corrugated conductive resistance sheet, the present invention is not limited thereto, and the drain pipe may be implemented by other methods, such as through pipes, drain pipe welding, and cylindrical sheets. The same is applied hereinafter.

Although the drain pipe has been described as passing through the bottom surface of the vacuum adiabatic body, the present invention is not limited thereto, and the drain pipe may pass through the rear surface or the side surface of the vacuum adiabatic body. However, it may be desirable to pass through the bottom surface for rapid discharge.

Referring to FIG. 45, this embodiment is different from the embodiment illustrated in FIG. 44 in the installation position of the integral heat exchanger 83 and the discharge path of the defrost water. Therefore, the explanation of FIG. 44 will be applied to another explanation, and the discharge path of the defrost water and the integral heat exchanger will be described.

The integral evaporator 83 may be positioned farther away from the machine chamber 8, that is, above among the spaces divided by the mullion 300.

The defrost water generated in the integral evaporator 83 may be guided to the defrost water connection part 803 positioned inside the mullion 300. The defrost water connection part 803 can primarily collect the defrost water. The drain pipe DP1.1 connecting the integral evaporator 83 and the defrost water connection part 803 is placed inside the first space, so no separate sealing structure is required.

The defrost water in the defrost water connection part 803 is collected in the drain tray (DT2) 801 positioned inside the machine chamber 8 and can be appropriately vaporized and removed by the drain heater (DH2) 802.

At this time, the pipeline through which the defrost water connection part 803 and the drain tray (DT2) 801 are connected to each other can be guided along the outer surface of the second plate member 20 through the vacuum adiabatic body. The pipeline connecting the defrost water connection part 803 and the drain tray 801 may pass through the vacuum adiabatic body and thus may be provided in a sealed structure by a welding pipeline and a corrugated pipe conductive resistance sheet or the like.

In the present embodiment, the drain tray and the drain heater are provided inside the machine chamber. However, the present invention is not limited thereto, and a separate drain heater may be installed inside the mullion 300 to prevent the defrost water from being guided into the machine chamber.

In this case, it is expected that the number of pipelines passing through the vacuum adiabatic body is reduced, thereby improving the adiabatic efficiency of the vacuum adiabatic body. However, it may be necessary to provide a configuration for guiding the vaporized defrost water vapor to the outside through the front of the mullion. This embodiment can be preferably applied in a case of an integral evaporator in which the generation amount of the defrost water is small.

In a case of the present embodiment, an upper-freezing refrigerator can be applied.

Referring to FIG. 46, this embodiment is characteristically different from the embodiment illustrated in FIG. 45, in that the discharging paths of the defrost water are different from each other. Therefore, another explanation will be made assuming that the description of FIG. 45 is applied as it is, and the discharge path of the defrost water will be described.

The defrost water generated in the integral evaporator 83 may be guided to the defrost water connection part 803 positioned inside the mullion 300. The defrost water connection part 803 can primarily collect the defrost water.

The defrost water in the defrost water connection part 803 is collected in the drain tray (DT2) 801 positioned inside the machine chamber 8 and can be appropriately vaporized and removed by the drain heater (DH2) 802.

The pipeline connecting the defrost water connection part 803 and the drain tray 801 may be guided to the machine chamber 8 through the bottom surface of the vacuum adiabatic body. The conduit connecting the defrost water connection part 803 and the drain tray 801 may pass through the vacuum adiabatic body and thus may be provided in a sealed structure by a welding pipeline and a corrugated pipe conductive resistance sheet.

In a case of the present embodiment, it can be applied when it is not easy to provide a separate pipeline on the outer wall part of the vacuum adiabatic body in a case of the upper-freezing refrigerator.

Referring to FIG. 47, in a case of the present embodiment, an evaporator is separately installed in each divided space of the main body 2 divided by the mullions 300, which is different from the previous embodiment. Portions different from those of the previous embodiment will be described, and the same constitution will be applied to the same description as the previously described explanation.

The supply path of the refrigerant and cool air will be described.

First, the cool air is explained. The cold air is provided by the evaporators 81 and 82 placed in the divided inner part of the main body 2, that is, the first space, respectively, so as to be supplied to each divided inner part of each main body 2.

The refrigerant supply to the evaporators 81 and 82 will be described. The refrigerant can be provided to each evaporator which is placed in the first space in a state before the evaporation by the member including the compressor P placed in the machine chamber 8 provided in the second space. Multi-ducts corresponding to the respective evaporators may also be provided, respectively.

The heat exchange curved pipe can be installed in the same manner as that described above, and the heat exchange curved pipe can be placed in the vacuum space part, and in a case where the inner space of the vacuum space part is insufficient or there is interference, the heat exchange curved pipe can be placed inside the mullion.

The refrigerant which is compressed/condensed/expanded in the machine chamber 8 and directed to the evaporators 81 and 82 can be branched and supplied and the branched point may be placed on the inside of the machine chamber 8, the inside of the vacuum adiabatic body, or the inside of the mullion. The refrigerant evaporated in the evaporators 81 and 82 can perform heat exchange through the respective heat exchange curved pipes.

The discharge path of the defrost water will be described.

The defrost water generated in the first evaporator 81 placed in the first space can be collected primarily in the defrost water connection part 803 positioned inside the mullion 300 placed in the first space. Thereafter, the defrost water can be guided to the drain tray 801 inside the machine chamber and removed by the drain heater 802.

The defrost water generated in the second evaporator 81 is collected in the drain tray 801 positioned in the machine chamber 8 penetrating the third space and placed in the second space and can be properly vaporized and removed by the drain heater (DH2) 502.

The aspect of the drain pipe, the position of the drain pipe, and the modified embodiment of the drain pipe may be applied to the present embodiment in a case of the previously described embodiment.

According to the present embodiment, it is expected that the present invention can be applied to a case where it is difficult to provide a cold air flow path to the mullion or a case of a high-grade product which actively controls the inner space divided by the mullion.

Referring to FIG. 48, the present embodiment characteristically differs from the embodiment in FIG. 47 in that a drain pipe is provided.

The defrost water generated in the second evaporator 82 is collected in the drain tray 801 positioned in the machine chamber 8 passing through the third space and placed in the second space and can be properly vaporized and removed by the drain heater (DH2) 502.

A drain pipe passing through the third space is provided, and the drain water can pass through the drain pipe. The drain pipe DP2 may pass through the welding pipeline and the corrugated conductive resistance sheet 63. The drain pipe is illustrated as passing through the bottom surface of the vacuum adiabatic body in the drawing, but may also be drawn out through the rear and side surfaces.

The defrost water generated in the first evaporator 81 can be guided to the defrost water connection part 803 positioned inside the mullion 300, that is, the first space, through the drain pipe DP1.1. The defrost water connection part 803 can primarily collect the defrost water. The defrost water received in the defrost water connection part 803 can move to a drain pipe DP1.2 along the inner space of the vacuum insulation body, that is, the first space, and be merged at the inlet side of the drain pipe DP2 removing the defrost water from the second evaporator 82. In other words, the defrost water of each of the evaporators 81 and 82 can be combined in the first space and can be guided to the second space through the third space together.

In a case of this embodiment, it can be applied when it is not easy to provide separate pipelines on the outer wall part of the vacuum adiabatic body in a case of a high-class refrigerator.

INDUSTRIAL APPLICABILITY

The present invention proposes a utilization method of each constitution of a refrigerator which is divided by the mullion in a case where a single vacuum adiabatic body is used.

According to the present invention, there is proposed a method for actively controlling the environment in a refrigerator using a vacuum adiabatic body as needed in a refrigerator in which refrigeration and freezing are required together.

This suggests that the vacuum adiabatic body can be used more industrially.

The invention claimed is:

1. A vacuum adiabatic body comprising:
    a first plate that defines at least a portion of a first side of a wall adjacent to a first space having a first temperature;
    a second plate that defines at least a portion of a second side of the wall adjacent to a second space having a second temperature;
    a conductive resistance sheet that connects the first plate to the second plate to provide a third space which has a third temperature and is in a vacuum state, and the conductive resistance sheet is made of a material to reduce a heat transfer between the first plate and the second plate;
    at least one support in the third space;
    a reinforcing member provided on a peripheral portion of at least one of the first plate or the second plate so as to reinforce a strength of the vacuum adiabatic body; and
    a drain pipe that penetrates the third space and through which water is to pass.

2. The vacuum adiabatic body according to claim 1, further comprising:
    a pair of refrigerant pipes that penetrate the third space.

3. The vacuum adiabatic body according to claim 2, wherein the pair of refrigerant pipes include a heat exchange curved pipe provided in the third space.

4. A refrigerator comprising:
    a vacuum adiabatic body includes a first plate that defines at least a portion of a first side of a wall adjacent to a first space having a first temperature, a second plate that defines at least a portion of a second side of the wall adjacent to a second space having a second temperature, a thermal insulator that connects the first plate to the second plate to provide a third space which has a third temperature and is in a vacuum state, the thermal insulator is to reduce heat transfer between the first plate and the second plate, at least one support to the third space, and an opening that forms with respect to a storage space;
    a partition that divides the storage space into at least two spaces, the partition includes an adiabatic member to insulate the at least two spaces;
    a first door that opens and closes a first space of the at least two spaces;
    a second door that opens and closes a second space of the at least two spaces;
    an evaporator provided in the storage space;
    a machine chamber provided outside the storage space;
    a refrigerant pipe that connects the machine chamber and the evaporator; and
    a drain pipe that penetrates the vacuum adiabatic body to guide defrost water from the evaporator to outside of the vacuum adiabatic body,
    wherein a heat transfer rate of the adiabatic member in the partition higher than a heat transfer rate in the third space,
    wherein at least one of the defrost water and an electric line path penetrates the third space, and through-holes for pipelines are provided at the first plate and the second plate, and
    wherein a cold air flow path, provided through the partition, that sends and receives cold air between the first space and the second space of the at least two spaces.

5. The refrigerator according to claim 4,
    wherein the first plate and the second plate are made of a metal material, and
    wherein the partition is made of a non-metal material.

6. The refrigerator according to claim 5,
    wherein the first and second plates to attach to the partition.

7. The refrigerator according to claim 4,
    wherein the refrigerant pipe includes:
        a first flow path that passes through the space inside the refrigerator;
        a second flow path that passes to outside the refrigerator; and
        a third flow path in which a discharge flow path from the evaporator performs heat exchange with a discharge flow path from the machinery chamber, and wherein the third flow path is provided through the partition.

8. The refrigerator according to claim 4,
wherein a path is provided through the partition to discharge defrost water from the evaporator provided at one of the at least two spaces.

9. The refrigerator according to claim 4, further comprising:
a cold air collecting pipe that guides cold air collected from the second space of the at least two spaces to any space of the at least two spaces, among the cold air flow paths,
wherein the cold air collecting pipe is aligned in a line with the evaporator.

10. The refrigerator according to claim 4, further comprising:
a cold air collecting pipe that guides cold air collected from the second space of the at least two spaces to any space of the at least two spaces, among the cold air flow paths,
wherein fins of the evaporator are denser at a position close to the cold air collecting pipe than at a position further from the cold air collecting pipe.

11. The refrigerator according to claim 4,
wherein a suction-side division wall is provided on a side of the evaporator to prevent bypass of air cooled at the evaporator.

12. The refrigerator according to claim 4,
wherein the cold air flow path includes:
a cold air supply flow path having a first traveling direction of cold air, and a cold air collecting flow path having a second traveling direction of the cold air, the second traveling direction being different than the first traveling direction, and
a multi-duct that extends to be long on a surface of the second space of the at least two spaces and in which an inflow end part of the cold air is provided while being bent toward a center of any surface, so as to evenly distribute cool air inside the second space of the at least two spaces.

13. The refrigerator according to claim 4, further comprising:
a self rack is provided on a surface of the second space of the at least two spaces and fastened on an inner surface, of the vacuum adiabatic body;
a multi-heat that evenly guides cool air to the inside of the second space of the at least two spaces; and
a flow path cover fastened to the inner surface of the vacuum adiabatic body together with the self rack and accommodates the multi-duct therein.

14. A refrigerator comprising:
a first plate that defines at least a portion of a first side of a wall adjacent to a first space having a first temperature;
a second plate that defines at least a portion of a second side of the wall adjacent to a second space having a second temperature different;
a thermal insulator that connects the first plate to the second plate to provide a third space which has a third temperature and is in a vacuum state, the thermal insulator is to reduce a heat transfer between the first plate and the second plate;
at least one support in the third space;
a main body having a cavity formed by the first plate and the second plate;
a dividing wall fastened to the first plate so as to divide a space in the cavity into at least two spaces;
at least one door that closes at least one of a first space or a second space of the at least two spaces;
a gasket installed to the at least one door or the main body so as to seal a portion at which the door and the main body contact each other; and
a sealing frame that contacts the gasket, and is provided between the third space and the gasket;
wherein the dividing wall includes an adiabatic material having a thermal conductivity which is higher than a thermal conductivity in the third space.

15. The refrigerator according to claim 14,
wherein a through-hole is formed on an inner space of the dividing wall so that fluid moves between the at least two spaces.

16. The refrigerator according to claim 14,
wherein a discharge flow path of defrost water generated at the cavity is through an inner space of the dividing wall.

17. The refrigerator according to claim 14,
wherein a cold air flow path is provided through an inner space of the dividing wall such that the at least two spaces communicate with each other.

18. The refrigerator according to claim 14,
wherein a refrigerant flow path is provided through an inner space of the dividing wall such that the at least two spaces communicate with each other.

19. The refrigerator according to claim 14,
wherein an electric line path is provided through an inner space of the dividing wall such that the at least two spaces communicate with each other.

20. The refrigerator according to claim 14,
wherein a controller is provided at an inner space of the dividing wall.

\* \* \* \* \*